(12) United States Patent
Gagnon et al.

(10) Patent No.: US 6,855,050 B2
(45) Date of Patent: Feb. 15, 2005

(54) VENTILATION METHOD AND DEVICE

(75) Inventors: Martin Gagnon, Saint-Charles-de-Drummond (CA); Éric Charlebois, Saint-Nicephore (CA); Michel Julien, Drummondville (CA); Daniel Marcoux, Saint-Charles-de-Drummond (CA); Jean-Bernard Piaud, Rock Forest (CA)

(73) Assignee: Venmar Ventilation Inc., Drummondville (CA)

( * ) Notice: Subject to any disclaimer, the term of this patent is extended or adjusted under 35 U.S.C. 154(b) by 25 days.

(21) Appl. No.: 10/158,492

(22) Filed: May 31, 2002

(65) Prior Publication Data

US 2003/0013407 A1 Jan. 16, 2003

(30) Foreign Application Priority Data

May 31, 2001 (CA) .............................................. 2349970

(51) Int. Cl.⁷ .................................................. A62C 2/12
(52) U.S. Cl. ........................... 454/369; 165/96; 165/41; 454/69
(58) Field of Search ............................... 165/41, 42, 43, 165/202, 203, 96; 454/69, 156, 369

(56) References Cited

U.S. PATENT DOCUMENTS

| | | |
|---|---|---|
| 2,206,858 A | 7/1940 | McKee |
| 3,212,424 A | 10/1965 | Davis, Jr. |
| 4,102,597 A | 7/1978 | Itayame |
| 4,715,532 A | 12/1987 | Sarazen, Jr. et al. |
| 4,750,411 A | 6/1988 | Eversole |
| 4,760,877 A | 8/1988 | Kondo et al. |
| 4,841,733 A | 6/1989 | Dussault et al. |
| 5,024,263 A | 6/1991 | Laine et al. |
| 5,193,610 A | 3/1993 | Morissette et al. |
| 5,383,765 A | 1/1995 | Baxter et al. |
| 5,538,293 A | 7/1996 | Kolt |
| 5,632,675 A | 5/1997 | Kanninen et al. |
| 5,983,987 A | * 11/1999 | Weindorf ..................... 165/42 |
| 6,209,622 B1 | 4/2001 | Lagacé et al. |

FOREIGN PATENT DOCUMENTS

| | | |
|---|---|---|
| DE | 28 44 046 | 4/1980 |
| DE | 30 27 447 A1 | 2/1982 |
| DE | 199 53 992 A | 5/2000 |
| EP | 0 475 493 A2 | 8/1991 |
| EP | 0 524 877 A | 1/1993 |
| EP | 0 791 789 A | 8/1997 |
| EP | 1 000 786 A | 5/2000 |
| FR | 2 731 052 A | 8/1996 |
| GB | 1 604 277 A | 12/1981 |
| GB | 2 125 918 | 3/1984 |
| WO | WO 00 01991 A | 1/2000 |
| WO | WO 00 52380 | 9/2000 |
| WO | WO 01 16530 | 3/2001 |

* cited by examiner

Primary Examiner—Ljiljana Ciric

(57) ABSTRACT

A damper system for air handling systems the manipulation or control of air in an enclosure such as a building, a room of a structure such as a residence, and the like.

15 Claims, 39 Drawing Sheets

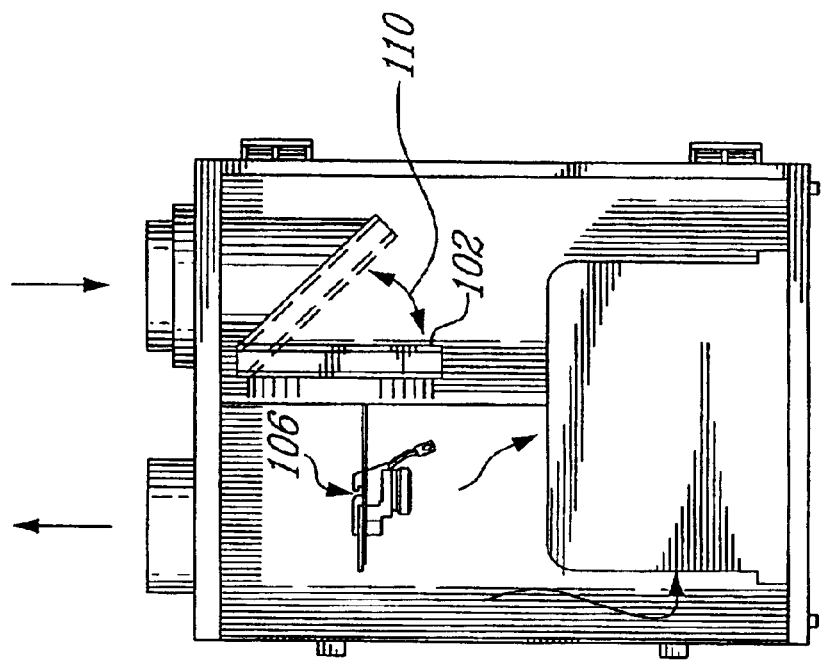
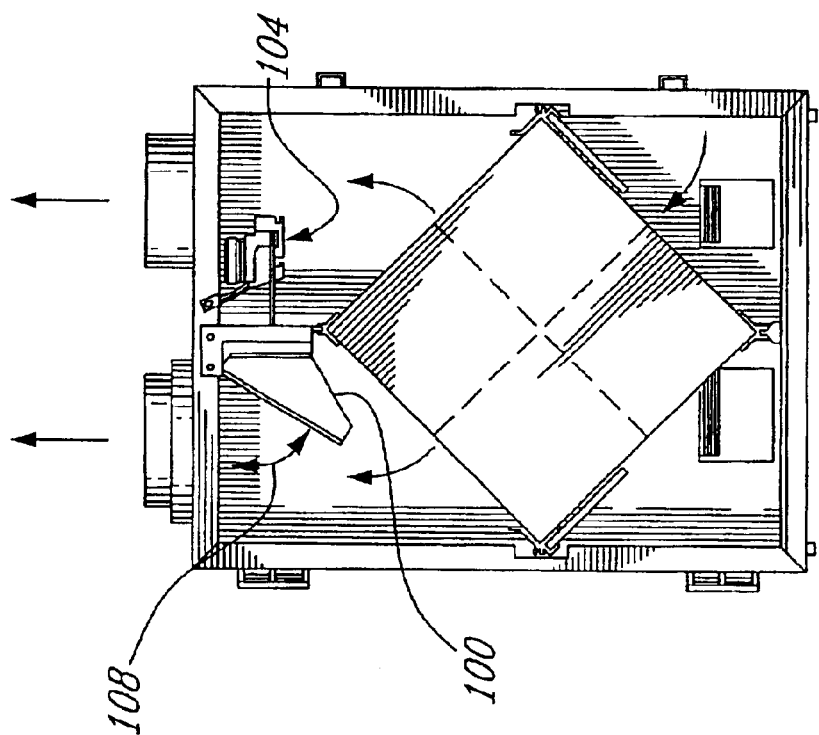

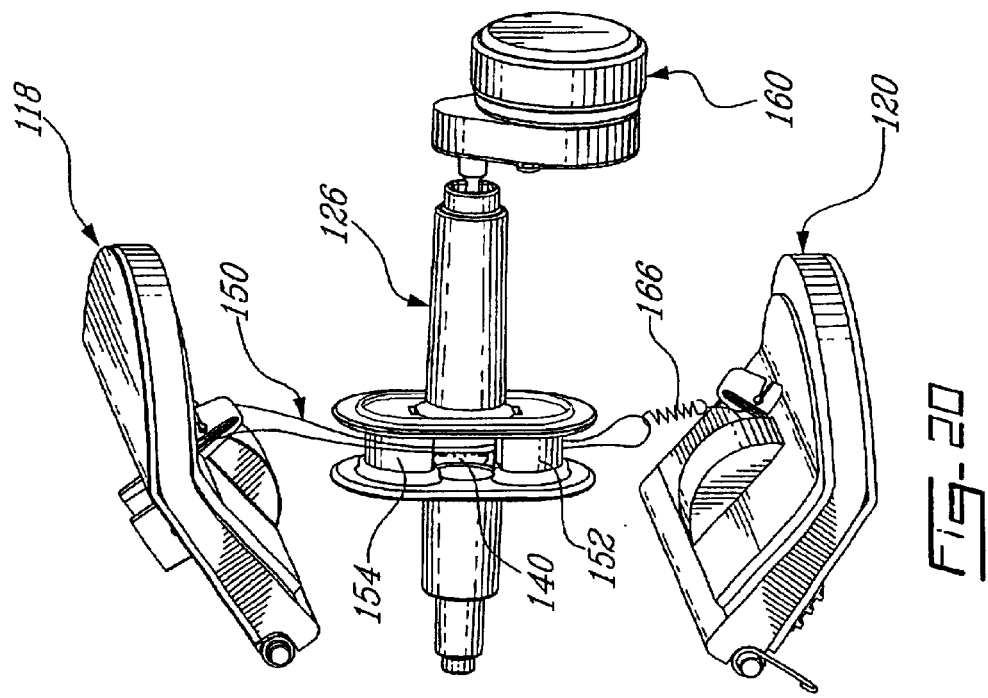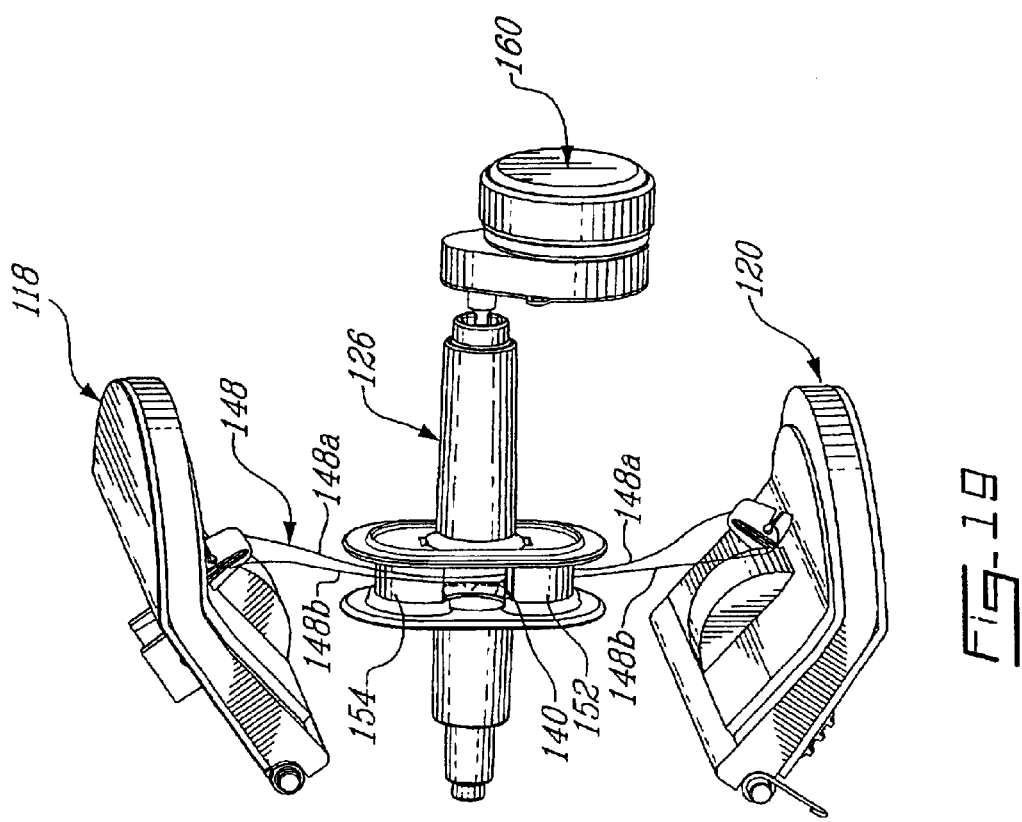

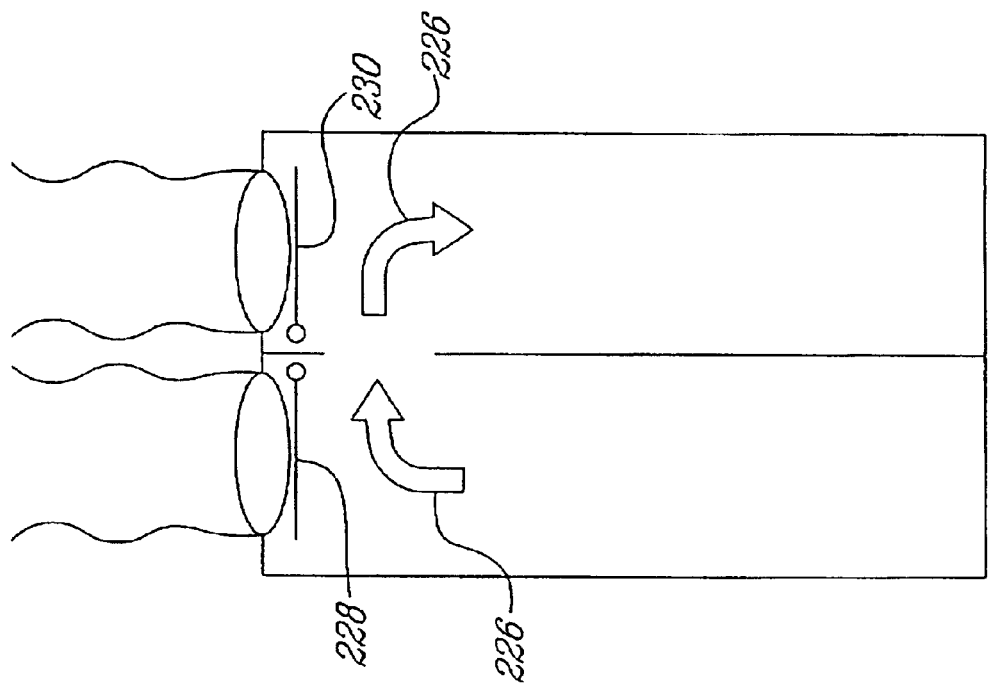
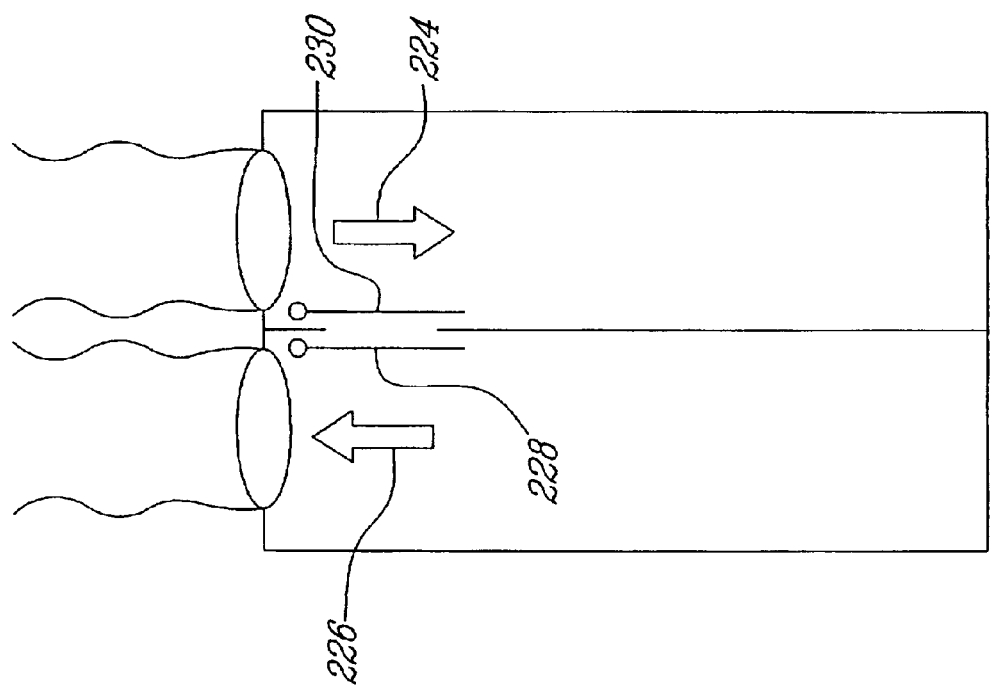

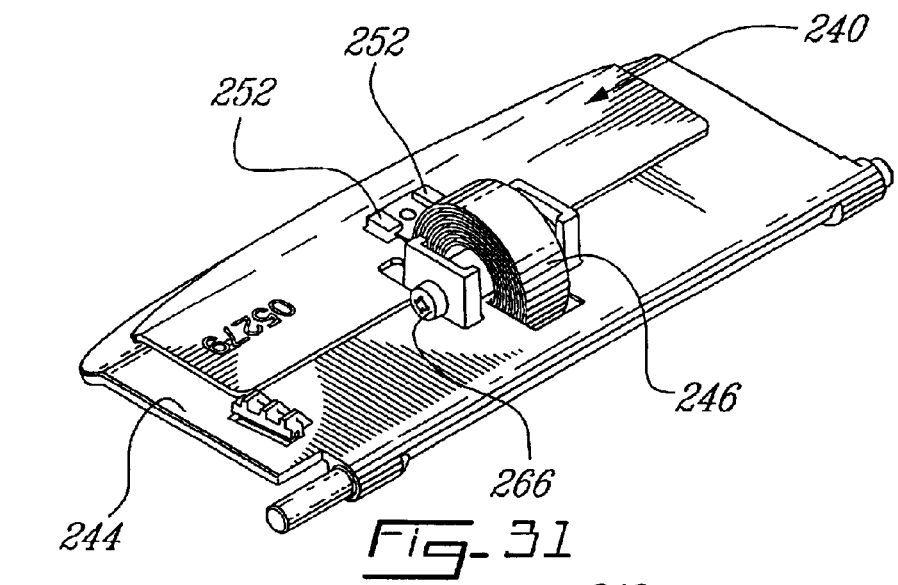
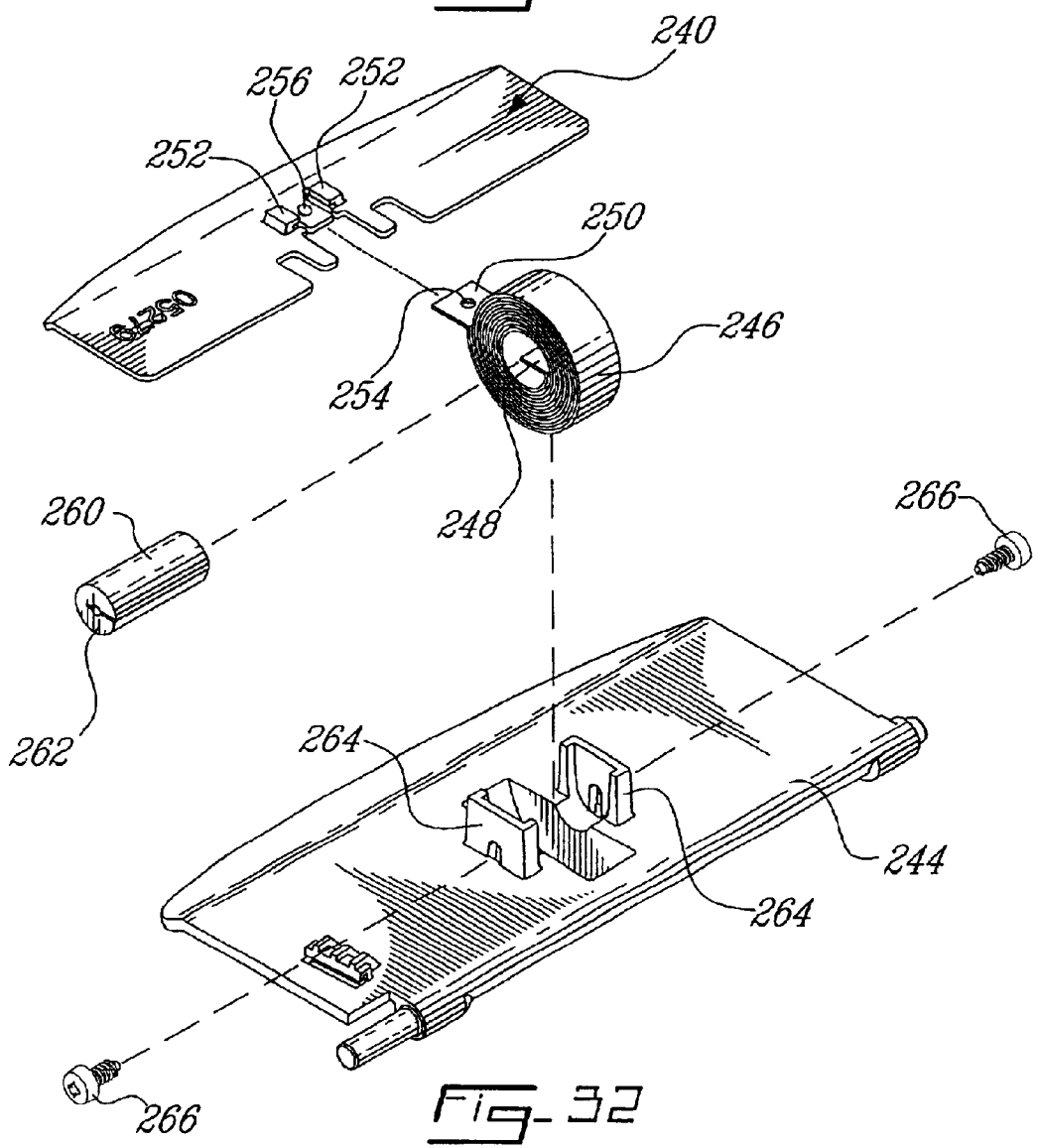

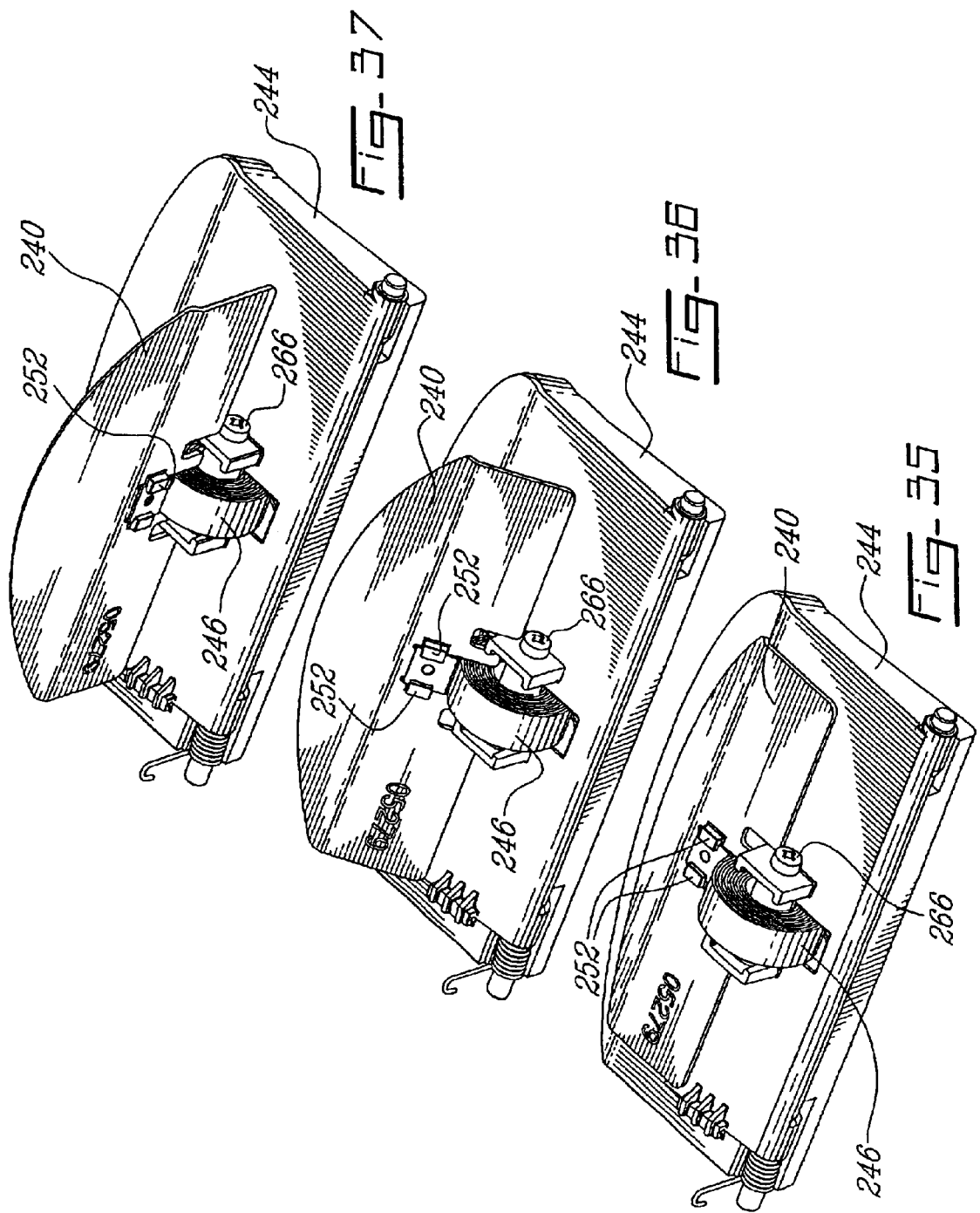

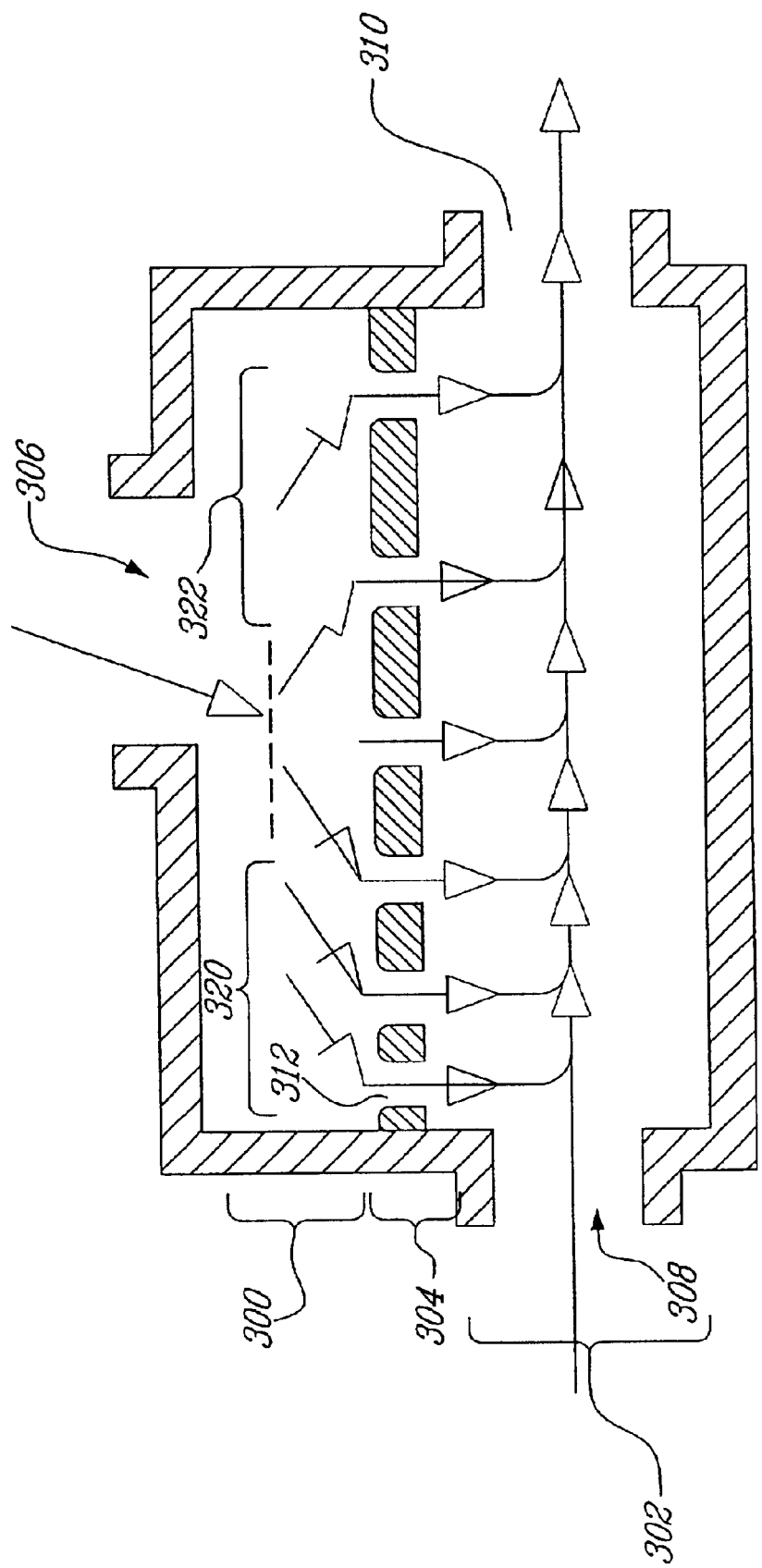

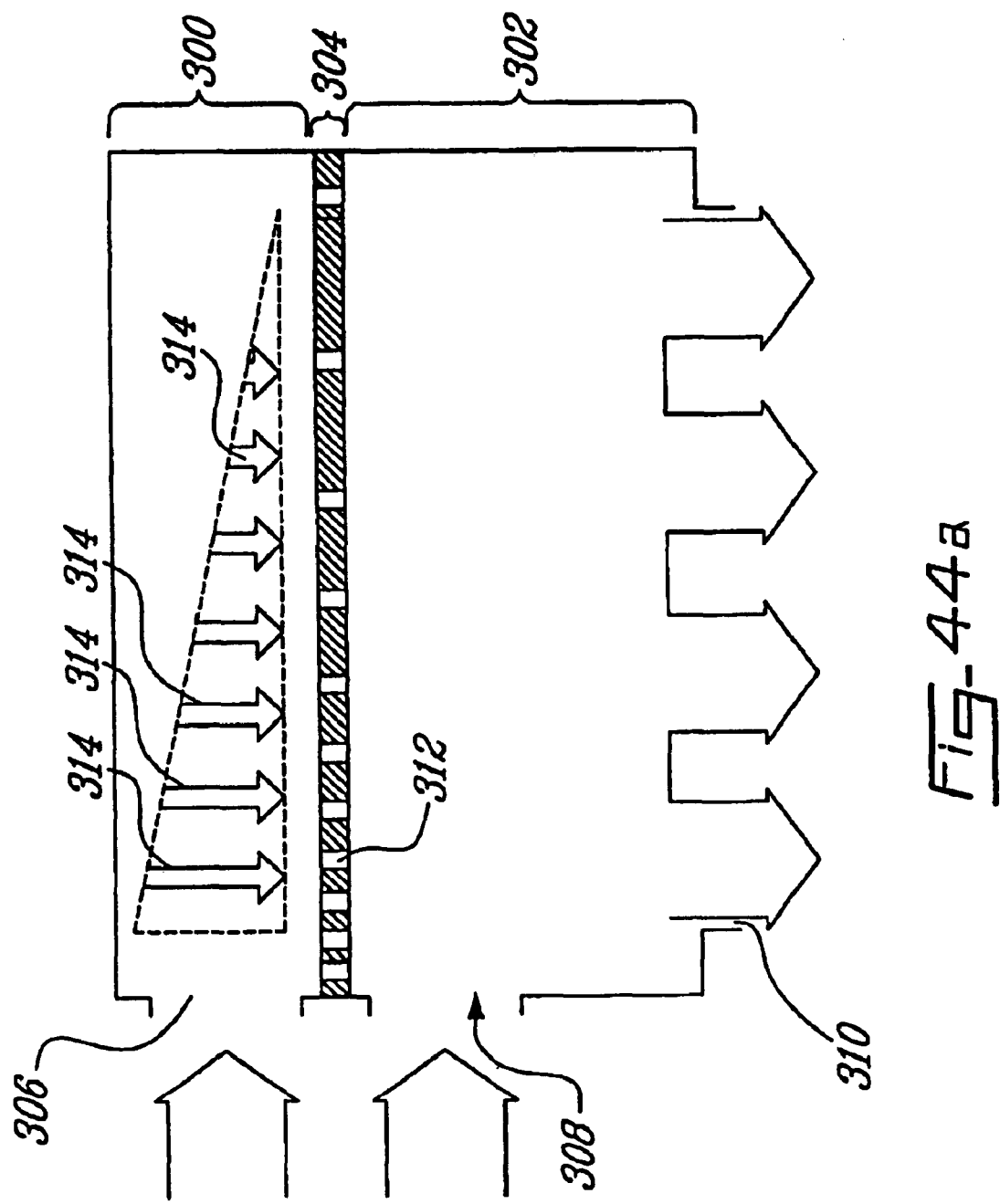

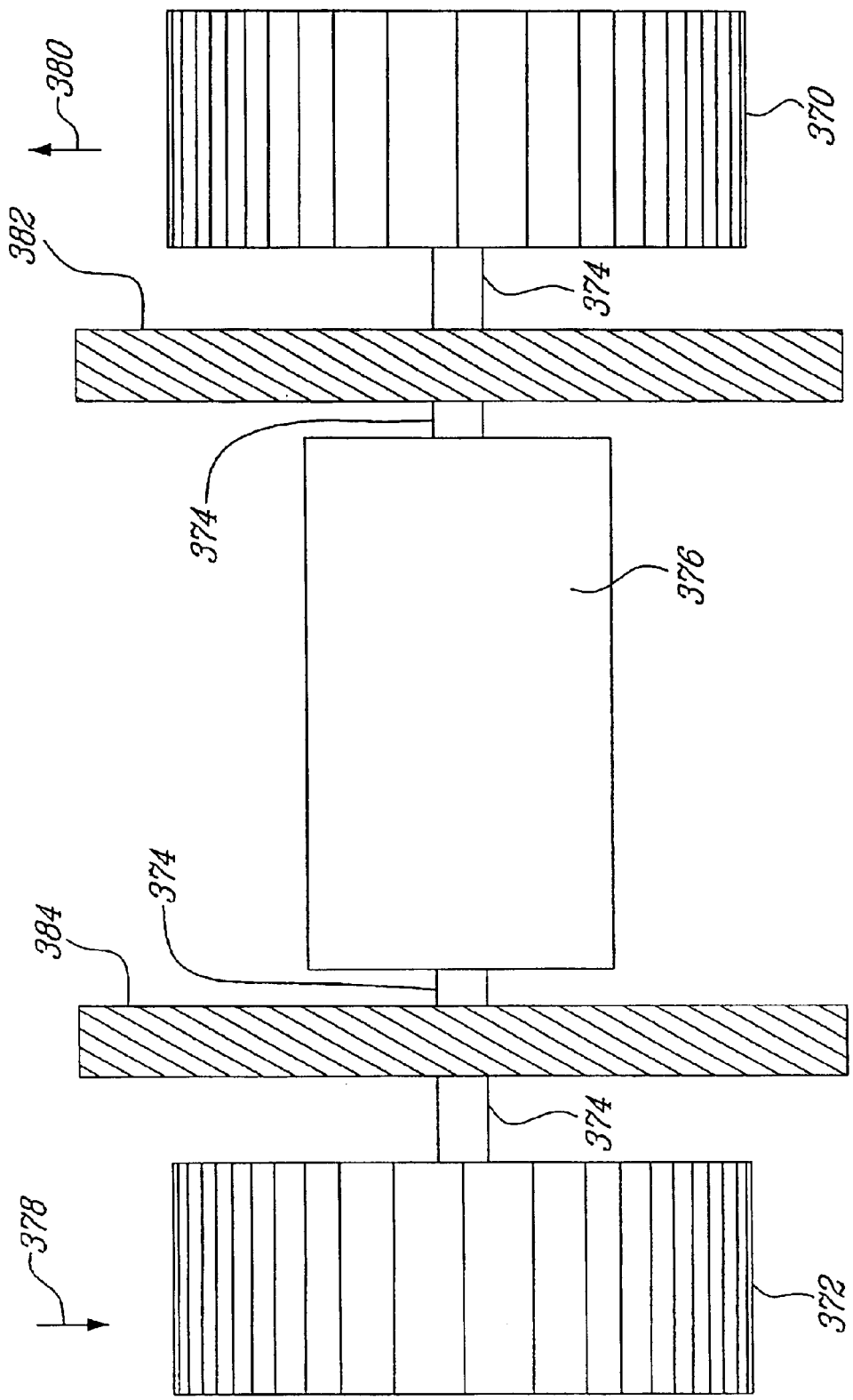

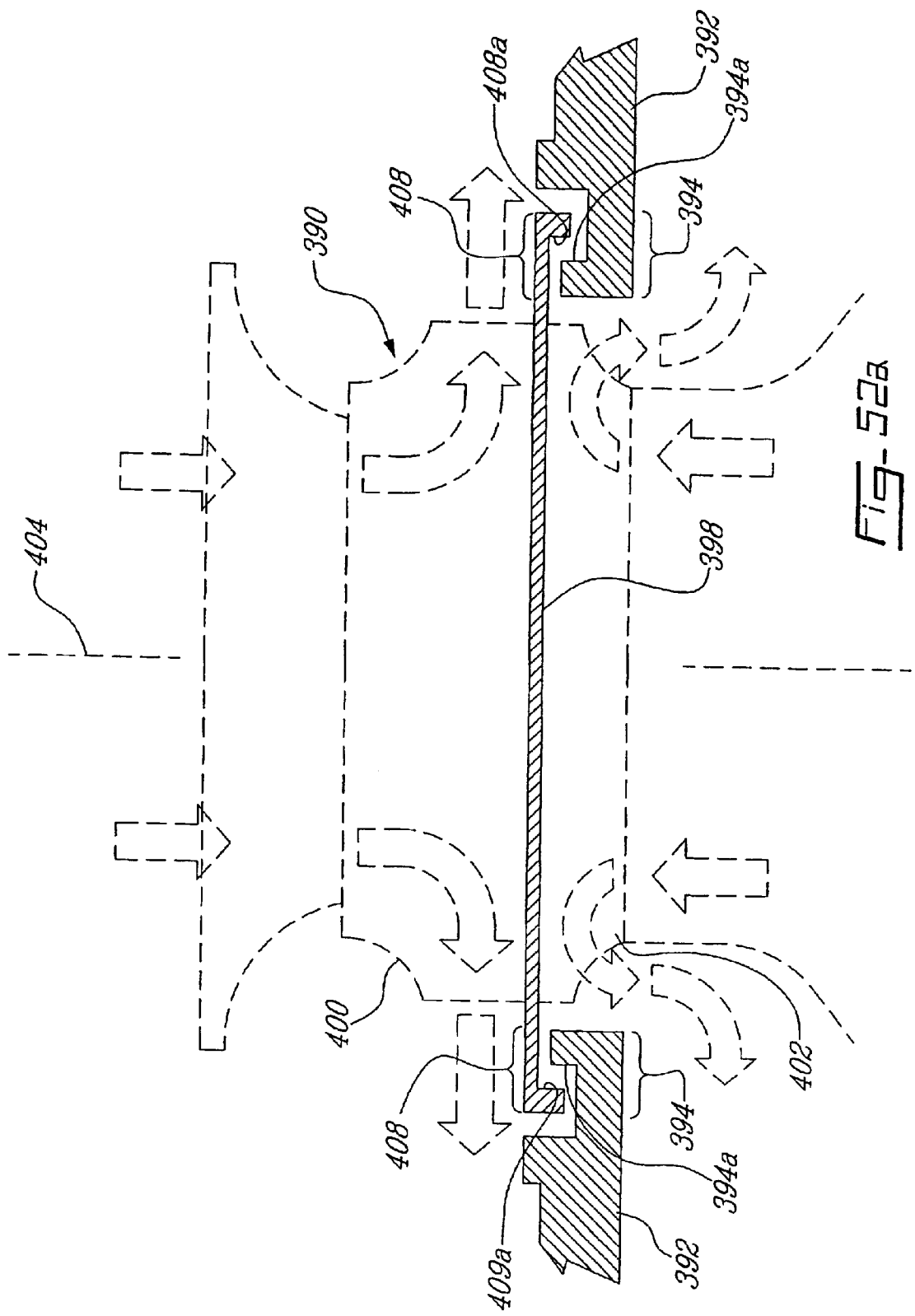

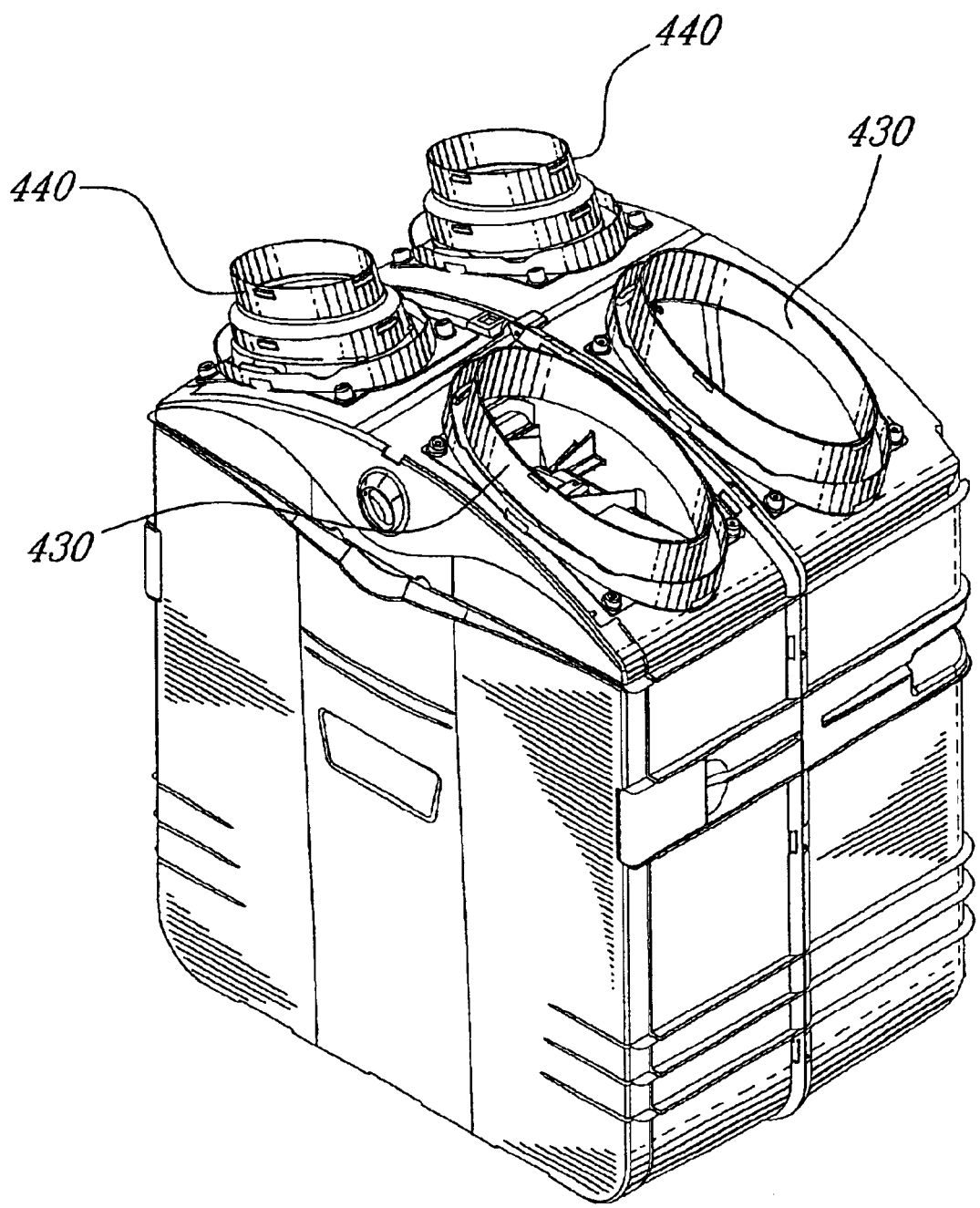
Fig_54

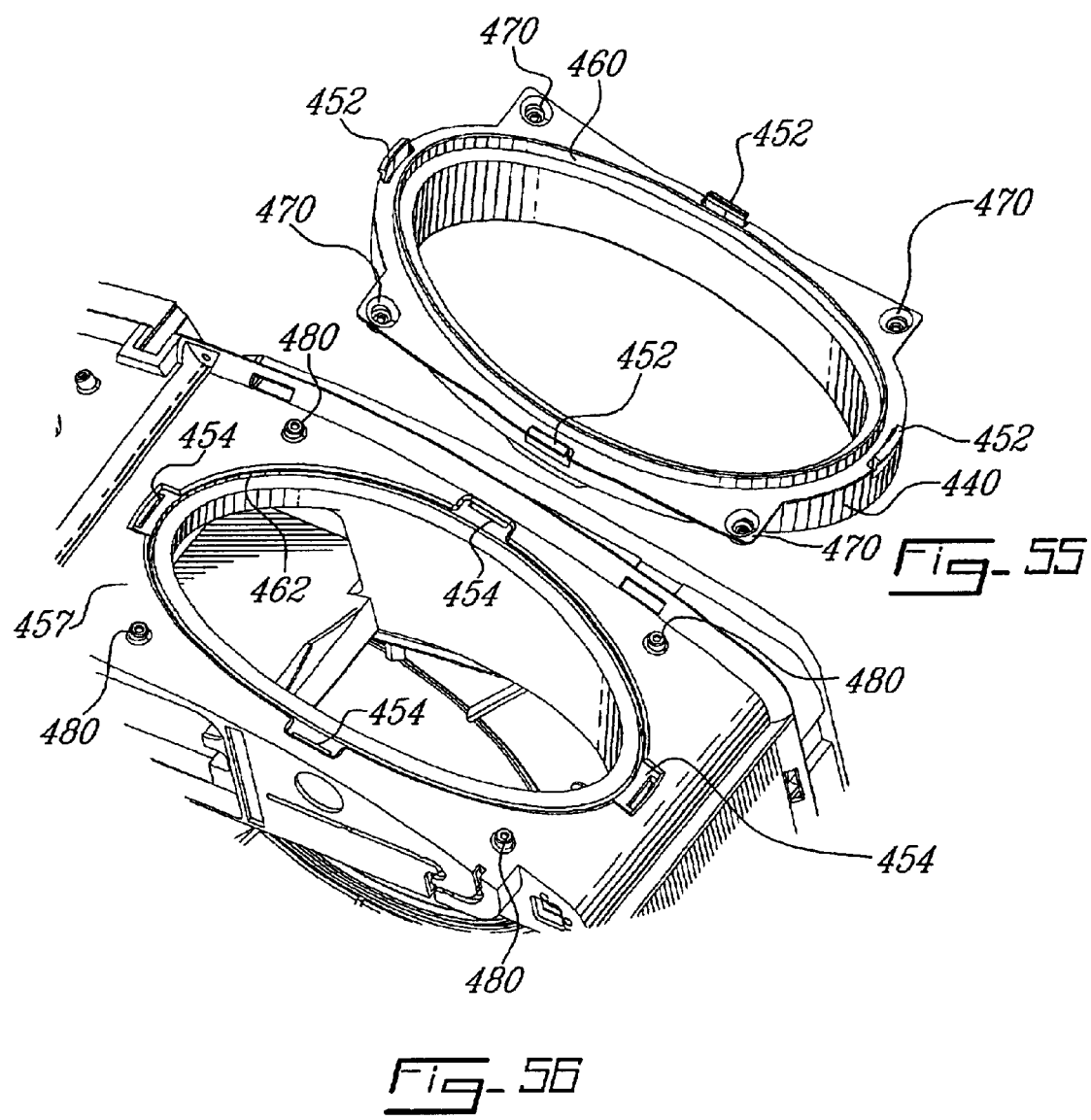

VENTILATION METHOD AND DEVICE

The present invention relates to various systems and apparati as well as devices and structures which may be used or incorporated into air handling systems (e.g. (air) ventilation and/or heating and/or filtration systems and apparati, etc.) for the manipulation or control of air in a enclosure such as a building, a room of a structure such as a residence, and the like. Such air handling systems (e.g. ventilation apparati or systems) may for example include an element for the transfer of heat from warm exhaust air (taken from inside an enclosure e.g. a building) to cooler exterior fresh air (drawn into the enclosure e.g. building). The present invention further relates to air handling systems (e.g. ventilation systems and apparati) which may not only exhaust stale interior air to the outside of an enclosure but as desired or necessary also intermingle a portion of such stale air with fresh air for delivery of the intermingled air back into the enclosure (during cold or warm weather). The present invention in particular relates to air handling systems (e.g. ventilation systems and apparati) which may exploit warm interior air as defrost air for defrosting the system during cool weather.

Heat recovery ventilation systems are known whose function is to draw fresh exterior air into a building and to exhaust stale interior air to the outside. The systems are provided with appropriate ducting, channels and the like which define a fresh air path and an exhaust air path whereby with the interior air of a building and the exterior ambient air may be exchanged; during ventilation the air in one path is not normally allowed to mix with the air in the other path. A heat recovery ventilator device which forms part of such a system is provided with corresponding air paths and also one or more heat exchange elements or cores.

Heat recovery ventilation devices may also have a housing or cabinet; such enclosures may for example be of sheet metal construction (e.g. the top, bottom, side walls and any door, etc. may be made from panels of sheet metal). The heat exchanging element(s), as well as other elements of the device such as, for example, channels or ducts which define air paths, filtration means, insolation and if desired one or more fans for moving air through the fresh air and exhaust air paths may be disposed in the enclosure. Such ventilation devices may be disposed on the outside of or within a building such as a house, commercial building or the like; appropriate insulation may be provided around any duct work needed to connect the device to the fresh air source and the interior air of the building.

U.S. Pat. No. 5,193,610, for example, as well as U.S. Pat. No. 6,209,622 describe ventilation devices which exhaust stale inside air from a structure such a house while delivering fresh outside air to the interior of the building; the entire contents of each of these patents is incorporated herein by reference.

As mentioned above, it is known to exhaust stale interior air of an enclosure to the outside of the enclosure. It is also known to intermingle stale exhaust air of an enclosure with fresh air for delivery of the intermingled air back into the enclosure; the intermingled air prior to delivery back to the enclosure may as desired or necessary be subjected to one or more treatment stages such as for example a filtration stage, a heat transfer stage, etc. A disadvantage of such known intermingling systems or apparati is that the entire stale exhaust air flow stream is intermingled with a fresh air flow stream to obtain an intermingled air flow of greater volume than that of the initial exhaust air flow; it is this greater volume of intermingled air that is then subjected to a filtration stage. The so treated (i.e. filtered) air is then split into a first portion for delivery back to the enclosure and a second portion for exhausting to the exterior of the enclosure. A drawback of such a known system is that the air exhausted outside the enclosure (e.g. dwelling) has been subjected to a filtration treatment stage, a heat transfer stage, etc. before exhaustion. This reduces the efficiency of a filtering/heat transfer/purifying capability of the system for the enclosure (e.g. dwelling).

It would be advantageous to have a ventilation method, system, apparatus or the like which avoids the exhausting of a portion of treated air (e.g. filtered, heat treated, etc.) to the exterior of an enclosure.

Ventilation systems and devices such as those shown in U.S. Pat. No. 5,193,610, as well as U.S. Pat. No. 6,209,622 are known to exploit damper systems which control the flow of air through the various ducts and channels thereof Such known damper systems may exploit dampers which are actuated (i.e. displaced from one position or configuration to another position or configuration) by means of rigid (metal) link rod(s) driven by a motor arm mounted directly on a damper actuation motor. These systems require significant precision to work properly because a slight variation in rod or arm length may result in improper damper closure. More particularly, such damper systems are used to control pairs (i.e. two) of dampers which respectively may close off or open a fresh air path as well as contemporaneously opening or closing off a stale exhaust air path. If one of the dampers fails to completely close while the other is still open, this may result in an air leak, which may lead to ice buildup under certain cold weather operating conditions.

It would therefor be advantageous to have a damper system which comprises a plurality (i.e. two or more) dampers which are to be contemporaneously displaced which is self aligning, i.e. if a damper closes before the other, an activation component will be able to continue to act on the unclosed damper until the second damper is fully closed It is also known that an ordinary ventilation unit, or system allowing air exchange with the exterior may cause discomfort like nose bleeding during the winter due to overdryness of air. It would be advantageous to have a damper means, which may be used to overcome this situation, and which reacts to constrict the flow of air asa function of temperature variations around the damper. It would in particular be advantageous if such a damper could react without recourse to an external (electrical) power source, i.e. the damper movement would be a purely mechanical device.

The present invention has a connector aspect. This connector aspect of the invention relates to a connector for securing together two elements at least one of which is of material having a relatively poor or weak gripping characteristic with respect to screw type attachment devices and/or bolt/nut attachment devices. The connector may be used to avoid stress concentration in the area of attachment.

The mentioned material, for example may have a relatively weak grip (or strength) on the screw threads of the thread part of the screw part embedded therein such that the screw thread end may be relatively easily dislodged from engagement with the material in which it is embedded. The attachment strength of the attachment device is therefor relatively weak.

It would be advantageous to have connector which may be attached to a structure of a friable material with a screw or similar attachment means but wherein the threaded part of the screw is screw engaged with the connector not the structure per se. It would also be advantageous to have a connector which may have an additional engagement component for connection to another structure.

The present invention also has an air diffuser aspect. This aspect of the present invention relates to means and mechanisms by which a first air stream or flow may be intermingled with a second air stream or flow.

It is known for example to provide an air a handling system which provides for the mixing of a cold (and possibly dry) air stream with a hot (and possibly humid) air stream. However, the intermingling or mixing of such streams may lead to the presence in the system of undesirable or unwanted water condensation and even snow or ice buildup; this is especially so if a cold/dry flow of air (exterior air) is merely brought into contact with the a flow of high humidity warm/hot air (interior air such as from a dwelling) during winter conditions. On the opposite side a similar undesirable water buildup (i.e. a liquid or solid) may occur in an air handling system if fresh hot humid outside air is contacted with relatively cool stale dry inside air (i.e. hot summer conditions).

It would be advantageous to have means or mechanism for an air handling system (e.g. an air ventilation system) whereby the mixing or intermingling of one air stream with a second air stream may be manipulated so as to provide a staggered or staged (i.e. gradual) mixing of one air flow into another air flow.

It would be advantageous for example to be able to manipulate air flow such that a first air stream may be split into sub-portions or sub-streams which may be gradually (e.g. sequentially) brought into contact with a second air stream in (intermittent or continuous) stages rather than being intermingled in a more or less single shot process It would in particular be advantageous to have a dispersal or dispensing mechanism which would be able to provide for a graduated intermingling of one air flow with another air flow.

It would further be advantageous to be able to associate with any air intermingling means (whether known or as described herein) a temperature responsive means able to choke off (once a predetermined cut-off fresh air temperature is reached, e.g. a too low outside air temperature) the inflow of a first (i.e. fresh air) air flow to the intermingling means and the out flow of a second (stale air) air flow with respect to an enclosure (e.g. dwelling), namely once a predetermined air inflow temperature is reached fresh air inflow and stale air exhaust (i.e. outflow from an enclosure) is inhibited or stopped outright (e.g. stale air may be merely recycled back to an enclosure without any added fresh air).

The present invention has a further blower assembly aspect. This (blower) aspect of the present invention relates to a blower wheel assembly which is provided with first and second blower wheels mounted on a common rotor shaft.

It is known to mount first and second spaced apart blower wheels on a common motor rotor shaft for use in a ventilation apparatus wherein one blower is to be associated with a fresh air stream and the other with a stale or exhaust air stream. For such an arrangement it is known to pass the portion of the motor rotor shaft associated with one blower through a respective baffle wall with the motor separated from the two air streams by both baffles, i.e. the motor is sandwiched between the pair of baffle walls. The air handling apparatus in which such blower assembly is incorporated must be relatively large to accommodate the blower structure. Additionally removal for servicing of the motor and/or blowers is complicated by the fact that the motor mus usually be separated from the blowers while still in the air handling apparatus.

It would be advantageous to have a relatively compact blower assembly for association with a motor. It would also be advantageous to have a blower assembly (which may be associated with a motor) which would facilitate servicing of an air handling system (e.g. apparatus) in which it is incorporated by allowing the blower assembly (and associated motor) to be removably as a single unit from the air handling system.

The present invention additionally has a mounting port aspect. This (port attachment/sealing) aspect of the invention relates to a mounting port of the type for connection to an opening means which may or may not exploit attachment means of the snap or quick connect type. The snap type of connectors are known and may exploit mateable male and female elements which are of materials or construction which promote spring like characteristic which allow for the quick connect or release of elements.

A difficulty with respect to such quick connect ports relates the sealing of the port to the inlet of an air pathway of an air handling apparatus, i.e. there is a tendency to leak unless a sealing element is provided.

It is also known to use a mounting port which is limited for attachment to single size duct.

It would be advantageous to have mounting port for an air opening for an air handling apparatus able to a provide a self air seal capability in cooperation with an air opening of a system. It would in particular be advantageous to have quick connect mounting port for an air opening for an air handling apparatus able to a provide a self air seal capability in cooperation with an air opening element of an air handling system (e.g. apparatus).

It would also be advantageous to have a versatile mounting port which could be attached to ducts of different sizes, i.e. to be able to reduce the number of different parts necessary for a system.

Ventilation Method

Statement of Invention

In one aspect the invention allows for a method for introducing fresh air to and exhausting stale air from an air handling system or apparatus associated with an enclosure such as for example a system having a ventilation circuit comprising the steps of:

- exhausting a portion of the stale air from the circuit (i.e. enclosure) to create a reduced stale air stream;
- introducing an amount of fresh air into the reduced stale air stream to create a mixed or intermingled air stream; and as desired or necessary filtering the mixed or intermingled air stream.

More particularly the present invention provides, a method for introducing fresh air from outside an enclosure into stale air from the enclosure (e.g. in a ventilation circuit) comprising the steps of:

- splitting a stale air flow from the enclosure into a first exhaust air flow stream for exhaustion (i.e. from the enclosure or circuit) and a reduced stale air flow stream;
- introducing (a predetermined amount of) fresh air from outside the enclosure into the reduced stale air stream so as to create or obtain an intermingled (i.e. a mixed) air stream; and optionally or as desired
- filtering the intermingled (i.e. mixed) air stream to obtain a filtered intermingled air stream. The so obtained intermingled (i.e. a mixed) air stream or a so obtained intermingled filtered air stream may as desired be delivered directly into an enclosure or as desired or necessary be subjected to one or more a other or further treatment stages (e.g. heat exchange stage, a filtering stage, a humidification stage, a de-humidification stage, etc.).

In another aspect the invention allows for a device for introducing fresh air to and exhausting stale from air in an enclosure (e.g. a ventilation circuit) comprising:

means for exhausting a portion of the stale air from the enclosure air handling circuit to create a reduced stale air stream;

means for introducing an amount of fresh air from the exterior or outside of the enclosure into the reduced stale air stream to create a mixed air stream; and means for delivering the mixed or intermingled air stream or flow to the ventilation circuit, and if desired filtering the mixed or intermingled air flow.

More particularly the present invention provides, a system, (e.g. device, apparatus etc.) for introducing fresh air from outside an enclosure into stale air from the enclosure (e.g. in a ventilation circuit wherein air is taken from an enclosure to be treated and/or exhausted) comprising:

an air splitter component for splitting an exhaust stale air flow from an enclosure into a first exhaust air flow stream for exhaustion (e.g. from the ventilation circuit) and a reduced stale air flow stream;

an air intermingling component for introducing (i.e. a predetermined amount of) fresh air from outside the enclosure into the reduced stale air stream so as to create or obtain an intermingled (i.e. a mixed) air stream; and optionally or as desired an air filtering component for filtering the intermingled (i.e. mixed) air stream so as to obtain a filtered intermingled air stream. A so obtained intermingled (i.e. a mixed) air stream or a so obtained intermingled filtered air stream may as desired be delivered directly into an enclosure or as desired or necessary be subjected to one or more a other or further treatment means or stages or components (e.g. heat exchange component, filtering component, a humidification stage, a de-humidification stage, etc.).

Damper System and Auto Activating Choker

Statement of Invention

The present invention allows for a damper displacement system for displacing a plurality of damper elements or components (eg. two or more) between a first (e.g. open/closed) position and a second (e.g. closed/open) position.

The damper displacement system, may, for example, comprise a displacement component comprising a rotatable component or element; and a a flexible (e.g. wire or wire-like) component or element (e.g. a single wire or a wire loop) connecting said damper elements and rotatable component. Alternatively, the displacement component instead of having a rotational actuation element may Instead have a linear actuation element which is able to engage the flexible (e.g. wire or wire-like component.

The flexible elongated element may be of any suitable configuration and may in particular be elastic or non-elastic; e.g. the flexible elongated element may be of a suitable (known) elastic or non-elastic material. In accordance with the present invention each of the damper elements may, for example, if so desired or necessary, be associated with a damper biasing element for biasing the damper element in a first position (e.g. in a first closed position).

The damper displacement system, may, for example, comprise a displacement component comprising a rotatable (central) component or element having an aperture or hole; and a a flexible elongated component or element (e.g. a single wire or a wire loop) connecting said damper elements and threaded through and slidably seated in said hole. The wire component may be single component and a rotatable central or intermediate component may be disposed such that the central or intermediate component can be caused to rotate thereby winding the wire around said rotatable central component and causing the plurality of damper components to be displaced. The wire component and the central component may, for example, also be disposed such that when the central component is not caused to rotate a damper biasing means, if present, may be able to cause the wire to unwind from the central component thereby allowing the plurality of damper to close (e.g. contemporaneously). Alternatively, if no biasing means is present the displacement component may comprise a two part wire component wherein each wire part is independently attached or engaged with the central component such that while one wire part is being wound up the other wire part is being unwound. In this two part wire component case, the wire parts may, for example, each be independently attached to the dampers such that rotation of the central part in one direction (e.g. clockwise) causes the wire part being wound up to urge the dampers to be displaced from an initial position to a different position while the other wire part retreats (i.e. is unwound) and vice-versa when the central part is rotated in the opposite (anti-clockwise) rotational direction (i.e. the displacement component may be in the form of a type of push-pull type arrangement).

Thus in accordance with an aspect the present invention provides a damper system (for an air handling system (e.g. apparatus, device, etc.; e.g. a ventilation apparatus)) comprising a plurality of (i.e. two or more and in particular two) damper elements, each of said damper elements comprising a respective connector element, each of said dampers being displaceable from a respective first position to a respective second position and a displacement component for displacing said damper elements from a respective first position to a respective second position said displacement component comprising a flexible (i.e. elastic or non-elastic) elongated damper interconnection element, and a displacement element comprising an engagement component, wherein said elongated damper interconnection element is connected to the engagement component of said displacement element and to the connectors of each of said dampers, wherein said displacement component is configured (and disposed) such that said displacement component is reversibly displaceable (i.e. is able to pass) between a first configuration wherein said dampers are each in respective first positions and a second configuration wherein said dampers are each in respective second positions, said displacement component being configured such that as said displacement component passes (i.e. shifts) from said first configuration to said second configuration, said displacement component induces displacement of each of said dampers from a respective first position to a respective second position and wherein said displacement component is configured such that as said displacement component passes from said first configuration to said second configuration so as to induce displacement of said dampers from a respective first position to a respective second position and one or more of said dampers trail(s) one or more of (the) other damper(s) in respect of its (their) displacement to (i.e. its arrival at) its (their) respective second position, the displacement component, once any leading damper(s) has/have (stopped) arrived at, traveled to or reached its (their) second position, is able to continue its displacement and thereby induce any (i.e. each of) the trailing damper(s) to be displaced to its (their) second position while any leading damper(s) is/are maintained at its (their) second position.

In accordance with the present invention the displacement component may comprise a (windup) pulley or bobbin element (reversibly) rotatable about an axis of rotation and wherein said bobbin element is rotatable around said axis for winding up and paying (i.e. unwinding) out said elongated damper interconnection element, said dampers being displaceable from a respective first position to a respective second position as said elongated damper interconnection element is wound up.

In accordance with the present invention the (wind-up) pulley or bobbin element or rotatable central component may be connected to a motor component, said motor component being capable of rotating the pulley or bobbin element or the rotatable central component.

In accordance with the present invention there is in particular provided a damper system (for an air handling system (e.g. apparatus, device, etc.; e.g. a ventilation apparatus)) comprising two damper elements, each of said damper elements comprising a respective connector element, each of said dampers being displaceable between a respective first position to a respective second position and a displacement component for displacing said damper elements from a respective first position to a respective second position said displacement component comprising a flexible (i.e. elastic or non-elastic) elongated damper interconnection element, and an intermediate (wind-up) pulley or bobbin element (reversibly) rotatable about an axis of rotation, said bobbin element comprising an engagement component engaging said elongated damper interconnection element, wherein said elongated damper interconnection element is connected to the engagement component of said bobbin element and to the connectors of each of said dampers, wherein said bobbin element is rotatable around or about said axis for winding up and paying (i.e. unwinding) out said elongated damper interconnection element, said dampers being displaceable from a respective first position to a respective second position as said elongated damper interconnection element is wound up, said displacement component being configured such when said bobbin element is rotated about said axis so as to induce said elongated damper interconnection element to be taken up by said bobbin element (i.e. wound about) and one of said damper elements trails the other damper in respect of its displacement to (i.e. its arrival at) its respective second position, the bobbin element, once the leading damper element has arrived at or reached its second position, is able to continue to rotate and thereby induce the trailing damper element to be displaced to its second position while the leading damper element is maintained at its second position.

The present invention further provides a damper system wherein said elongated damper interconnection element has a first side member and a second side member, wherein said first side member engages the connector of one of said dampers and said second side member engages the connector of the other of said dampers, wherein said bobbin element is rotatable around said axis for winding up and paying (i.e. unwinding) out said first and second side members, said dampers being displaceable from a respective first position to a respective second position as said first and second side members are wound up, said displacement component being configured such when said bobbin element is rotated about said axis so as to induce said first and second side members to be taken up (i.e. wound about) and one of said dampers trails the other damper in respect of its displacement to (i.e. its arrival at) its respective second position, the bobbin element, once the leading damper has arrived at or reached its second position, is able to continue to rotate and thereby induce the trailing damper to be displaced to its second position while the leading damper is maintained at its second position.

The present invention further provides a damper system wherein said damper interconnection element is a flexible (continuous or non-continuous) loop shaped damper interconnection element having a first loop end and a second loop end and defining a first flight side and an opposed second flight side, said first and second flight sides each being connected respectively to said first and second ends, wherein said bobbin element comprises a slippage engagement component for slippingly engaging said first and second flight sides, said bobbin element defining an aperture or hole, said slippage engagement component comprising two take-up elements and said aperture, said aperture being disposed between said take-up elements, said first and second flight sides each being threaded through said aperture, wherein each of said damper connector elements comprises a respective loop connector, wherein said first end engages one of said loop connectors and said second end engages the other of said loop connectors, wherein said bobbin element is rotatable around said axis for winding up and paying (i.e. unwinding) out said first and second flight sides, said dampers being displaceable from a respective first position to a respective second position as said first and second flight sides are wound up, said bobbin element being configured such that rotation thereof about said axis (e.g. in a first rotational direction) induces said first and second flight sides to be taken up (i.e. wound about) by the take-up elements so as to wind the first and second flight sides about the bobbin element and thereby induce the damper elements to be displaced from said first to said second position said displacement component being configured such when said bobbin element is rotated about said axis so as to induce first and second flight sides to be taken up (i.e. wound about) and one of said dampers trails the other damper in respect of its displacement to (i.e. its arrival at) its respective second position, the bobbin element, once the leading damper has arrived at or reached its second position, is able to continue to rotate and thereby induce the trailing damper to be displaced to its second position while the leading damper is maintained at its second position.

A damper system as defined herein may also include an electric motor component connected to said bobbin element such that when said motor component is energized (i.e. connected to a suitable source of electrical power such as by a suitable electrical switch) said motor component (i.e. the motor rotor) is capable of rotating the bobbin element in a rotational direction for displacing two damper elements from a respective first position to a respective second position; the rotational direction may be clockwise or anticlockwise as the case may be. The motor component may be a reversible motor component i.e. a motor which is energizable such that the motor rotor may be made to rotate under power in a clockwise or anticlockwise (i.e. counterclockwise) rotational direction (e.g. depending on the polarity of the electrical connections connecting the motor to the power source); alternatively the motor may for example be one which is energizable in a single rotational direction and which once de-energized will not inhibit reverse rotation of a bobbin element due to the influence of a bias spring. The motor may be of a (known) type which may be constantly on (i.e. continually powered up) to maintain the damper in a desired position against the tension applied by a biasing means (e.g. spring); once the electrical power to the motor is turned off the (tension) biasing spring is of a type able to apply sufficient force to overcome the internal resistance of the motor itself (e.g. drive gear friction, magnetic torque, etc). As a further alternative if no biasing means is used then a motor may be used wherein the internal resistance of the motor itself (e.g. drive gear friction, magnetic torque, etc) is able to maintain (i.e. brake) the dampers in position; the motor may be part of a push-pull damper displacement configuration for urging the dampers back and forth between different positions.

A damper system as described herein may comprise an electric switch element configured so as to be able to energize and de-energize said motor; the electric switch may be controlled manually and/or automatically. If automatic control is desired then any suitable or appropriate sensing means may be exploited. The sensing means may, for example, be of a type able to provide a suitable signal(s) indicative of the damper position (e.g. a closed or open position). Any such signals may be directed to any type of suitable (known) electrical power source having an on/off switching component controllable by such signal(s). The sensing means may take any other suitable form; it may for example comprise a mechanical or magnetic switch disposed so as to cut-off electrical power to a motor once a damper has tripped the switch by displacement to a predetermined position.

As mentioned above, the present invention provides damper systems wherein each of said dampers may optionally be associated with a respective bias member (e.g. spring biasing member) biasing a damper in its respective first position. If a biasing member is present the motor may, as mentioned above, be energizable such that the motor rotor is forced to rotate under power in a single direction to induce winding up of a flexible elongated element; once power is cut off then rotation of the motor rotor in the opposite direction under the influence of a bias member may bring the damper back to the biased position. Alternatively, such biasing means need not be used if the motor is of a reversible type and the displacement element is for example connected to the dampers via the displacement element by first and second elongated members in a push-pull type arrangement as mentioned herein.

The present invention further relates to an air handling system (e.g. apparatus, device, etc.) comprising a damper system as defined herein.

In accordance with the present invention a connector element of a damper element may be a non-slippage connector or a slippage connector as described herein and/or may include an extensible member (e.g. a spring member, an elastic member, etc.) connecting the elongated component to a damper.

In accordance with the present invention a damper displacement system may comprise dampers wherein each of said dampers is as mentioned herein be associated with a respective spring bias member biasing a damper in its respective first position.

In accordance with the present invention a damper displacement system may comprise an electric motor component connected to the bobbin element such that when said motor component is energized (i.e. connected to a suitable source of electrical power such as by a suitable electrical switch component as described herein) said motor component is capable of rotating the bobbin element in a rotational direction for displacing two damper elements from a respective first position to a respective second position.

In accordance with the present invention the motor component may be configured as mentioned herein such that once the motor component is disconnected from the source of electrical power it will nevertheless maintain the dampers in their respective second positions (e.g. the motor component may include some type of type of specific braking mechanism or braking may be accomplished due to internal frictional or torque producing elements of the motor component). In this case the motor component may be a reversible motor component (i.e. comprise a reversible motor and be associated with suitable control elements for facilitating such reverse rotation). In this case for example the motor component may as discussed be used to rotate the bobbin element in the opposite rotational allowing any biasing member to urge the dampers to their respective first position.

On the other hand the motor component may a mentioned be configured such that as long as the motor component is energized it will maintain the dampers in their respective second positions. However, once the motor component is disconnected from the source of electrical power it will not act against any biasing member associated with the damper such that the biasing member is able to induce the damper to return io its first position. In this case, because the dampers are individually spring mounted, it makes the system very safe. For example, if the first position to which the dampers are biased is the closed position, wherein the dampers are arranged to prevent air exchange with the exterior, then if a power failure occurs or if the damper loop (e.g. wire) breaks, the dampers (in the second position) will return to their fully closed position, which will prevent air exchange with the (cold) exterior (i.e. this defines an auto shut off feature).

Thus in accordance with the present invention a damper displacement system may comprise a motor component wherein the motor component is a reversible motor component.

In accordance with the present invention a damper may be connected in any suitable (known) fashion to a pivot connect member and be associated with air duct formations such that the damper is disposed and configured so as to be able to pivot or rotate about the pivot connect member between a first (e.g. fresh air open (or stale air closed)) position and a second (e.g. stale air closed (or fresh air closed) position. Such configurations may, for example, be seen in the before mentioned U.S. Pat. No. 5,193,610 and U.S. Pat. No. 6,209,622. A damper may in particular be associated with a bias (e.g. spring) component which tends to maintain a damper in a predetermined position (e.g. either closed or open as the case may be).

It is to be understood herein that the reference to a slippage connector(s) and the slippage engagement element is to be taken as meaning that said bobbin element and said one or more slippage connector elements are configured such that as said loop is being wound up and the loop on one side of the bobbin element becomes taut any slack between the bobbin element and the loop on the other side of the bobbin element is compensated for or overcome by further rotation of the bobbin inducing slippage of the loop in a pulley like action about a slippage connector, a take-up element and said aperture, i.e. any slack is overcome by one flight side of the loop moving towards the slippage connecter while the other flight side moves away from the slippage connecter (i.e. as the loop slips about the slippage connector) in a pulley like action so as to shorten the free unwound length of the loop between the bobbin element and a damper element (not fully in the second position).

In accordance with the present invention an intermediate (wind-up) pulley or bobbin element may have opposed (aligned) grooved bobbin ends; the bobbin element defining an aperture or opening element between said ends through which the first and second flight sides may each be threaded.

In accordance with the present invention each of said dampers may comprises a respective loop connector; if desired or necessary at least one of said loop connectors may be a slippage connector As may be appreciated a bobbin element may be incorporated into a ventilation apparatus, device or system in any suitable or desired manner keeping in mind its purpose i.e. to act a kind of reel component. It may thus be connected (directly or indirectly) to a support structure (e.g. of a ventilation device or apparatus) for facilitating the winding up and paying (i.e. unwinding) out said flexible loop member.

In accordance with another aspect the present invention provides a temperature actuatable damper (for use with an air handling system, e.g. apparatus, device, etc. e,g. a ventilation system), said damper comprising a choker damper component and an actuator component for connecting the choker damper component to a support for inducing the damper component to be displaced (e.g. pivoted) between a first position and a second position, said actuator component comprising a temperature responsive actuator element configured to pivotally (i.e. rotationally) displace the choker damper component in response to ambient air temperature about said temperature actuator element, between a first position and a second position, said first and second positions falling within a range consisting of a position in an air flow path wherein the choker damper component presents a predetermined maximum constriction position (e.g. large impediment) and a position in the air flow path wherein the choker damper component presents a predetermined minimum constriction position (small impediment).

The present invention in accordance with a further aspect provides a damper assembly (for use with an air handling system, e.g. apparatus, device, etc. e,g. a ventilation system), said damper assembly comprising a base damper component comprising a damper plate have a broad side face and a pivot connect component for pivotally (i.e. rotational) connecting the damper plate to a support, and an actuator connector for connecting the damper plate to an actuation component for inducing the damper plate to be displaced (i.e. pivoted) between a first position and a second position a choker damper component comprising a pair of opposed broad side faces (i.e. a plate) and a temperature responsive pivot component pivotally attaching or connecting the choker damper component to said broad side face of the base damper component said pivot component being configured to pivotally (i.e. rotationally) displace the choker damper component in response to ambient air temperature about said pivot component, between a first position and a second position, said first and second positions falling within (i.e. being selected from) a range consisting of a position wherein the broad side faces of the choker component are disposed (e.g. at least substantially) parallel to said broad side face of the base damper component and a position wherein the broad side faces of the choker component are disposed transverse (e.g. perpendicular) to said broad side face of the base damper component.

The present invention in accordance with an additional aspect provides in a ventilation system or apparatus, for exchanging air between the interior and exterior of an enclosed space (i.e. of a building, room or the like), said ventilation system or apparatus having a fresh air path means defining a fresh air path for a flow of fresh air between a fresh air intake and a fresh air discharge, and an exhaust air path component defining a fresh air path for a flow of fresh air between an exhaust air intake and an exhaust air discharge the improvement wherein, said system comprises a first choker damper associated with said fresh air path component a second choker damper associated with said exhaust air path component a pivot interconnect component interconnecting said first and second choker dampers such that said first and second choker dampers are simultaneously displaceable between a respective first position and a respective second position; and a temperature responsive choker actuation means attached to the pivot interconnect component such that said choker actuation means can displace the choker dampers between said first and said second positions, (e.g. in response to the temperature of the environment, e.g. in reaction to the temperature of the air flowing over the choke).

In another aspect the invention allows for the temperature reactive choke system mechanism for use with a ventilation system for attenuating (e.g. blocking) a flow of air flowing within an air path defined by the system.

The present invention in accordance with another aspect provides in a ventilation system or apparatus, for exchanging air between the interior and exterior of an enclosed space (i.e. of a building, room or the like), said ventilation system or apparatus having a fresh air path means defining a fresh air path for a flow of fresh air between a fresh air intake and a fresh air discharge, the improvement wherein said fresh air path means comprises a choker damper component for providing a region in the fresh air path of temperature variable (i.e. constrictable) cross-sectional area and a pivot component, said choker damper component comprising a pair of opposed broad side faces (i.e. a plate), said pivot component comprising a temperature responsive actuator element configured to pivotally (i.e. rotationally) displace the choker component, in response to ambient air temperature about said temperature actuator element, between a first position and a second position, said first and second positions falling within a range consisting of a position wherein the broad side faces of the choker component are disposed (substantially) parallel to the flow of fresh air and a position wherein the broad side faces of the choker component are disposed transverse (e.g. perpendicular) to the flow of fresh air.

In accordance with the present invention a temperature actuator element may comprises a bimetallic spring.

It is to be understood herein that a temperature responsive actuator element, component, or member, a temperature responsive pivot component, element or member and the like, etc., as described herein, may take any (known) form keeping in mind its purpose, namely to displace or inhibit displacement of a damper in response to the temperature of the environment (e.g. in reaction to the temperature of the air flowing over the (choke) damper.

Hooking or Connector System

Statement of Invention

Thus this aspect of the invention generally provides a connector device (e.g. of metal or other analogous strong material) for connecting together a first element (e.g. of a relatively friable material as compared to the material of the connector device) and a second element (e.g. if desired or necessary also of a relatively (the same or different) friable material as compared to the material of the connector device), said connector device comprising.

a first hook member (e.g. a U shaped end) and a second (opposed or distal) engagement or locking assembly (e.g. a tail end) extending from the first hook member the hook member being adapted or configured to mate with or engage a correspondingly configured portion of the first element the engagement assembly being adapted or configured to secure the hook member to the second element.

In accordance with the present invention a connector device as described herein may be one wherein the second (opposed or distal) engagement assembly also comprises a second hook member (e.g. a U shaped end).

The present invention in particular provides a connector device for connecting together a first element and a second element, said first element comprising a relatively friable material as compared to the material of the connector device, said connector device comprising.

a first U-shaped hook member comprising a pair of opposed arm elements, each arm element being provided with an opening for receiving therethrough the threaded stem of a screw member comprising a head connected to said threaded stem, one opening being sized smaller than said screw head, the other opening being configured and sized to engage the threads of said stem and a second tail engagement member extending from an arm of the first U-shaped hook member hook member, said tail engagement member being configured to secure the hook member to the second element.

The (opposed or distal) locking assembly (e.g. a tail end) extending from the hook member may have any desired or necessary means for attachment to the second element. It may for example be provided with screw attachment opening means for screw engagement with screw stalk of a screw attachment device.

Air Diffuser for Facilitating the Mixing of Fresh Air and Stale Air Flows of Different Temperature

Statement of Invention

This aspect of the invention relates to an air diffuser or disperser means whereby a first air stream or flow may be intermingeled with a second air stream or flow. This aspect of the present invention may in particular exploit or be used with a temperature actuatable choke type damper as described herein; namely, a choke damper component associated with a temperature responsive actuator element configured and disposed so as to inhibit air flow through an air path with which the choke damper is associated. Thus for example, if the temperature of the (e.g. fresh) air flowing through the air path falls or is below a predetermined level the temperature responsive actuator element may be so configured such that it is able to tend to urge or maintain the choker in a predetermined second (e.g. closed) position so as to inhibit such cold air flow through the air path.

Thus in accordance with this air intermingling aspect the present invention provides an air intermingling assembly for an air handling system (e.g. apparatus, device etc.; e.g. a ventilation system) for exchanging air between the interior and exterior of an enclosed space (i.e. of a building, room or the like) wherein fresh air flow from the exterior of the enclosure is intermingled with stale air flow from the interior of the enclosure to form a combined air flow for delivery back to the interior of the enclosure, said air intermingling assembly comprising an air input zone for receiving the fresh air flow, an air intermingling zone for receiving the stale air flow and an intermediate air dispenser or dispersal zone comprising a plurality of spaced apart apertures for providing for air communication between said air input zone and said air intermingling zone such that the fresh air flow is able pass through said apertures into said air intermingling zone to intermingle with the stale air flow so as to form a combined (i.e. mixed) air flow.

In accordance with the present invention an air intermingling assembly is provided wherein said intermediate air dispenser or dispersal zone may comprises a first aperture region and a second aperture region, said first region comprising a higher number of apertures than said second region whereby air flow through the apertures of the first region is relatively higher than air flow through the second region, and said air intermingling zone comprises a stale air flow inlet disposed adjacent said first aperture region.

In accordance with the present invention an air intermingling assembly is provided wherein said air intermingling zone comprises a stale air flow inlet and wherein said intermediate air dispersal zone comprises an aperture zone of highest concentration of apertures adjacent said stale air flow inlet.

In accordance with the present invention an air intermingling assembly is provided wherein said intermediate air dispenser or dispersal zone comprises a heat transfer insolation body, said insolation body defining said apertures.

Thus in accordance with this air intermingling aspect the present invention provides an air distribution or diffuser assembly for use with a ventilation or similar device for the mixing of at least two air flows (e.g. of different temperature), comprising a diffuser body provided with air diffusion openings or apertures for the passage of air from one (e.g. broad) side of the body to the opposed (e.g. broad) side of the body, the diffuser body and in particular the apertures or openings being configured so that the diffuser body has at least one region which provides therethrough a (relatively) high air flow rate and at least one other region which provides therethrough a (relatively) low(er) or more restricted air flow rate.

More particularly, in accordance with this intermingling aspect of the present invention an air handling system (e.g. apparatus, device, etc.) may provided which may be configured, for example, to provide a relatively controlled mixing of cold fresh air with warm humid interior stale air (i.e. with a view to avoiding for example frost or ice formation in the immediate vicinity of air mixing). The control may, for example, be accomplished by the provision in the diffuser body of a pattern of apertures or holes which interconnect (for air communication between) opposite broad faces thereof, the holes therein being configured and positioned so as to provide a concentration of openings varying in density (e.g. density=no. of holes per unit area) from one end or side of the diffuser to the opposed end thereof The apertures or holes may be of the same or different cross-section. The diffuser may be considered to have the aspect of a grate wherein the openings are patterned to influence air flow therethrough. The control may alternatively be provided by varying the thickness of the diffuser or dispenser body such that the apertures or holes may be of the of the same or different length; the control may of course be affected by holes of varying cross section and length keeping in mind th purpose of the diffuser body. Alternatively, the diffuser body on the fresh air side may be associated with suitable baffling means whereby an elongated serpentine channel is defined, the floor of which defines the above mention apertures. The floor of such serpentine channel may have an aperture density near the air inlet lower than the aperture density of the distal end of the channel, the input of the stale air being disposed adjacent the distal end of the channel on the other side of the diffuser body.

In any event the diffuser or dispenser zone (e.g. dispenser or diffuser body) and optionally the air input zone and/or intermingling zone are to be configured so as to provide the desired graduated (i.e. gradual) intermingling of the first air stream with a second air stream. In particular it would be advantageous to configure the dispenser zone (e.g. dispenser or diffuser body) and optionally the air input zone and/or intermingling zone so as to allow the mixing of a cold (and possibly dry) air stream with a hot (and possibly humid) air stream such that (for a predetermined given set of temperature conditions) the intermingling streams of air provide an intermingled air flow has a temperature above the freezing point of water and in particular above the dew point (and the freezing point) of water. By doing so this invention can mix these two airstreams without causing any condensation, snow or ice buildup notwithstanding input air flow stream temperatures and humidity.

As mentioned above it would further be advantageous to be able to associate with an air intermingling means a temperature responsive means able to choke off (once a predetermined cut-off fresh air temperature is reached, e.g. a too low outside air temperature) the inflow of a first (i.e. fresh air) air flow to the intermingling means and the out flow of a second (stale air) air flow with respect to an enclosure (e.g. dwelling), namely once a predetermined air inflow temperature is reached fresh air inflow and stale air exhaust (i.e. outflow from an enclosure) is inhibited or stopped outright (e.g. stale air may be merely recycled back to an enclosure without any added fresh air).

Thus the present invention in accordance with another aspect provides a choker damper assembly for an air handling system comprising an air intermingling component comprises an air input zone and an air intermingling zone wherein the air input zone is associated with a fresh air input component and the air intermingling zone is associated with a stale air input component, said stale air input component comprising a first stale air input element for providing air communication with an exhaust outlet for exhausting stale air and a second stale air input element for providing air communication with said intermingling zone, said choker damper assembly comprising a first choker damper associated with said fresh air input component a second choker damper associated with said first stale air input element a pivot interconnect component interconnecting said first and second choker dampers such that said first and second choker dampers are simultaneously displaceable between a respective first open position and a respective second closed position;

a biasing component biasing said choker dampers in respective second closed positions, said biasing component being configured such that the choker dampers are able to be induced to pass from respective second closed positions to respective first open positions; and a temperature responsive choker inhibition element attached to the pivot interconnect component such that said choker actuation means can inhibit displacement of the choker dampers between said first and said second positions, (e.g. in response to the temperature of the environment, e.g. in reaction to the temperature of the air flowing over the choke). In accordance with the present invention the choker damper assembly may be associated with any type of (known) air intermingling means but in particular with an air intermingling assembly as described herein, namely an air intermingling component which additionally comprises an intermediate air dispenser or dispersal zone as described herein.

Thus the present invention in accordance with a further aspect provides an air intermingling assembly wherein the air input zone is associated with a fresh air input component and said intermingling zone is associated with a stale air input component, said stale air input component comprising a first stale air input element for providing air communication with an exhaust outlet for exhausting stale air and a second stale air input element for providing air communication with said intermingling zone, and wherein said air intermingling assembly comprises a first choker damper associated with said fresh air input component a second choker damper associated with said first stale air input element a pivot interconnect component interconnecting said first and second choker dampers such that said first and second choker dampers are simultaneously displaceable between a respective first open position and a respective second closed position;

a biasing component biasing said choker dampers in respective second closed positions, said biasing component being configured such that the choker dampers are able to be induced to pass from respective second closed positions to respective first open positions; and a temperature responsive choker inhibition element attached to the pivot interconnect component such that said choker actuation means can inhibit displacement of the choker dampers between said first and said second positions, (e.g. in response to the temperature of the environment, e.g. in reaction to the temperature of the air flowing over the choke).

Single Blower Wheel Assembly Provided with a First and a Second Blower Wheel Elements In accordance with the present invention it is proposed to provide a relatively compact blower assembly wherein, while the first and second blower wheels are mounted on a common rotor shaft (e.g. to be rotated by an electric motor), the blower wheels are disposed adjacent to each other such that the blower assembly may be incorporated into a compact air handling system (e.g. ventilation apparatus). In this case the baffle must have an opening sized to accommodate such a large rotatable structure which may lead to undesired air leakage between fresh and stale air paths.

This (blower) aspect of the invention thus provides a dynamic seal member for use with a blower assembly and baffle.

Statement of Invention

Thus the present invention generally provides a blower wheel assembly for use with an airflow baffle having a baffle opening. The assembly may comprisie a dynamic seal member, a first blower wheel, (and if desired a second blower wheel) and a rotor (e.g. (electric) motor provided with a single motor shaft). The dynamic seal member having an outer peripheral edge provided with a peripheral lip or peripheral groove (e.g. the lip or groove extending parallel to, perpendicular to or transversely to the axis of rotation of the motor shaft). The first blower wheel (and the second blower wheel if present) is (are) coaxially attached or mounted to the rotor shaft (e.g. adjacent to each other, if two wheels are present). The dynamic seal member, the first blower wheel (and if present the second blower wheel) being sized and configured such that the dynamic seal member is disposed between the first and second blowers such that the lip or groove thereof is able to dynamically mate or cooperate with a corresponding lip, groove or edge portion of a peripheral edge of the baffle opening so as to provide a dynamic seal between opposite sides of the baffle (i.e. to provide an air (flow) seal between the opposite sides of the baffle when the blower(s) is (are) rotated) and such that the first blower wheel is disposes on one side of the baffle and the second blower wheel, if present, is disposed on the other opposite side of the baffle.

In accordance with the present invention the blower wheels may each having an outer peripheral edge. These outer edges may (independently) be disposed inwardly or outwardly of the peripheral edge of the dynamic seal. If desired, one of the peripheral edges of a blower may be configured to take on the function of the dynamic seal.

The dynamic seal member (if an independent member) may be independently attached to or mounted to the motor shaft. Alternatively the dynamic seal may instead be attached to one of or both of the blowers.

The present invention in particular provides a blower wheel assembly for use with an airflow baffle having an inner peripheral edge defining a baffle opening, the assembly comprising a dynamic seal member (e.g. ring, annular, disk shaped member), a first blower wheel, and a second blower wheel, the blower wheels being juxtaposed (e.g. adjacent to each other) and coaxially attached to a rotor shaft on opposite sides of the dynamic seal member, the dynamic seal member having an outer peripheral edge (provided with a peripheral lip or peripheral groove (e.g. the lip or groove extending parallel to, perpendicular to or transversely to the axis of rotation of the rotor shaft)), the dynamic seal member, the first blower wheel and the second blower wheel being sized and configured such that when the blower wheel assembly is disposed in the baffle opening and the outer peripheral edge is in juxtaposed relation to the inner peripheral edge of the baffle, the first blower wheel is disposed on one side of the baffle and the second blower wheel is disposed on the other opposite side of the baffle and the outer peripheral edge is able to dynamically cooperate with the inner peripheral edge of the baffle so as to provide a dynamic seal between opposite sides of the baffle (i.e. to provide an air (flow) seal between the opposite sides of the baffle when the blowers are rotated).

In accordance with the present invention a blower wheel assembly as defined may be one wherein one of the blower wheels (e.g. the peripheral edge thereof) is configured to act as said dynamic seal member.

In accordance with the present invention a blower wheel assembly as defined herein may comprise a (electric) motor provided with a single motor shaft, said motor shaft being said rotor shaft.

In accordance with another aspect the present invention provides a ventilation system or apparatus, for exchanging air between the interior and exterior of a building, for transferring heat from exhaust air taken from the building to fresh air taken from the exterior ambient air for delivery to the building, and wherein air from the interior of the building is used as defrost air to defrost the ventilation apparatus, (such as for example described herein and in particular in U.S. Pat. No. 5,193,610, the entire contents of which are incorporated herein by reference).

The ventilation system or apparatus having a fresh air path means having a fresh air intake side and a fresh air discharge side, an exhaust air path means having an exhaust air intake side and an exhaust air discharge side, and optionally, if desired or necessary a heat exchanger means comprising or consisting of heat recovery means for the transfer of heat between exhaust air and fresh air, said heat recovery means comprising one or more air-to-air heat exchanger elements (see FIGS. 1 to 4), wherein said system or apparatus includes a fan component for moving fresh air through said fresh air path means and for moving exhaust air through said exhaust air path means, said fan component comprising one motor and two blower wheels operatively connected thereto, said fresh air path means including one said blower wheel and said exhaust path means including the other said blower wheel, the improvement wherein said fan component comprises the blower wheel assembly and airflow baffle as defined herein and wherein the airflow baffle separates a portion of said fresh air path means from said exhaust air path means such that the first blower wheel is disposed on a side of the baffle forming part of the fresh air path means and the second blower wheel is disposed on the other opposite side of the baffle forming part of the exhaust air path means.

As used herein the expression "dynamic seal" is to be understood as referring to the contorted pathway inhibiting the passage of air during rotation of the blower assembly about the axis of rotation of the rotor shaft.

This (blower) aspect of the invention thus provides a dynamic seal member for use with a blower assembly and baffle, the baffle comprising a baffle opening and the blower assembly comprising one or two blower wheels mounted to the same rotor (i.e. motor) shaft. Air sealing between different air paths is provided during rotation of the blower wheel(s). The corresponding peripheral edges of the dynamic seal member and the baffle opening are spaced apart and configured so as to provide an air (flow) seal (i.e. contorted air pathway) between the opposite sides of the baffle when the blower(s) is (are) rotated.

The dynamic seal member may take any desired form keeping in mind its purpose. thus the dynamic seal member may be an independent element or may form part of a blower wheel (e.g. the peripheral edge of the first or second blower) and the like.

Mounting Port

Statement of Invention

Thus the present invention provides in an air opening element of air handling (e.g. a ventilation) system (e.g. apparatus) the improvement wherein the opening element comprises a sealing projection or groove for cooperating with a corresponding projection or groove of a port mounting element for (air tight) seal mating therewith (i.e. for air tight seal connection of the port to the opening element).

Thus the present invention provides in a mounting port for an air opening element of an air handling (e.g. a ventilation) system (e.g. apparatus, device, etc.) comprising a side wall member defining an air aperture or opening, the side wall member having an air input portion or end and an air output portion or end, the air input end having a connection element for cooperating with a corresponding connection element of an air duct member for connecting the air duct to the mounting port, the air output end having a connection element for cooperating with a corresponding connection element of an (air) opening element (e.g. of a ventilation system or device) for connection of the port to the (air) opening element, the improvement wherein the output end is provided with a sealing projection or groove for cooperating with a corresponding projection or groove of the opening element for seal (e.g. air tight) mating therewith (i.e. for air tight seal connection of the port to the opening means).

The present invention in particular provides in a quick connect mounting port for an air opening element of air handling (e.g. a ventilation) system (e.g. apparatus) comprising a side wall member defining an air aperture or opening, the side wall member having an air input portion or end and an air output portion or end, the air input end having snap connection element (e.g. male or female) for cooperating with a corresponding snap connection element (e.g. male or female) of an air duct member for connecting the air duct to the mounting port, the air output end having snap connection element (e.g. male or female) for cooperating with a corresponding snap connection element (e.g. male or female) of an (air) opening element (e.g. of a ventilation system or device) for connection of the port to the (air) opening element, the improvement wherein the output portion is provided with a sealing projection or groove for cooperating with a corresponding projection or groove of the opening element for seal (e.g. air tight) mating therewith (i.e. for air tight seal connection of the port to the opening element).

The present invention in a further aspect provides in a mounting port for an air opening element of an air handling (e.g. a ventilation) system (e.g. apparatus) comprising a side wall member defining an air aperture or opening, the side wall member having an air input portion or end and an air output portion or end, the air input end having a snap connection element for cooperating with a corresponding snap connection element of an air duct member for connecting the air duct to the mounting port, the air output end having a connection element for cooperating with a corresponding connection element of an (air) opening element (e.g. of a ventilation system or device) for connection of the port to the (air) opening element, the improvement wherein the input end is provided with a base mounting member and one or more mounting members for connection to ducts of successively smaller size.

In drawings which illustrate example embodiments of the various aspects of the present invention:

Figure 7:
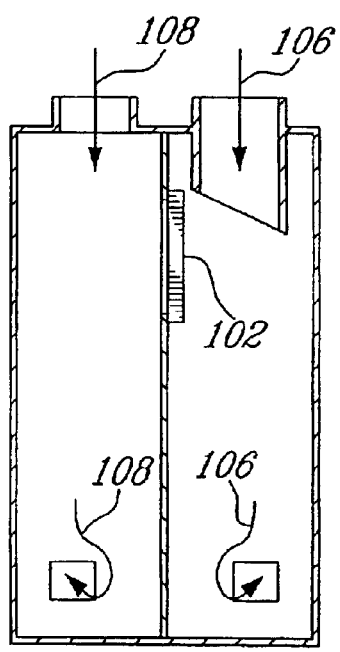
Figure 8:
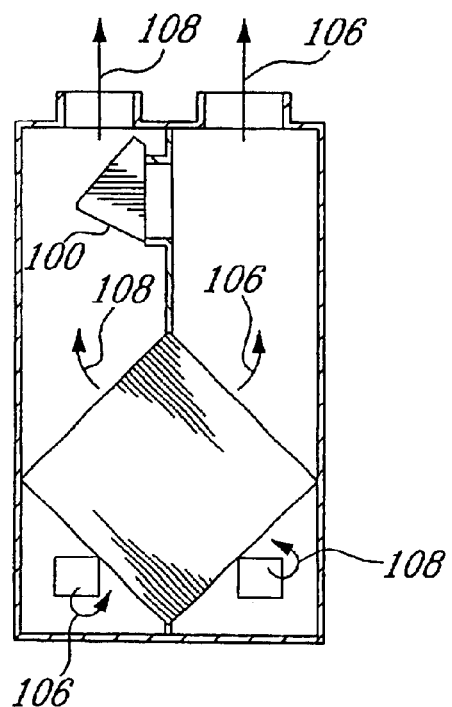
Figure 9:
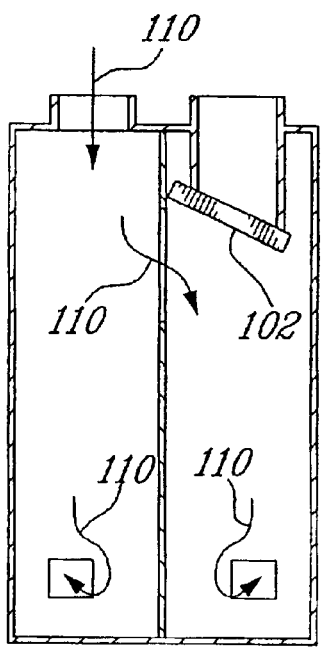
Figure 10:
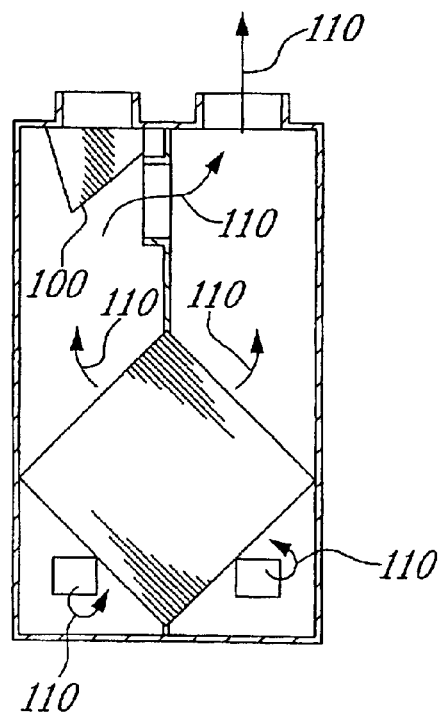
Figure 11:
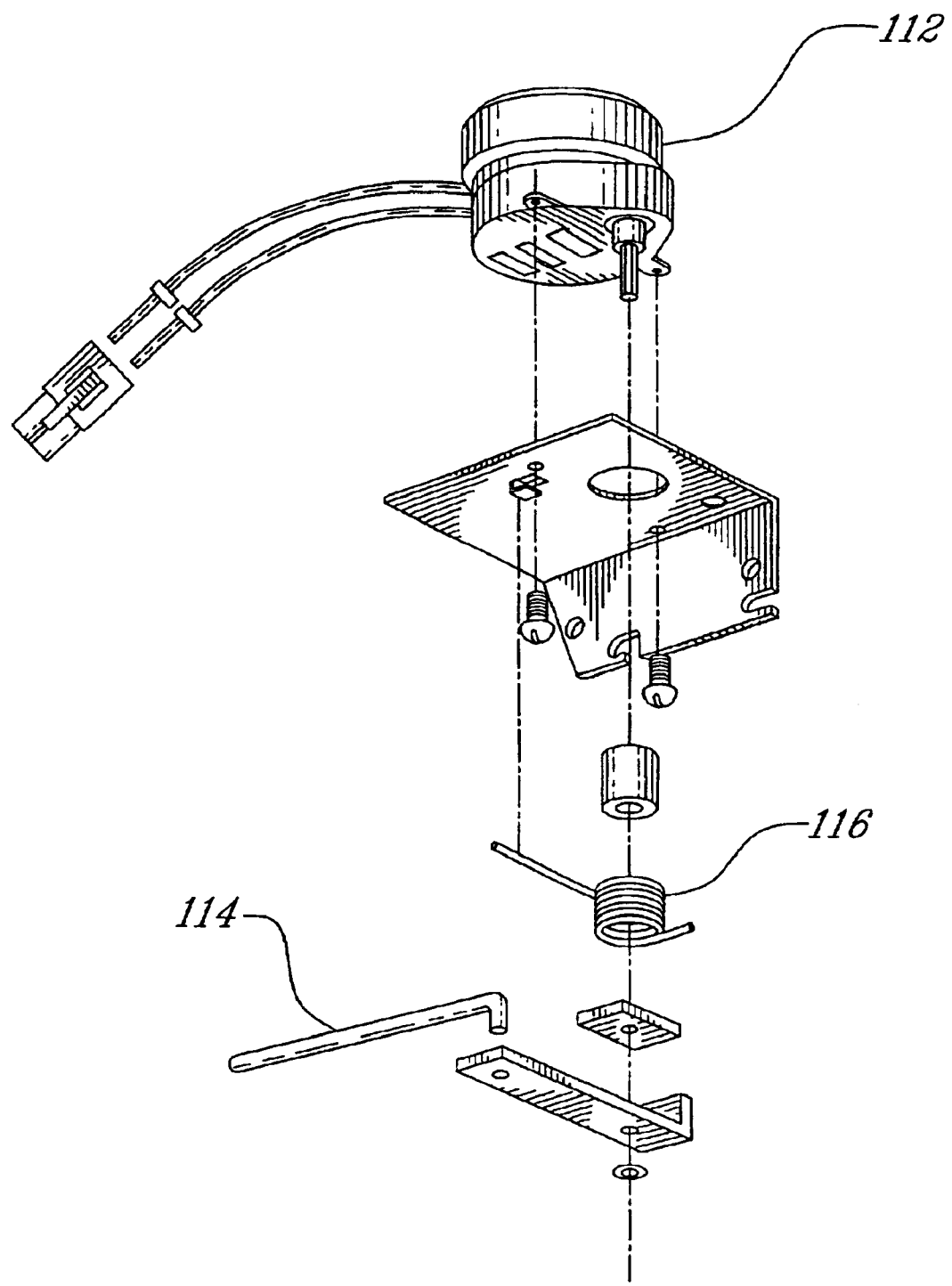
Figure 12:
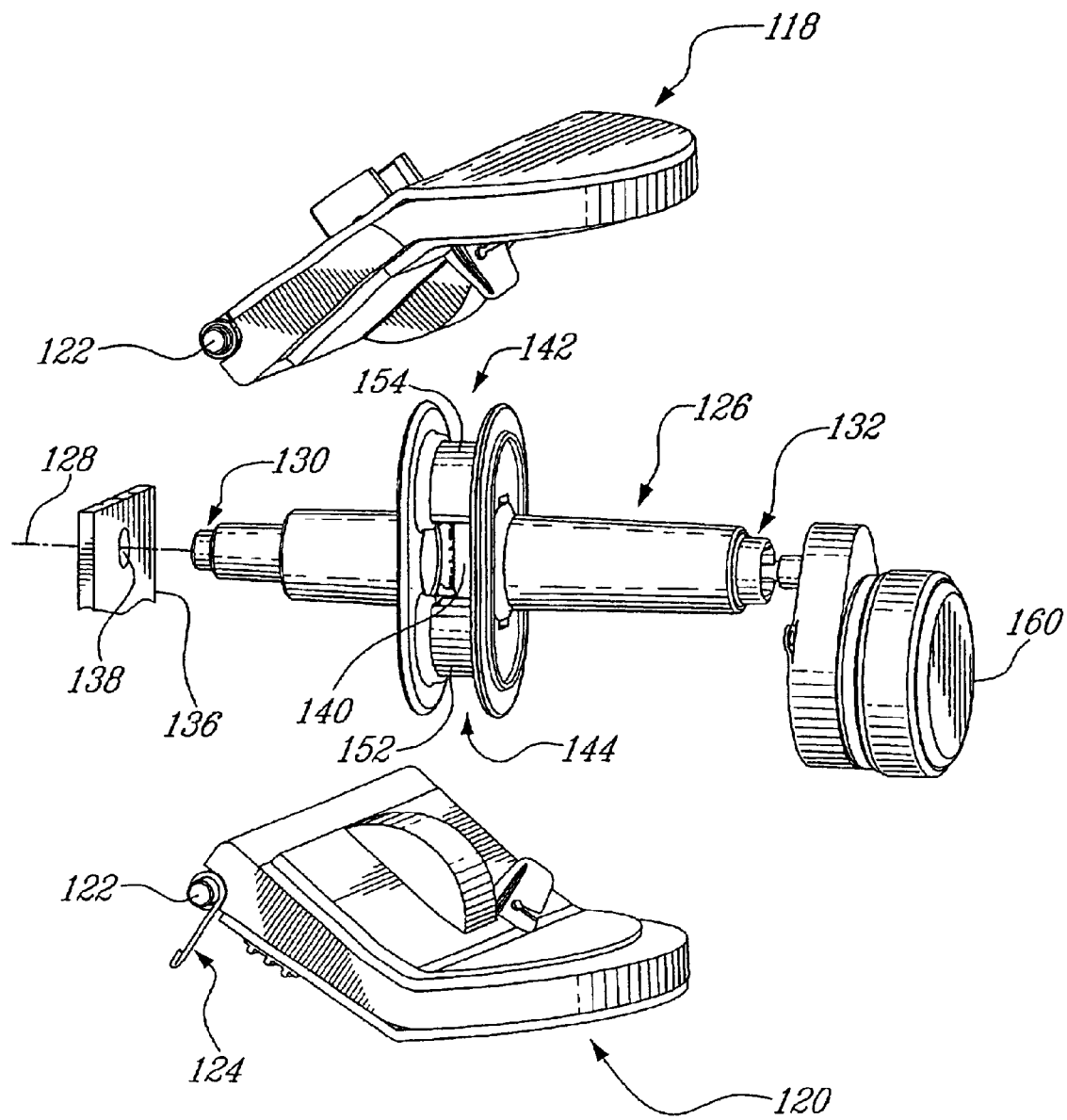
Figure 13:
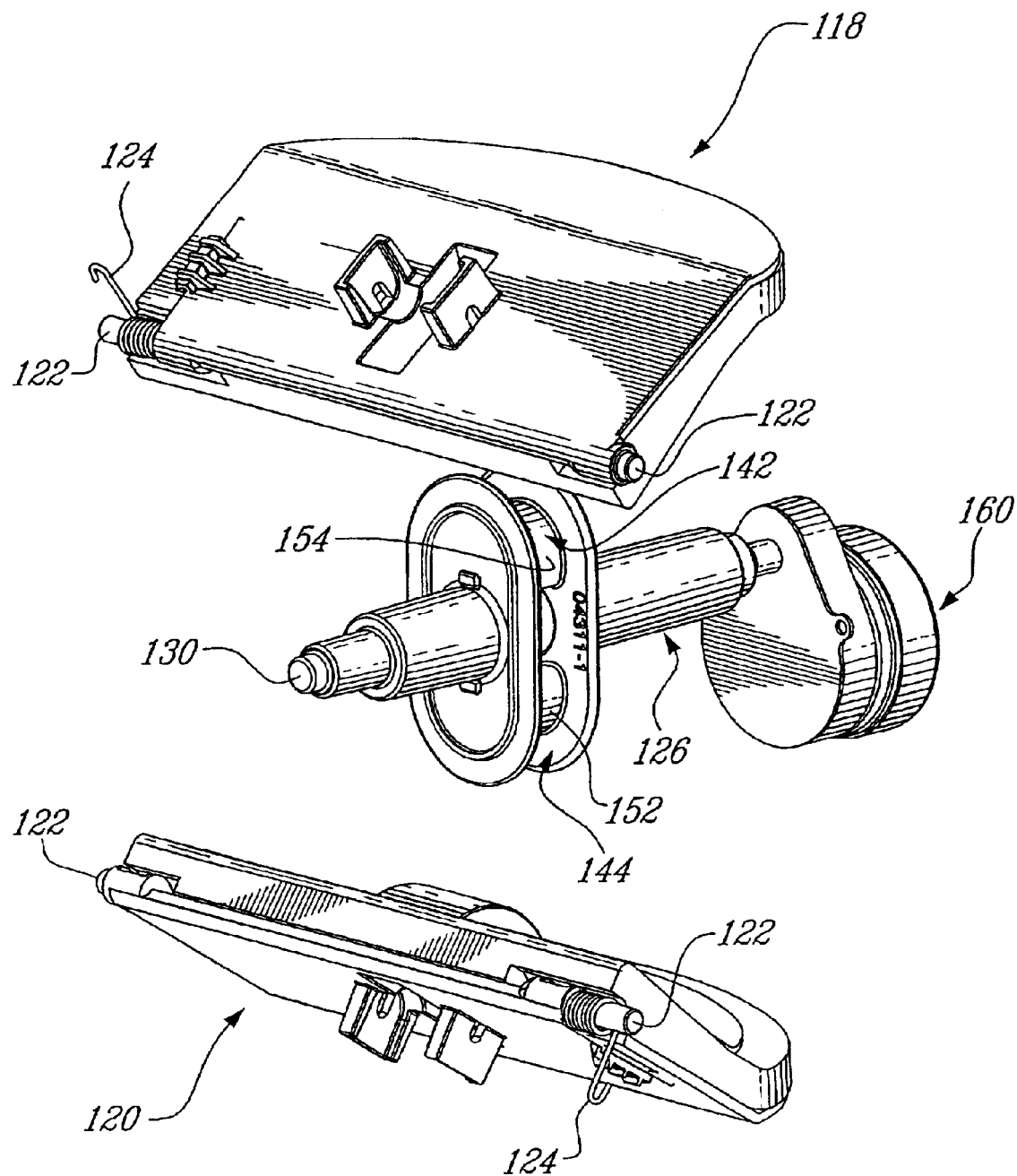
Figure 14:
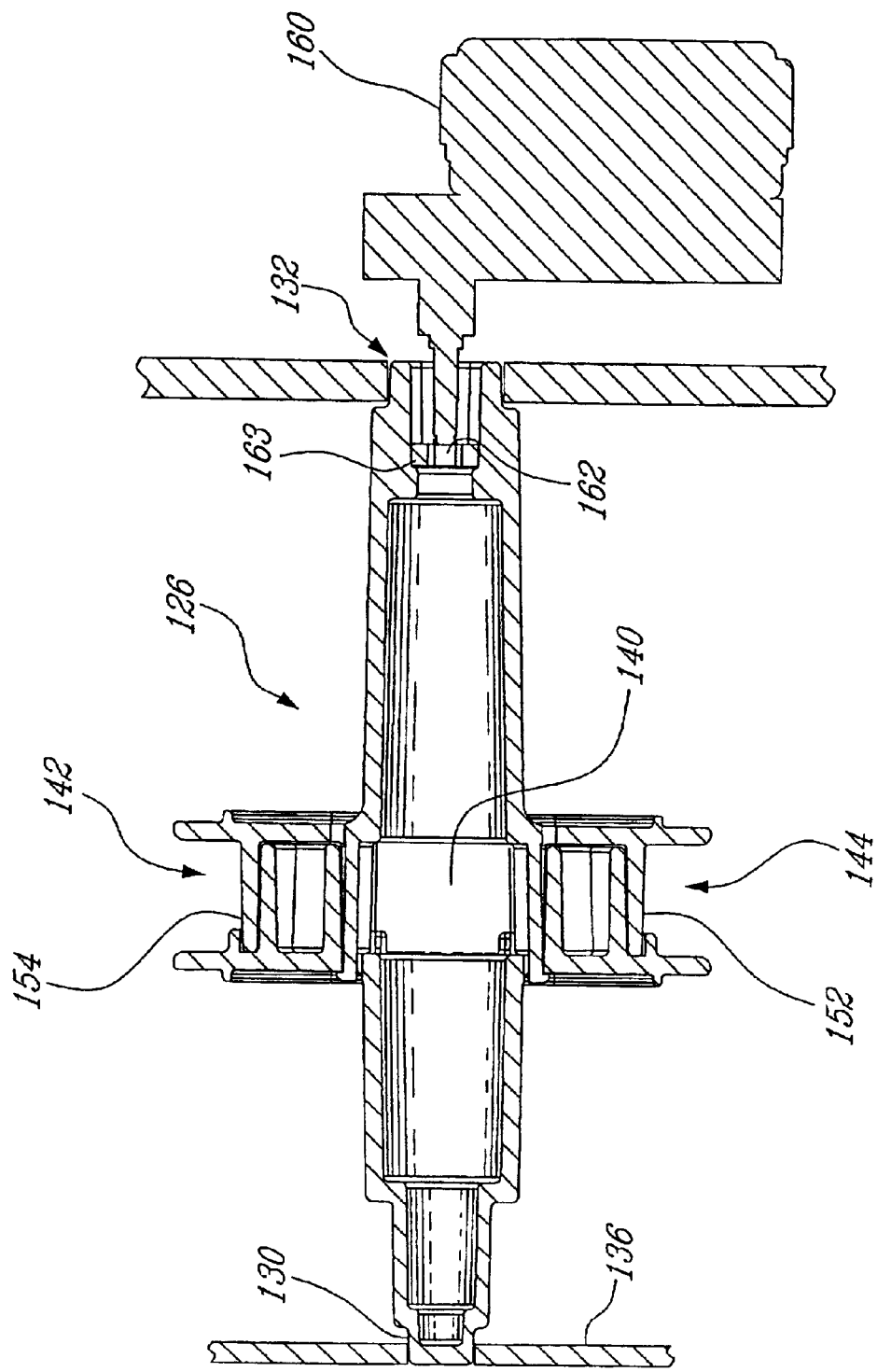
Figure 16:
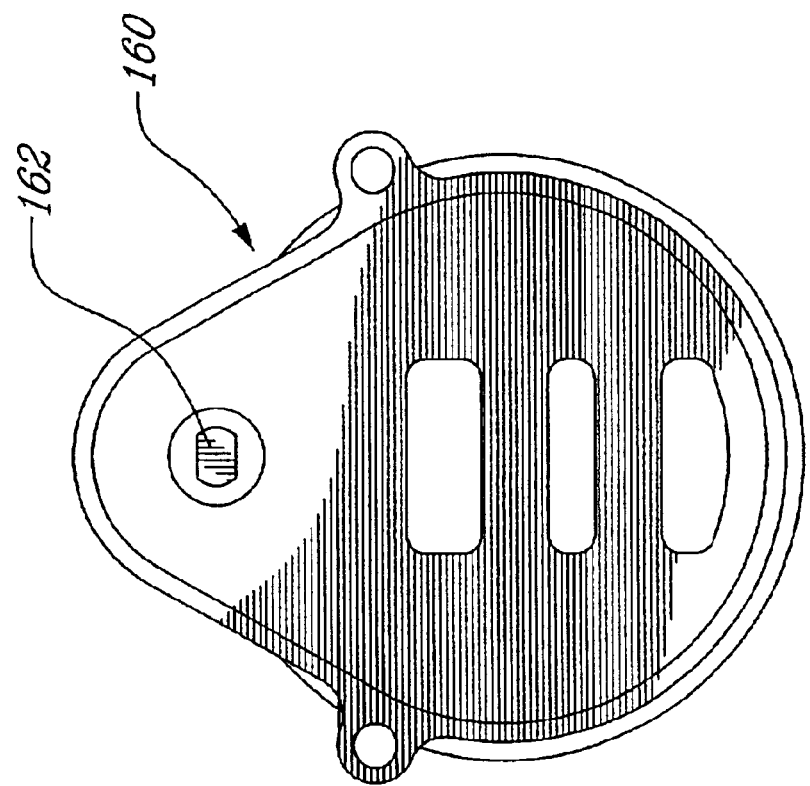
Figure 15:
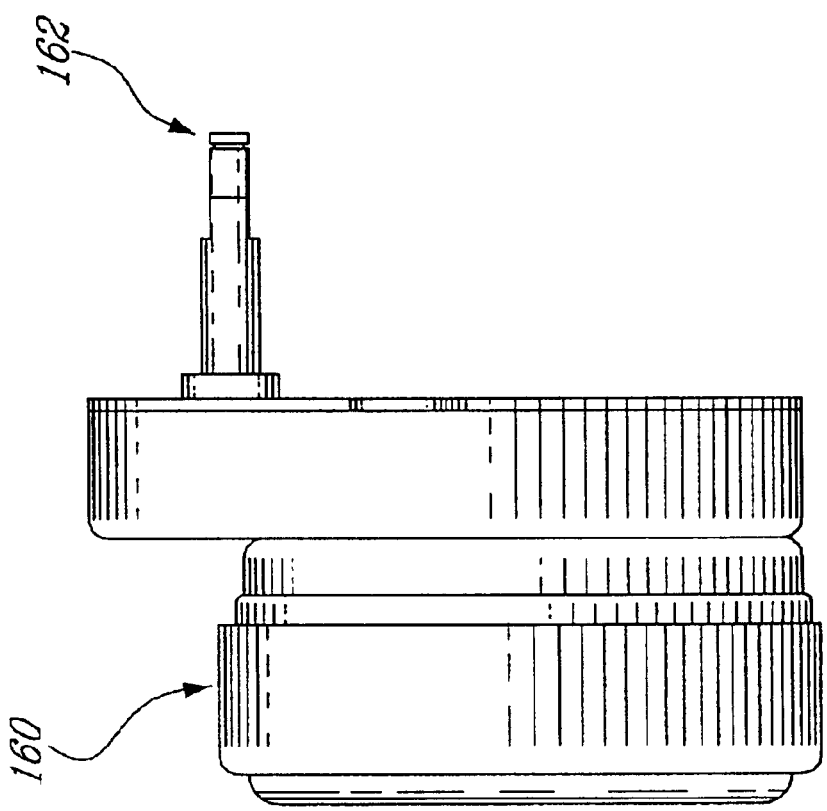
Figure 16:
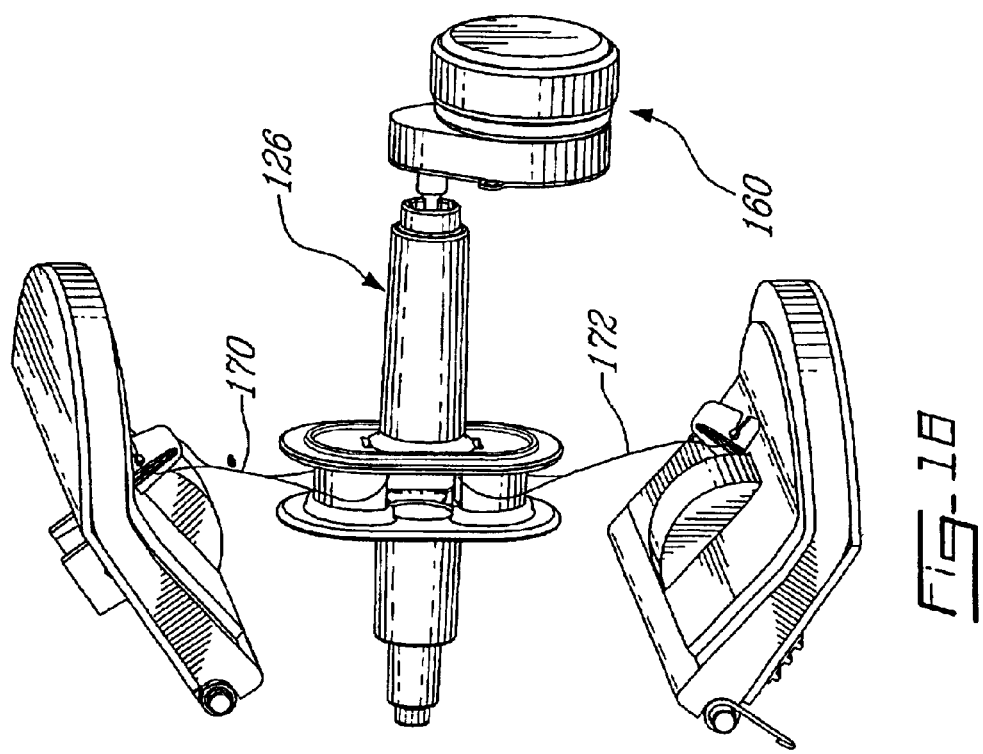
Figure 17:
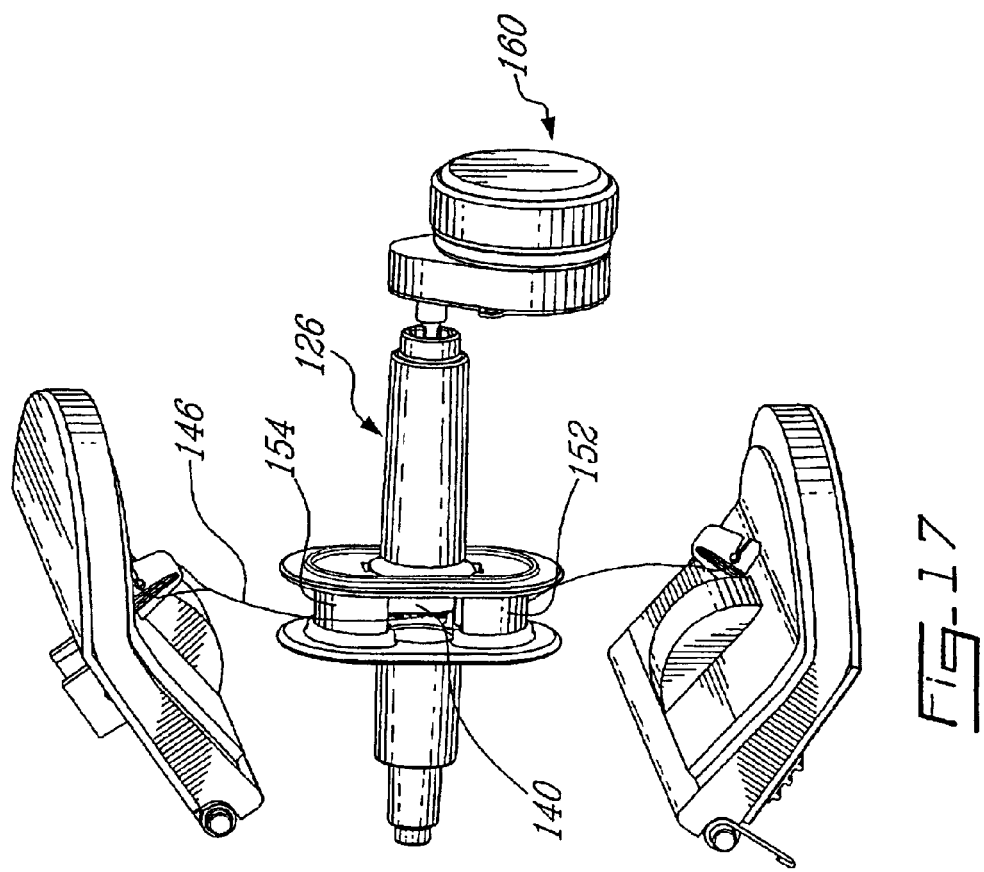
Figure 21:
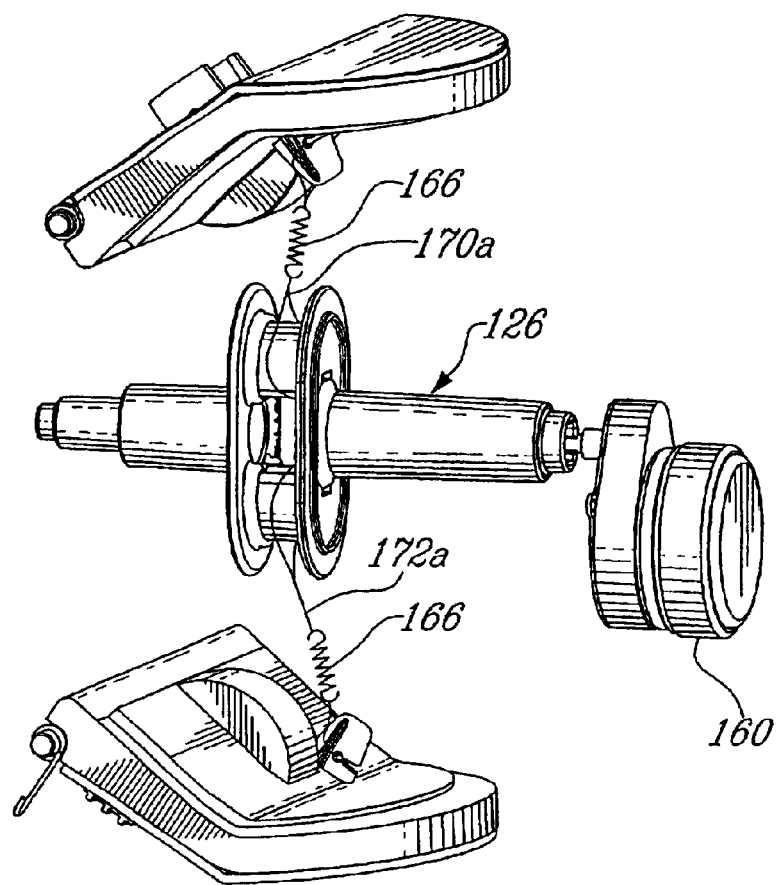
Figures 22, 23:
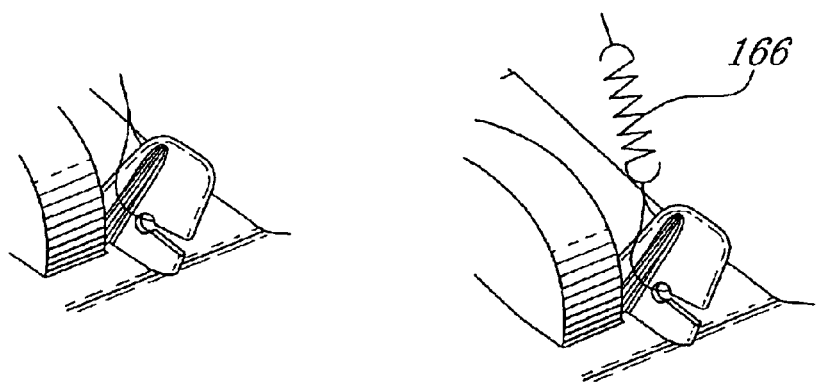
Figure 24:
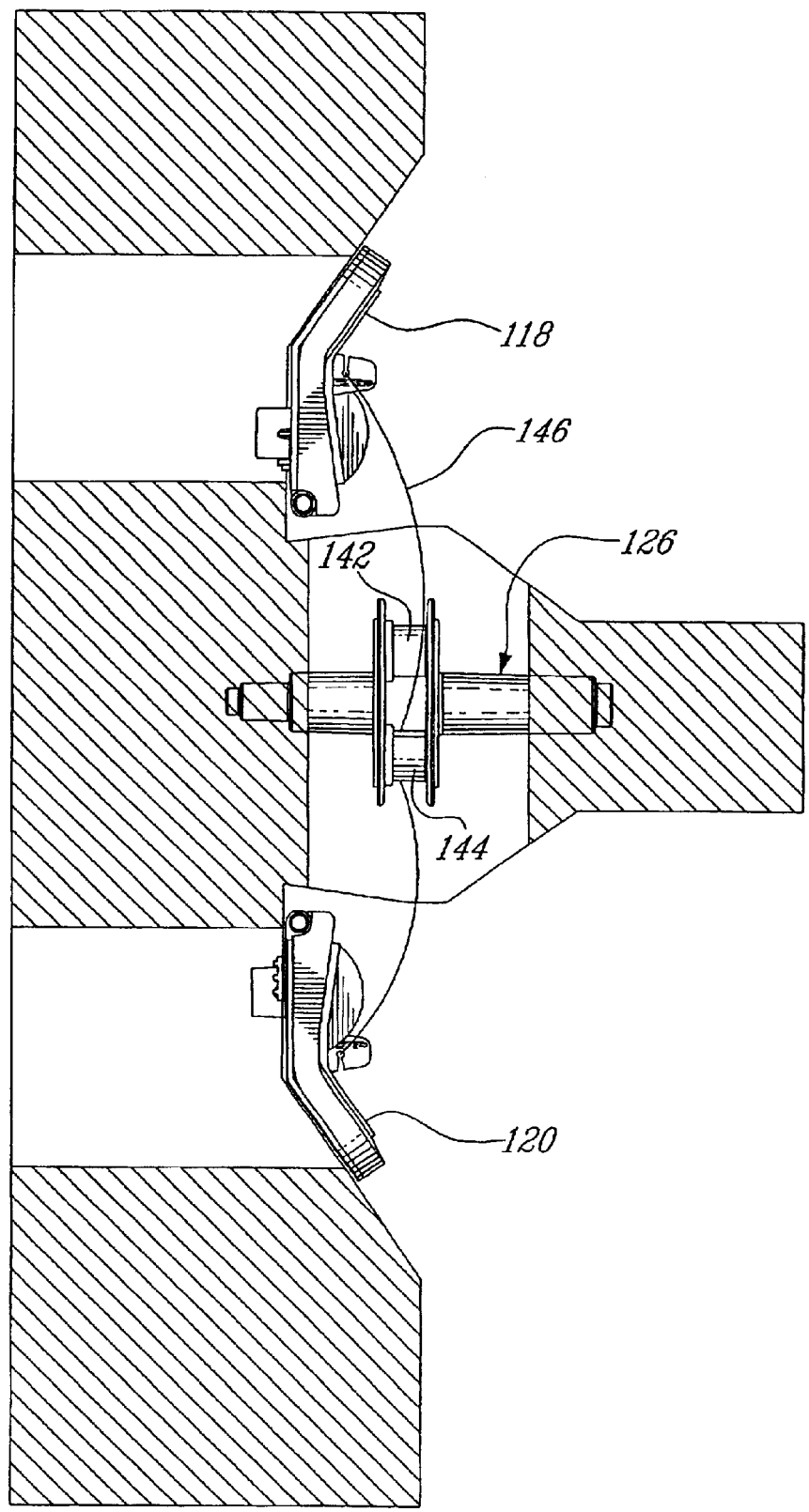
Figure 25:
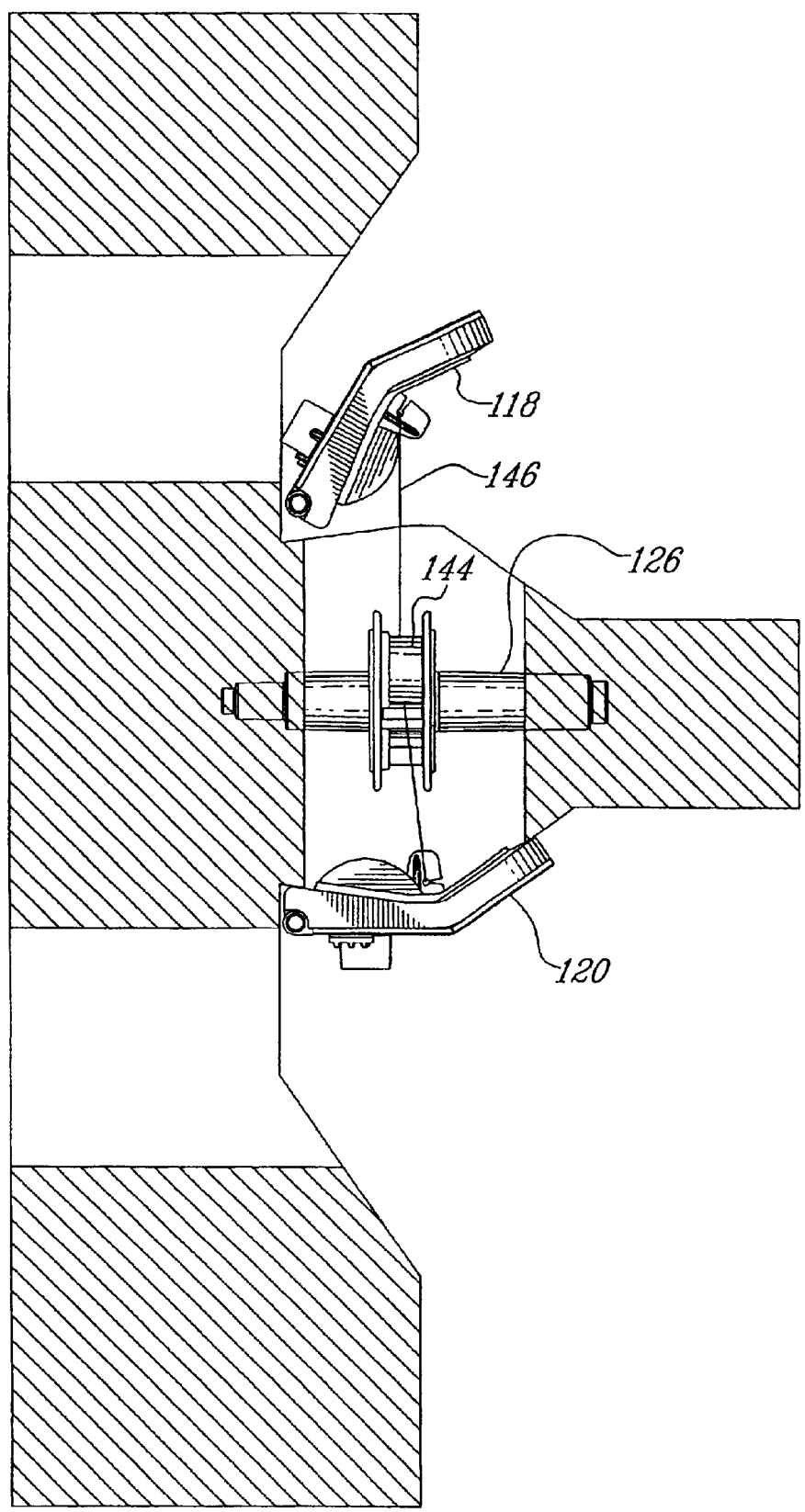
Figure 26:
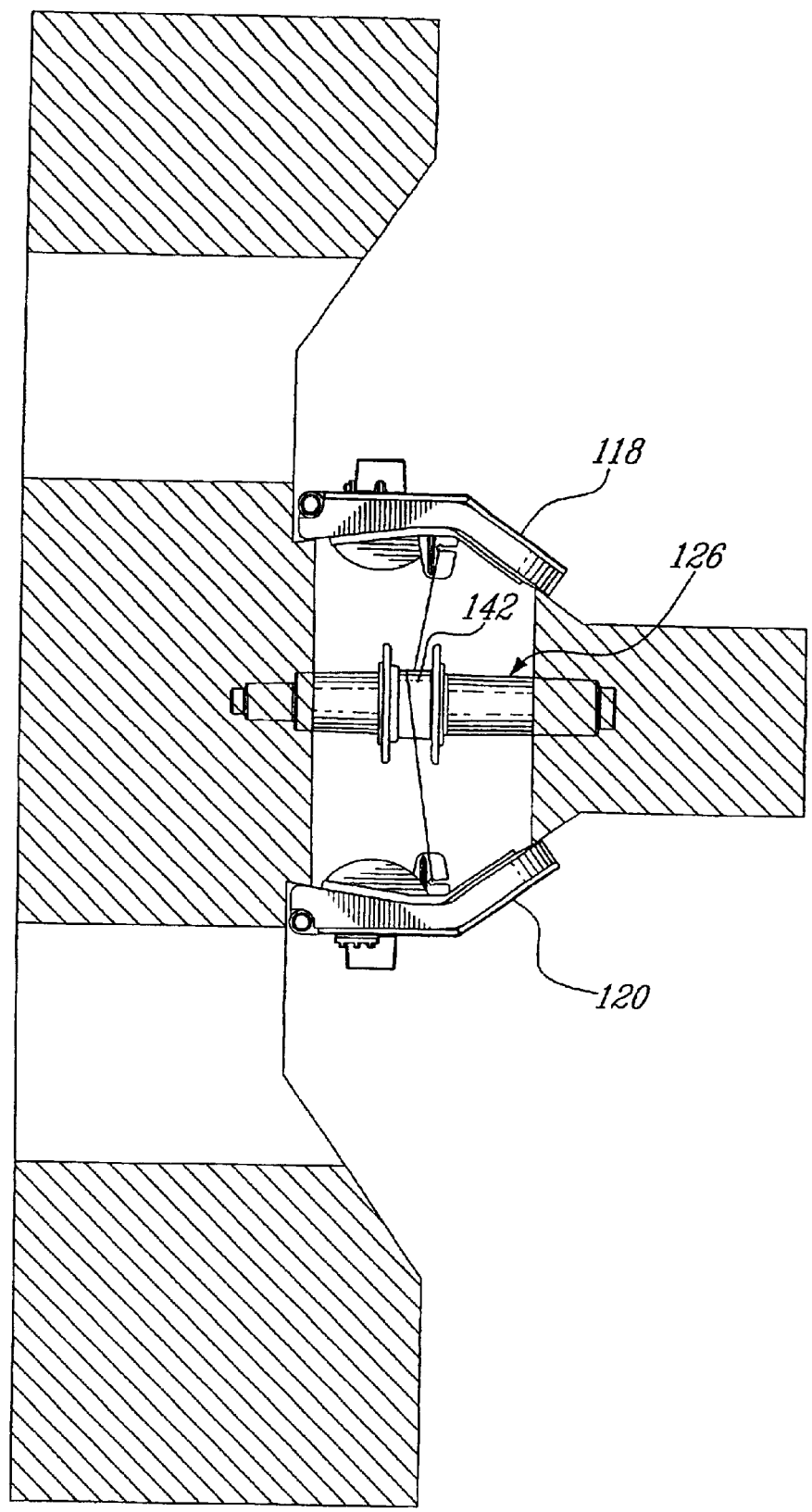
Figure 27:
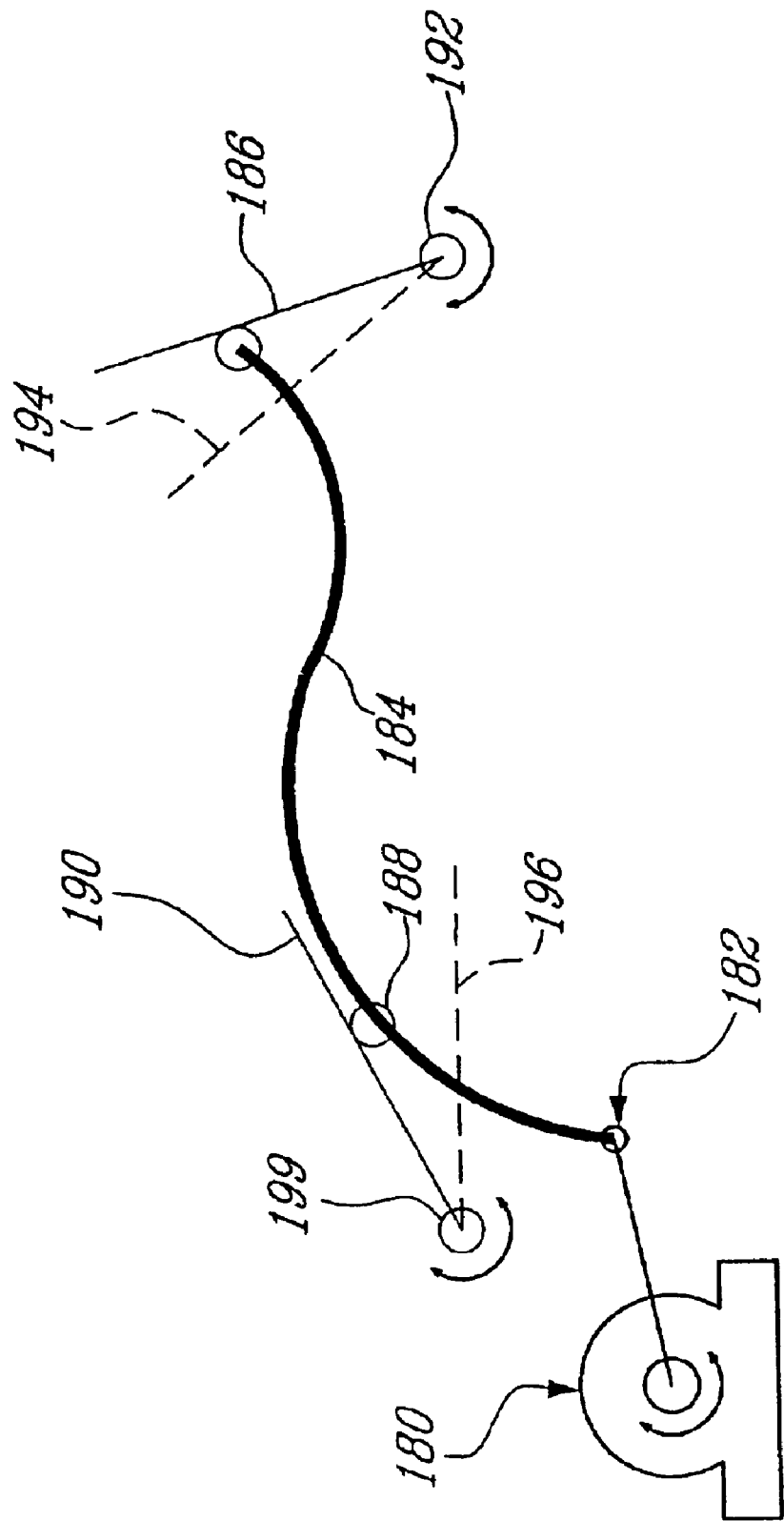
Figure 28:
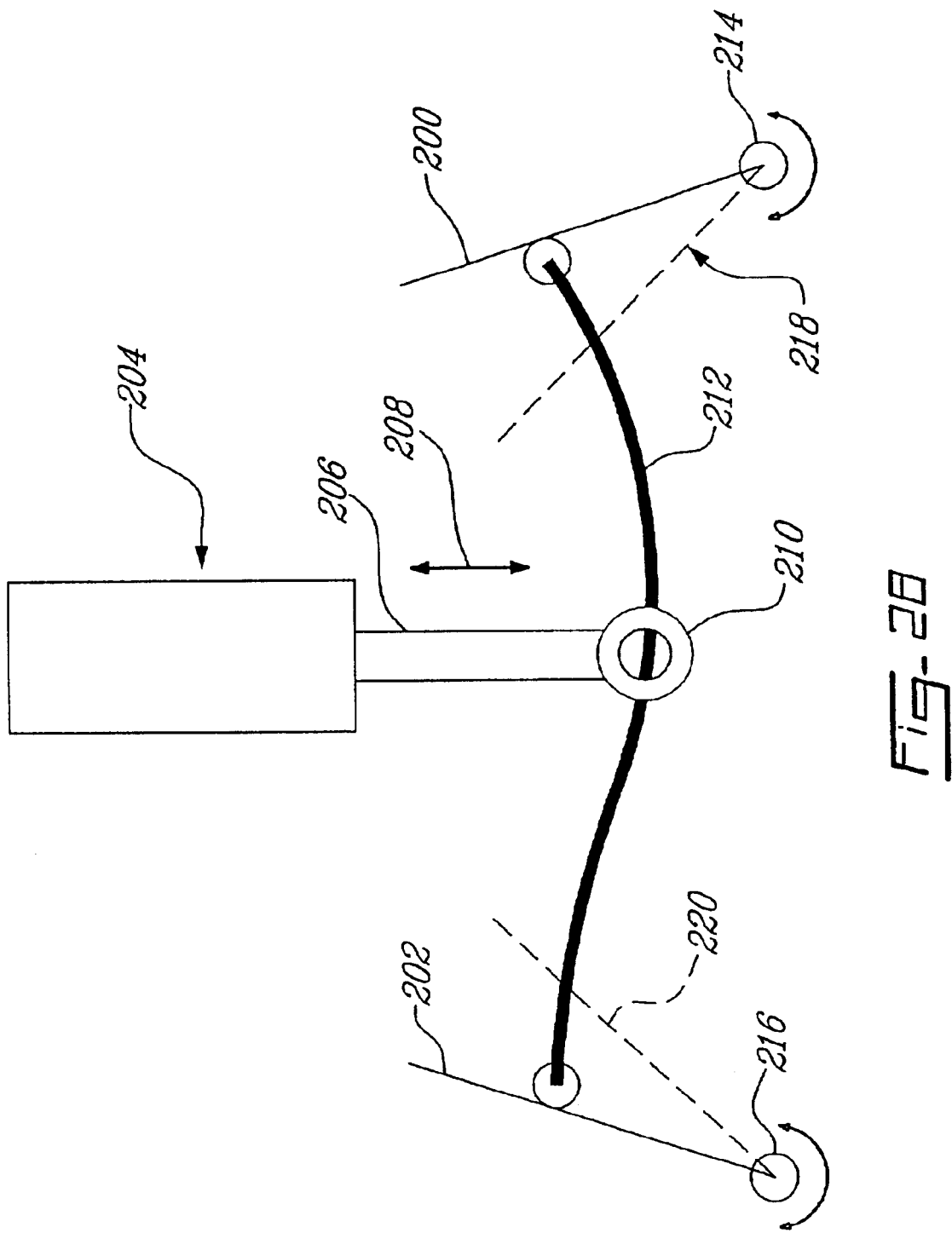
Figure 33:
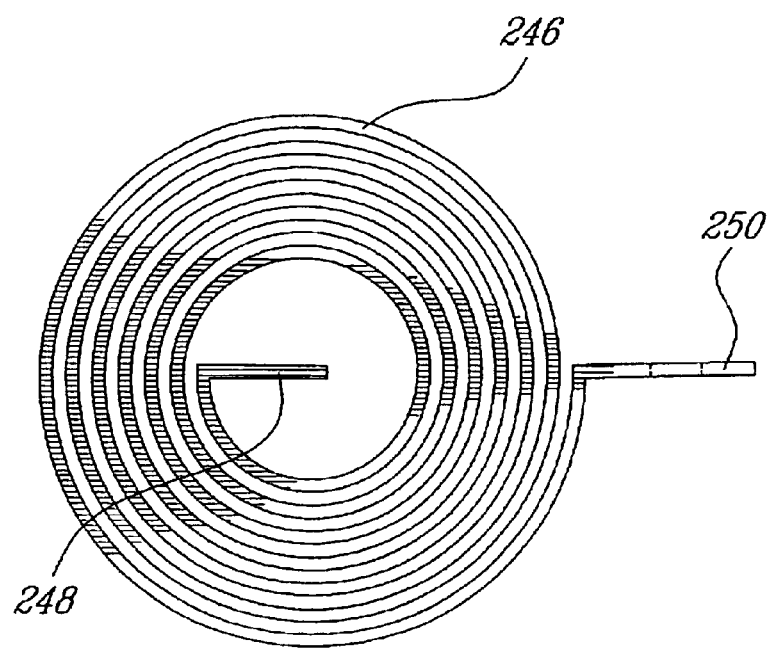
Figure 34:
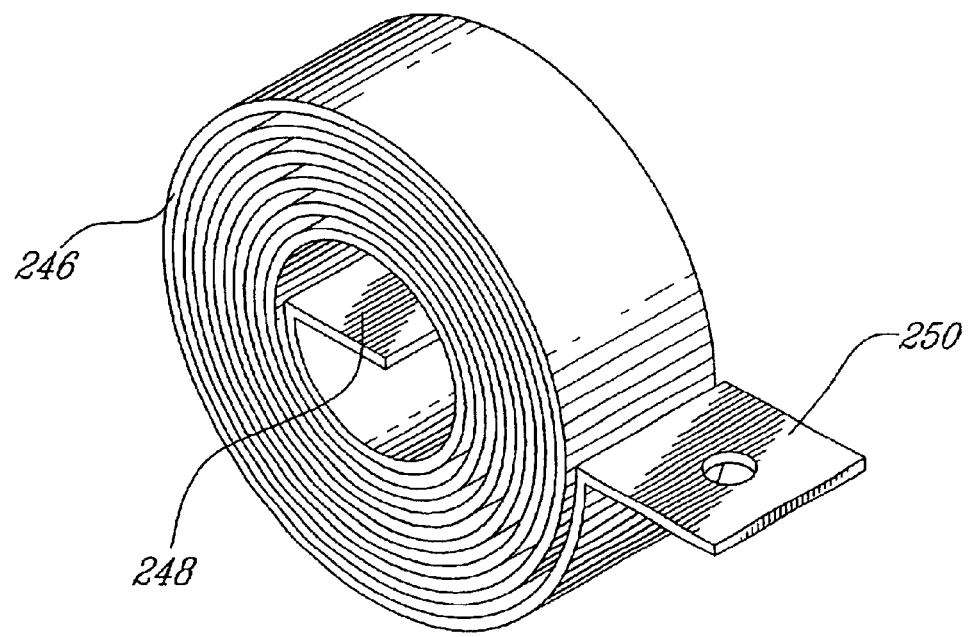
Figure 38:
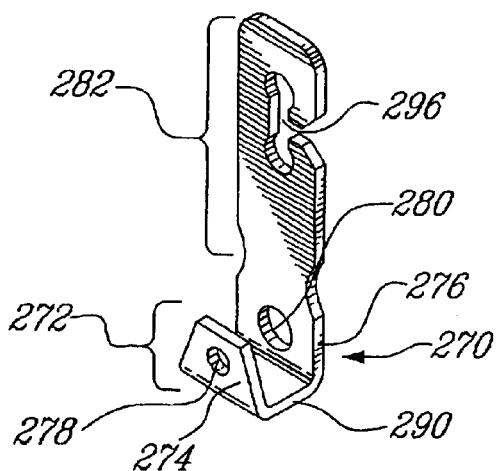
Figure 39:
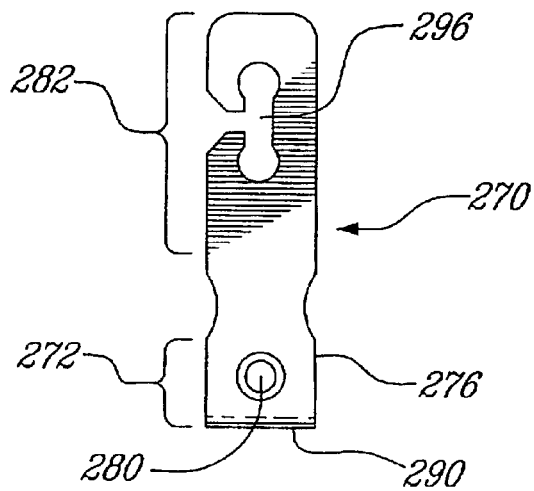
Figure 40:
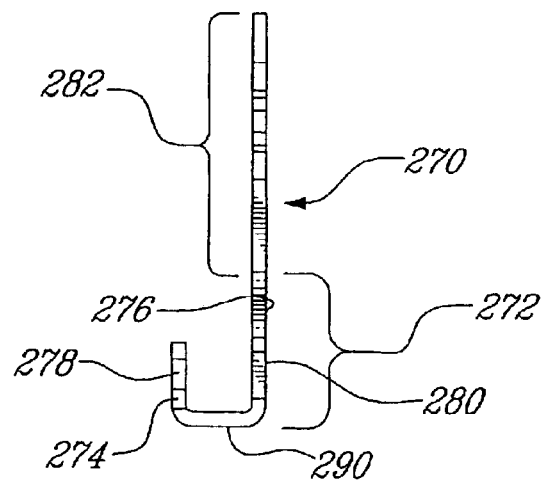
Figure 41:
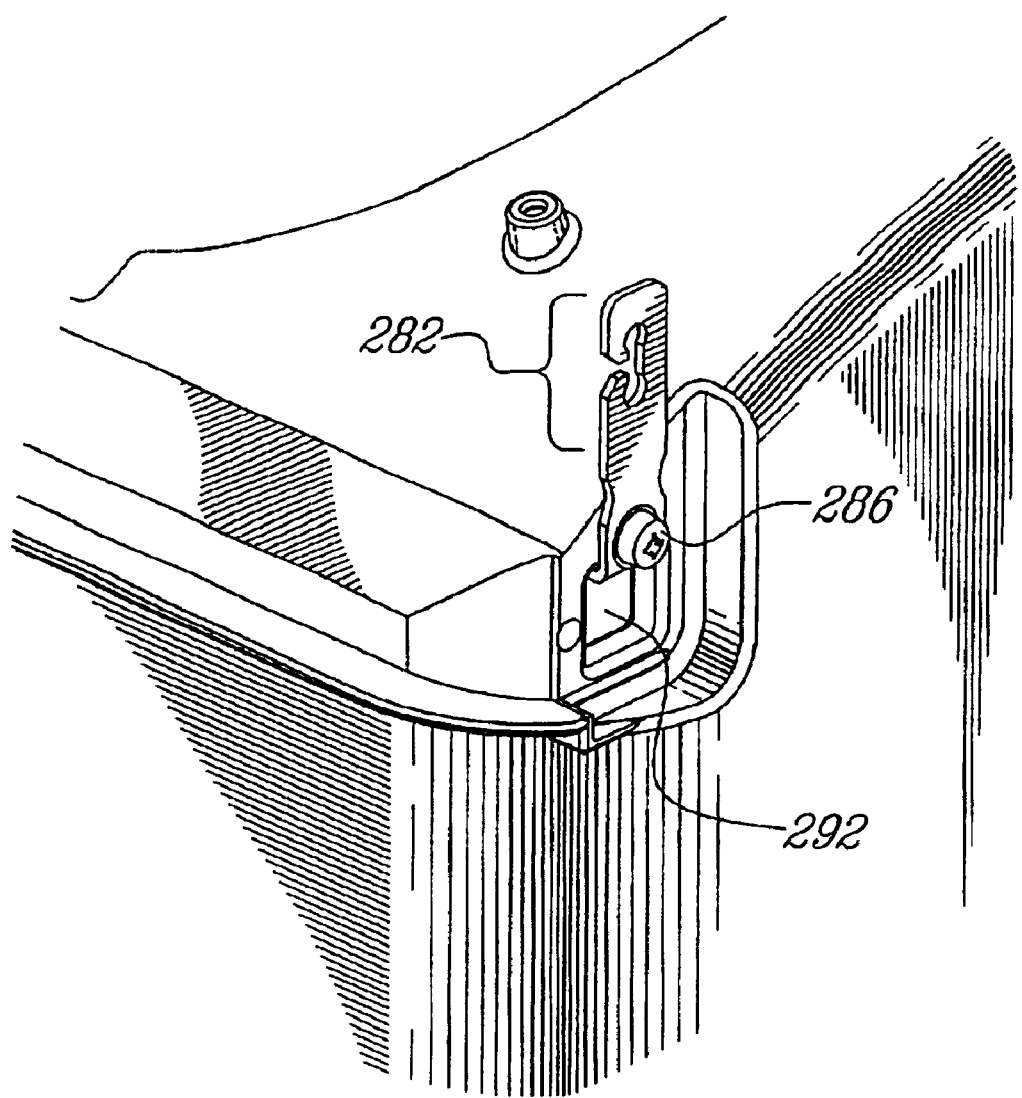
Figure 42:
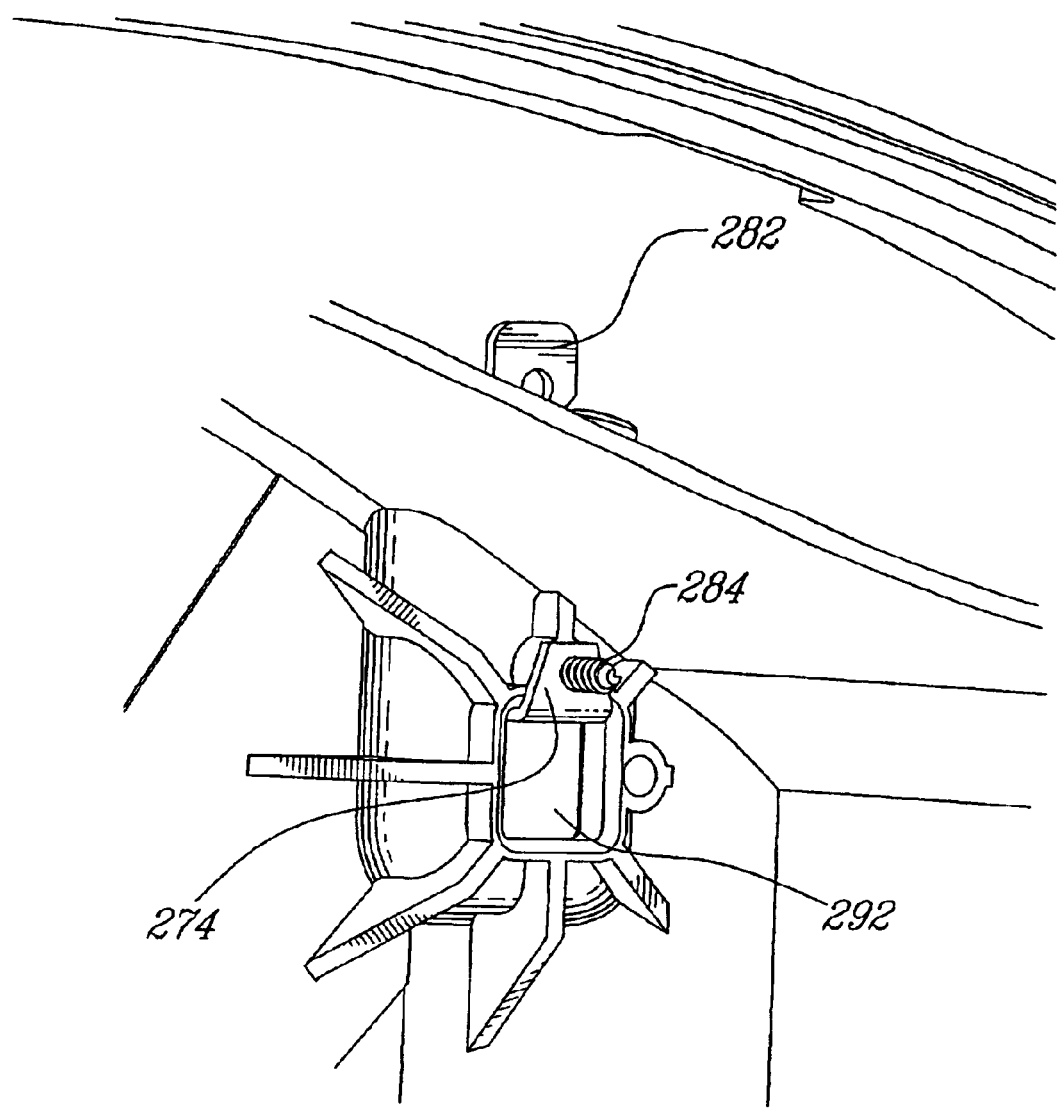
Figure 43:
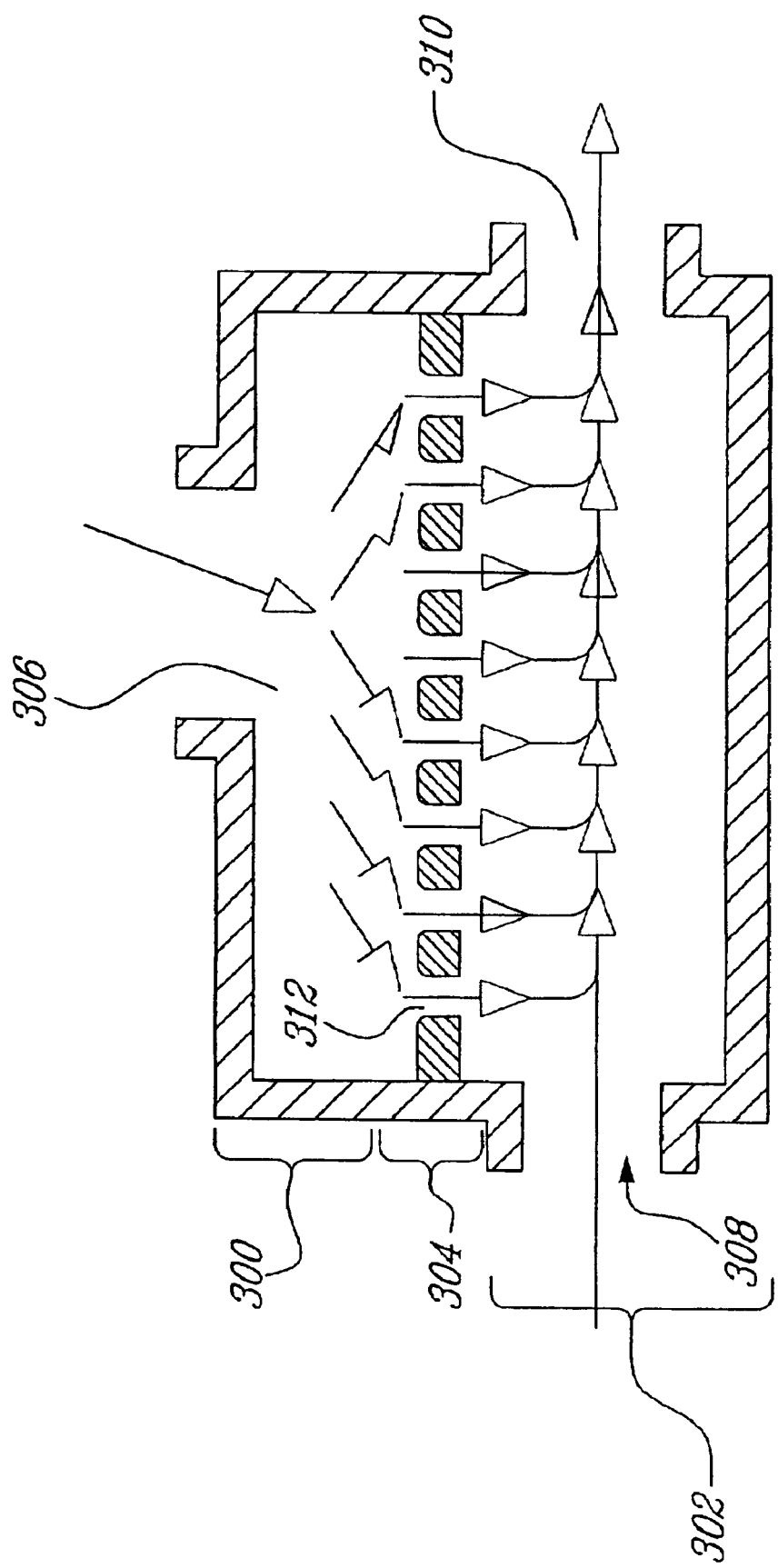
Figure 45:
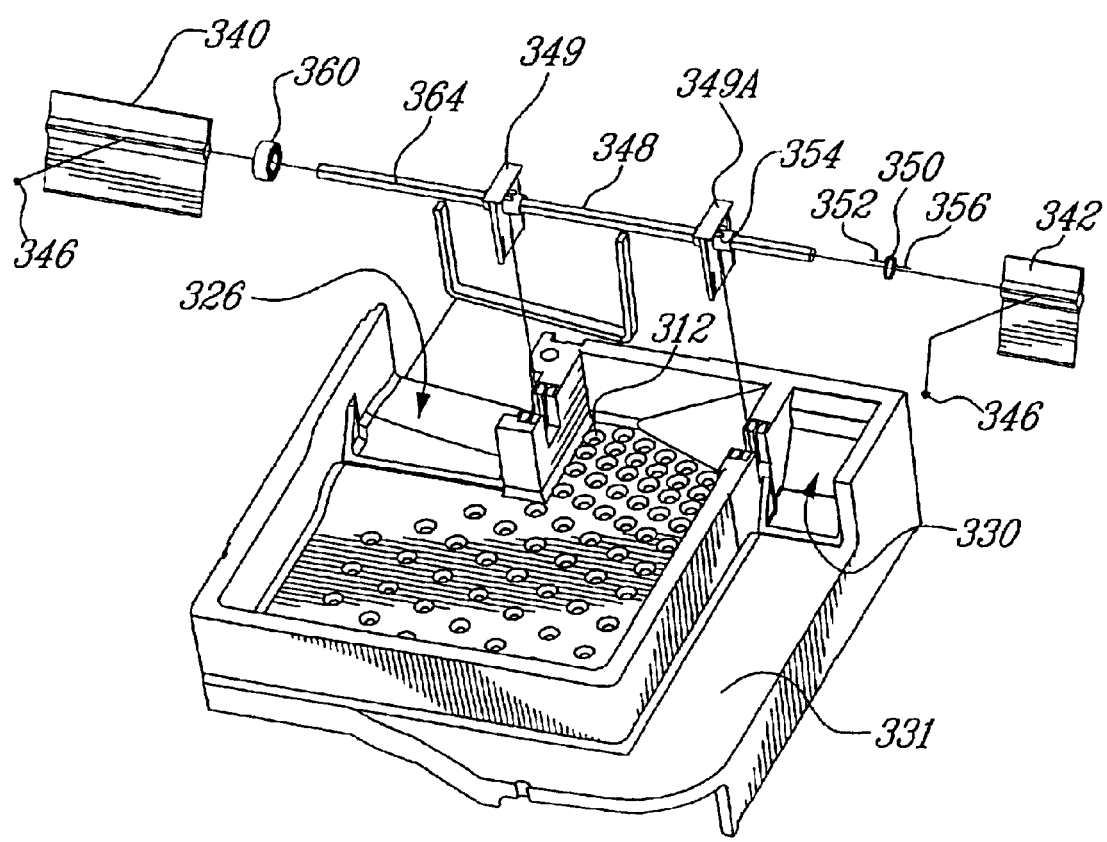
Figure 46:
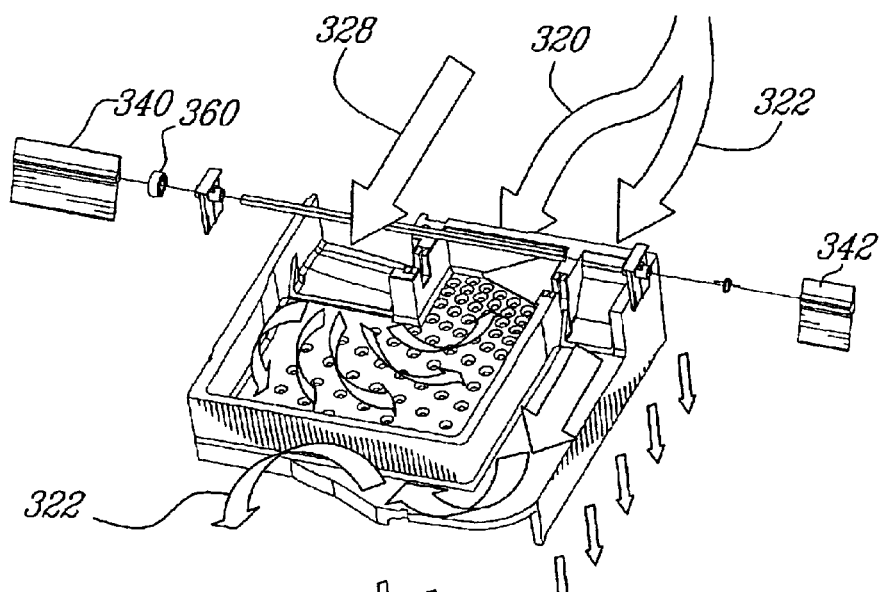
Figure 47:
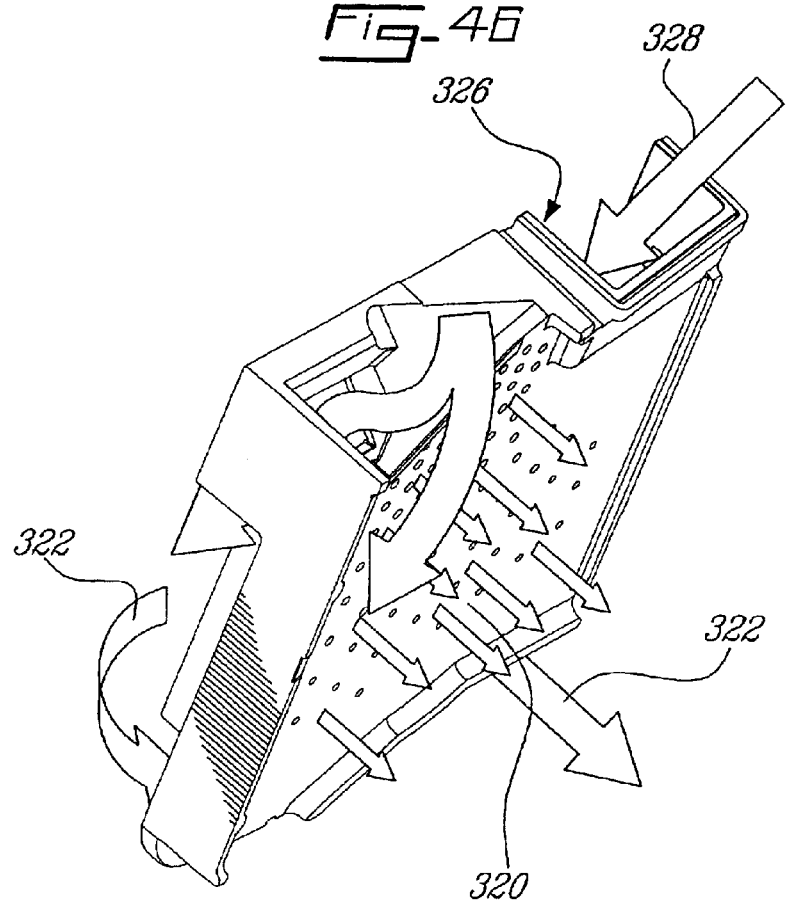
Figure 48:
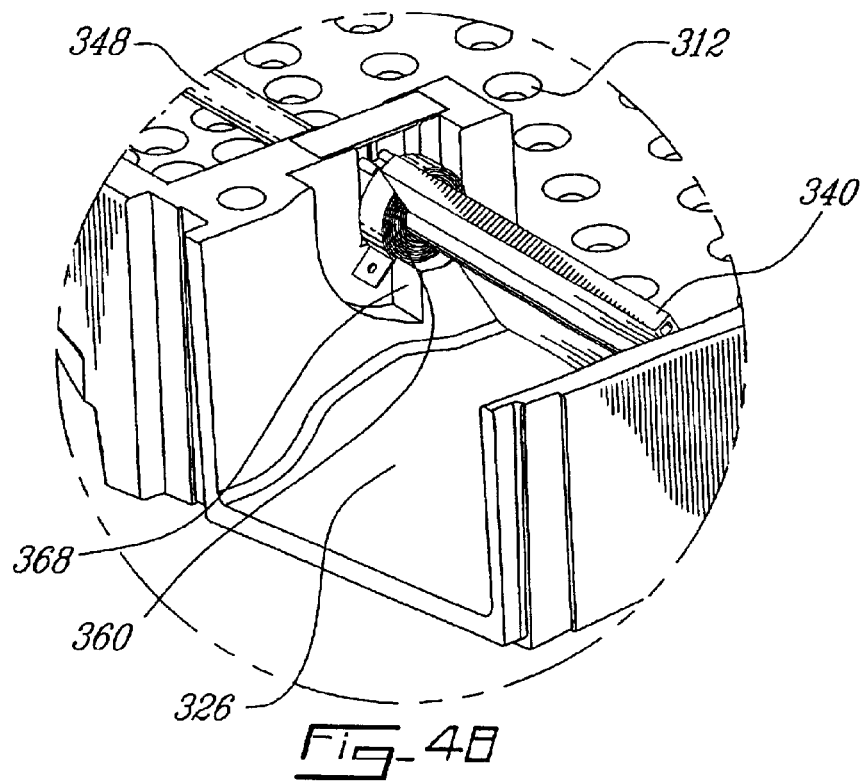
Figure 49:
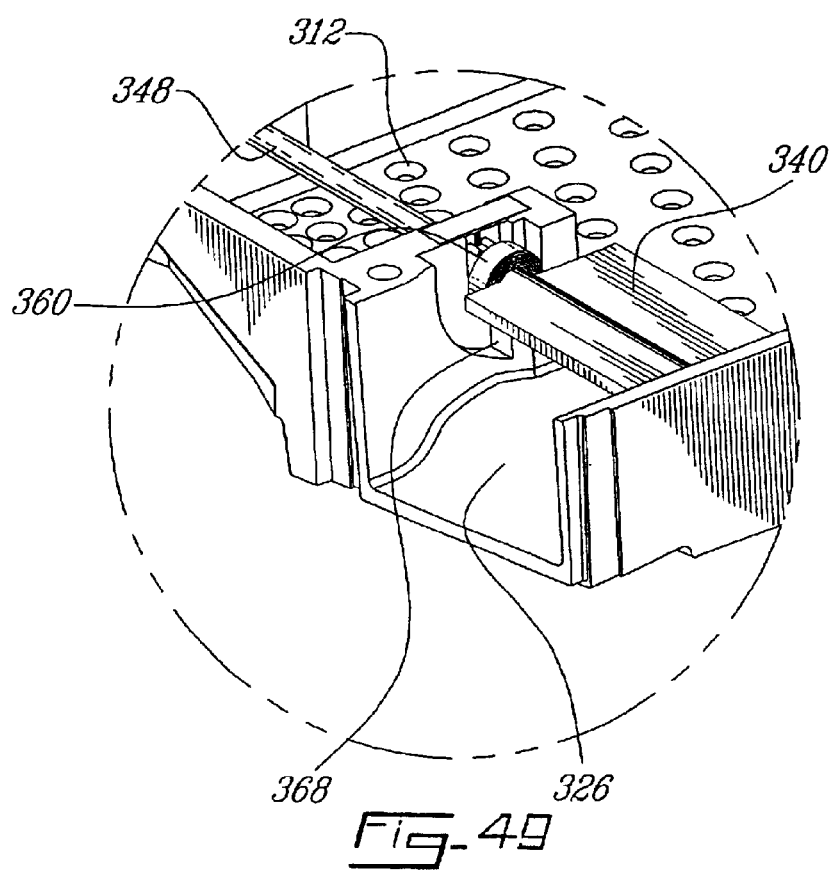
Figure 50:
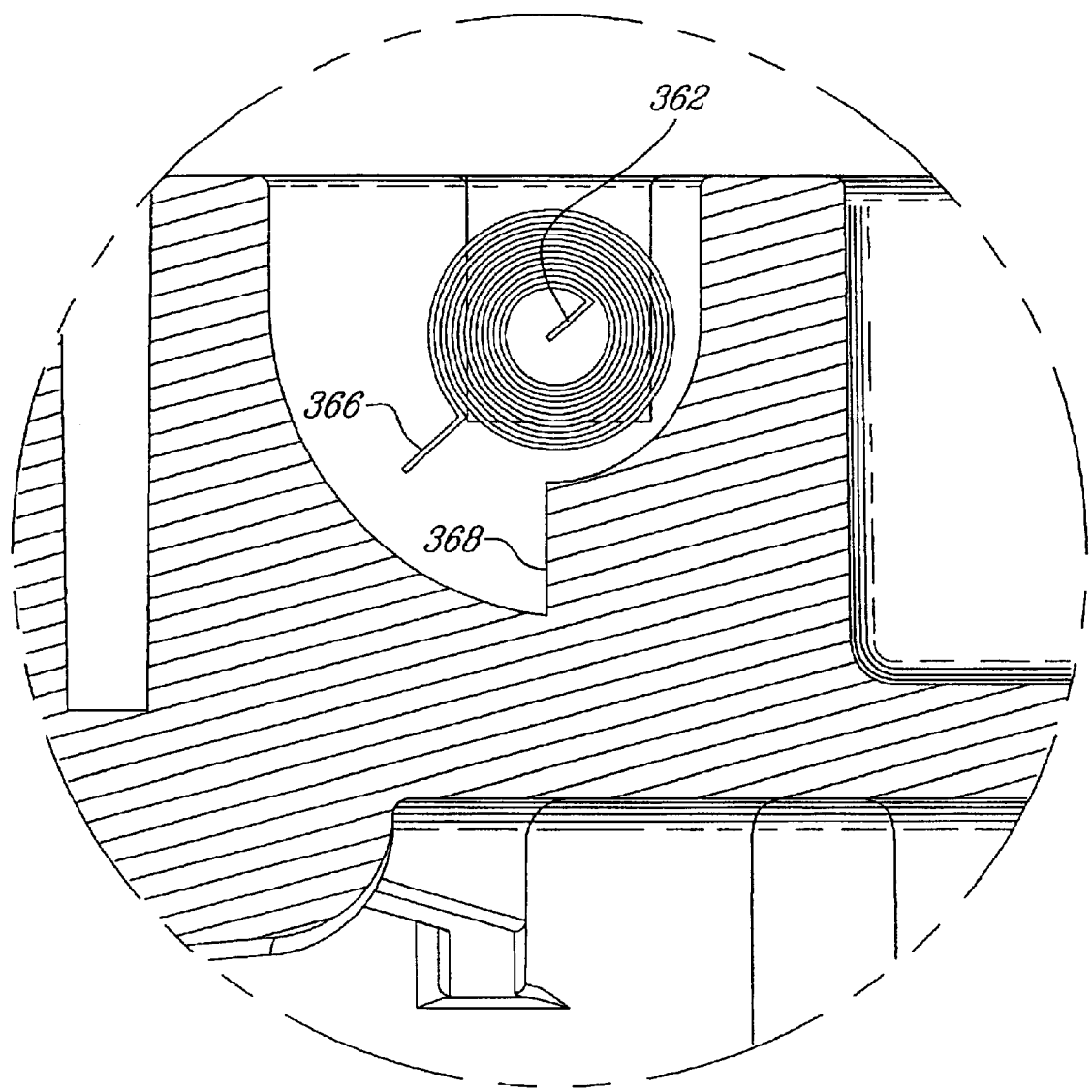
Figure 51:
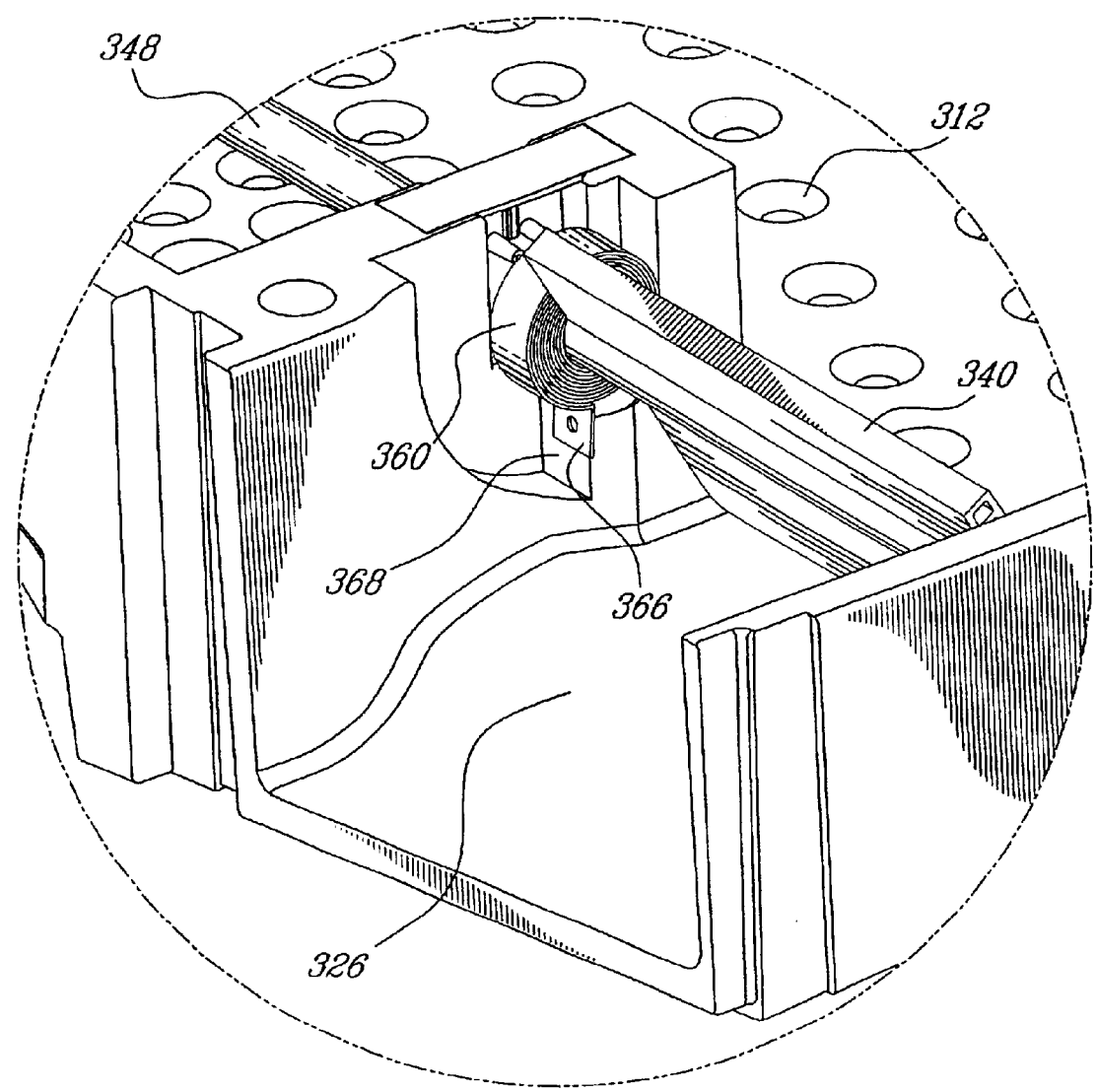
Figure 53:
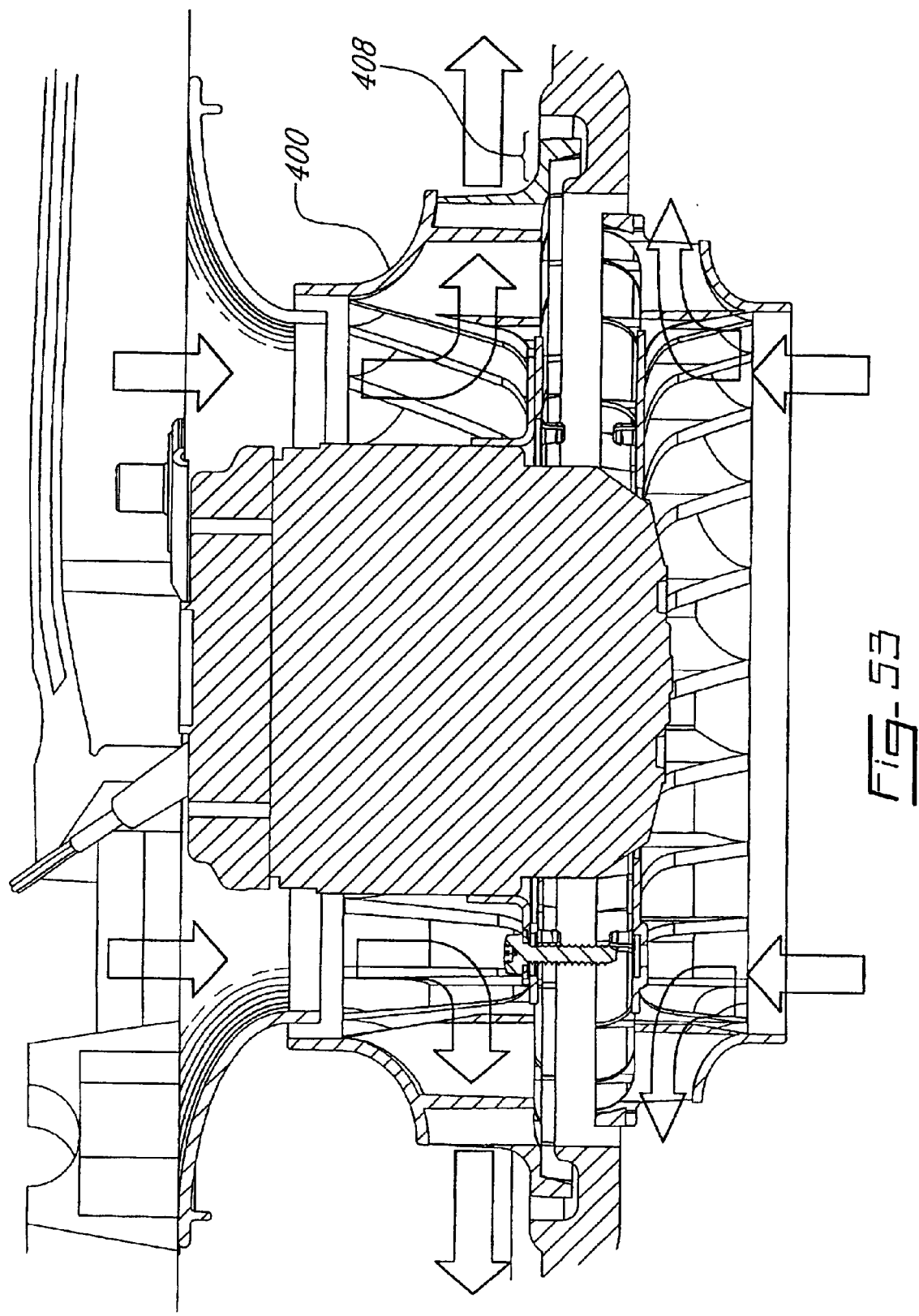
Figure 57:
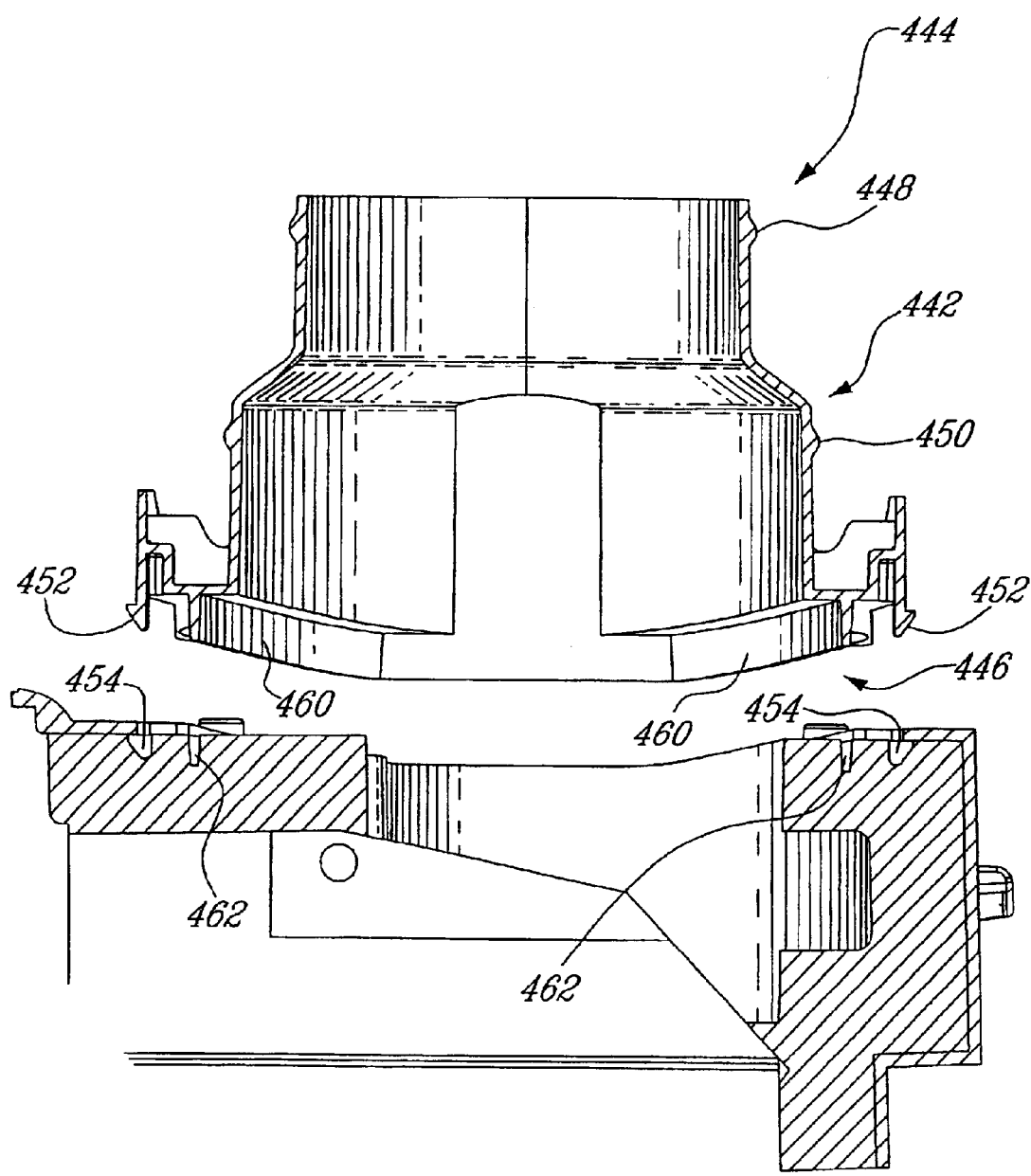
Figure 58:
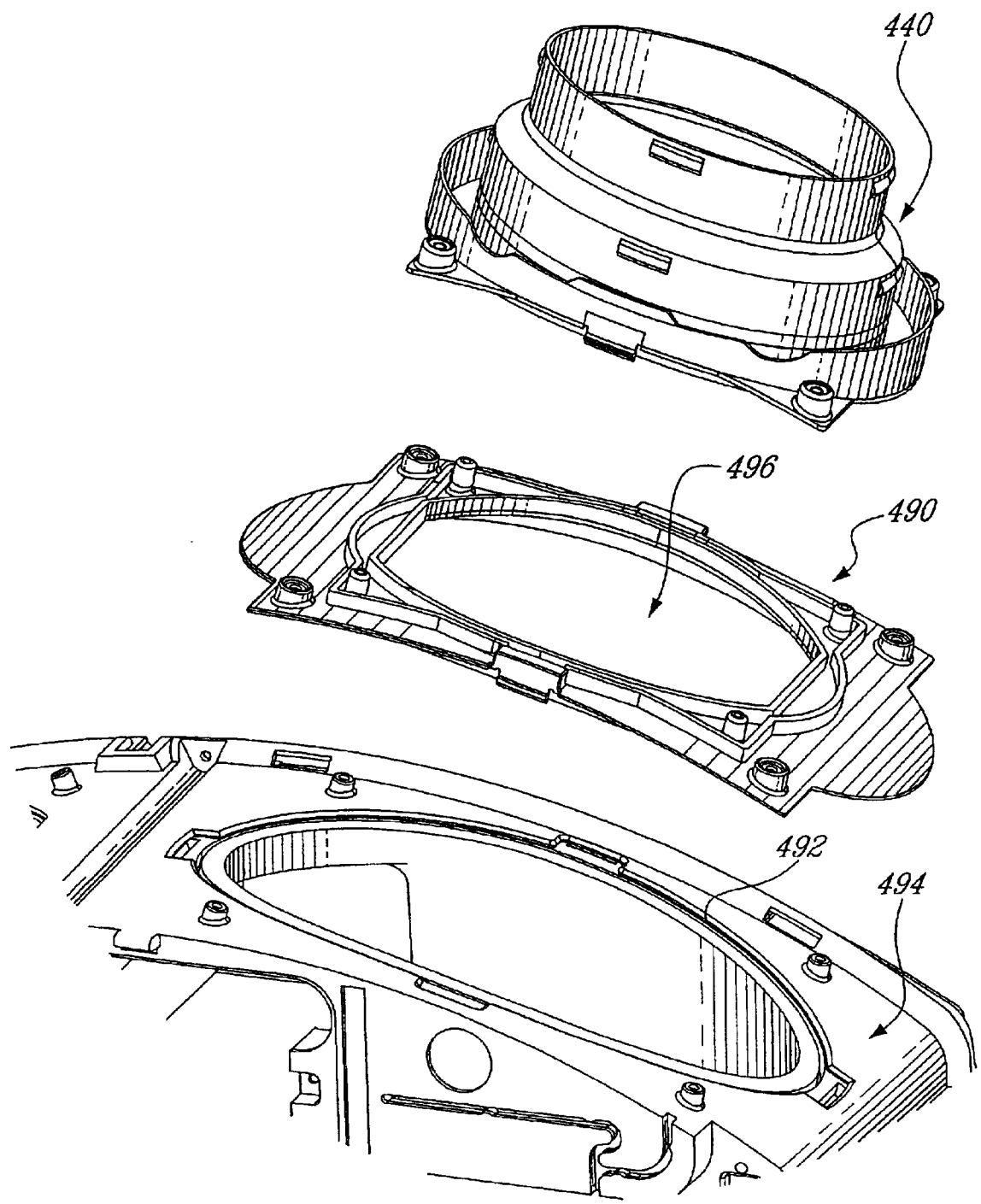

FIG. 5 is a front view of a known ventilation apparatus as described in U.S. Pat. No. 5,193,610 with the front door of the cabinet removed;

FIG. 6 is a rear view of the known ventilation apparatus shown in FIG. 5 with the rear wall of the cabinet removed;

FIG. 7 is a partial schematic rear view of the ventilation apparatus shown in FIG. 6, with the rear wall removed, in the ventilation configuration;

FIG. 8 is a partial schematic front view of the ventilation apparatus shown in FIG. 5, with the front door removed, in the ventilation configuration;

FIG. 9 is a partial schematic rear view of the ventilation apparatus shown in FIG. 6, with the rear wall removed, in the defrost configuration;

FIG. 10 is a partial schematic front view of the ventilation apparatus shown in FIG. 5, with the front door removed, in the defrost configuration;

FIG. 11 is an exploded perspective view of a known motorized assembly for the displacement of a defrost damper member for a ventilation apparatus as shown in FIGS. 5 to 10 comprising a tie rod for connecting the motor to the damper;

FIG. 12 is a front perspective schematic illustration of an example embodiment of a self aligning damper system in accordance with the present invention associated with an electric motor, neither the flexible elongated damper interconnection element nor the ventilation apparatus structure with which the system may be associated being shown;

FIG. 13 is a rear perspective schematic illustration of the example embodiment shown in FIG. 12 showing the end thereof in rotatable engagement with respective support elements;

FIG. 14 is a side cross-sectional schematic illustration of the bobbin element and motor of the example embodiment shown in FIG. 12 showing the ends of the bobbin element in rotatbel engagement with respective support members;

FIG. 15 is a side schematic illustration of the motor of the example embodiment shown in FIG. 12;

FIG. 16 is a front schematic illustration of the motor of the example embodiment shown in FIG. 12 facing the motor rotor;

FIG. 17 is a front perspective schematic illustration of the example embodiment as shown in FIG. 12 but with a single piece example embodiment of the flexible elongated damper interconnection element in the form of a flexible wire threaded through the aperture of the bobbin element;

FIG. 18 is a front perspective schematic illustration of the example embodiment as shown in FIG. 12 but with a two piece example embodiment of the flexible elongated damper interconnection element, each piece being connected to a respective take-up element;

FIG. 19 is a front perspective schematic illustration of the example embodiment as shown in FIG. 12 but with a single piece example embodiment of the flexible elongated damper interconnection element in the form of a flexible loop threaded through the aperture of the bobbin element;

FIG. 20 is a front perspective schematic illustration of the example embodiment as shown in FIG. 19 but wherein the damper connector includes a spring connected to one end of the flexible elongated damper interconnection element;

FIG. 21 is a front perspective schematic illustration of the example embodiment as shown in FIG. 18 but wherein each damper connector includes a spring connected to one end of a respective piece of the flexible elongated damper interconnection element;

FIG. 22 is an enlarged schematic illustration showing the damper connector connection to one end of the flexible elongated damper interconnection elements of FIGS. 17, 18, and 19;

FIG. 23 is an enlarged schematic illustration showing the spring type damper connector connection to one end of the flexible elongated damper interconnection elements of FIGS. 20 and 21;

FIGS. 24 to 26 illustrate in schematic fashion the winding up of a wire loop so as to displace the damper components from a first position (FIG. 24) to a second position (FIG. 26), the winding up proceeding with one of the dampers being prematurely brought to the second position (FIG. 25) before the other and the slippage of the wire loop flights as they are continued to be wound up until the misaligned damper is also brought into the final second position;

FIG. 27 is a schematic representation of an alternate embodiment of a self aligning damper system wherein the bobbin element is engaged to one end of the flexible elongated damper interconnection element;

FIG. 28 is a schematic representation of another alternate embodiment of a self aligning damper system wherein displacement flexible elongated damper interconnection element is accomplished by a linear driving member rather than a rotational driving member;

FIG. 29 is a schematic illustration of a pair of damper elements in respective first position as associated with an air ventilation device, the displacement component of the self aligning damper system not being shown;

FIG. 30 is a schematic illustration of a pair of damper elements in respective second positions as associated with an air ventilation device, the displacement component of the self aligning damper system not being shown;

FIG. 31 illustrates a schematic perspective side view of an example embodiment of a two part damper in accordance with the present invention;

FIG. 32 illustrates an exploded perspective side view of the example two part damper shown in FIG. 31 in the process of being assembled;

FIG. 33 is a side view of an example embodiment of a temperature responsive bimetallic spring actuator;

FIG. 34 is a perspective side view of the example embodiment of a temperature responsive bimetallic spring actuator shown in FIG. 33;

FIG. 35 illustrates in schematic fashion the two part damper disposed in an air path (structure defining air path not shown) wherein the temperature of the ambient air is such that the choke damper does not impede air flow (i.e. a minimal air flow constraint is presented by the choke damper);

FIG. 36 illustrates in schematic fashion the two part damper disposed in an air path (structure defining air path not shown) wherein the temperature of the ambient air is such that the choke damper does present a partial impediment to air flow (i.e. an intermediate air flow constraint is presented by the choke damper);

FIG. 37 illustrates in schematic fashion the two part damper disposed in an air path (structure defining air path not shown) wherein the temperature of the ambient air is such that the choke damper does present a maximal impediment to air flow (i.e. a maximal air flow constraint is presented by the choke damper);

FIG. 38 is a left perspective side view of one side of an example embodiment of a connector in accordance with the present invention;

FIG. 39 is a rear view of the example embodiment shown in FIG. 38;

FIG. 40 a side view of the example embodiment shown in FIG. 38;

FIG. 41 is a schematic partial cut away side view of a connector of FIG. 38 wherein the U-shaped portion is in engagement with a housing structure comprising friable material;

FIG. 42 is a schematic partial cut away view from the inside of the housing structure the connector as shown in FIG. 41;

FIG. 43 is a schematic cross sectional view of an example air intermingling assembly in accordance with the present invention wherein the intermediate air dispenser or dispersal zone is provided with a plurality of evenly spaced apertures;

FIG. 44 is a schematic cross sectional view of another example air intermingling assembly in accordance with the present invention wherein the intermediate air dispenser or dispersal zone is provided with a plurality of spaced apertures distributed so as to provide n aperture pattern comprising a first aperture region and a second aperture region, the first region comprising a higher number of apertures than said second region;

FIG. 44a is a schematic cross sectional view of an example air intermingling assembly along the lines of the assembly shown in FIG. 44 illustrating the graduated fresh air flow through the apertures of the dispenser zone which diminish starting from the high number of apertures adjacent the stale air inlet;

FIG. 45 is a side schematic perspective view of a substantial portion of an example air intermingling assembly for a ventilation system or apparatus for exchanging air between the interior and exterior of an enclosed space (i.e. of a building, room or the like), including an exploded view of an example choker damper assembly;

FIG. 46 is a side schematic perspective view of the example air intermingling assembly as shown in FIG. 45 wherein arrows show the input air flow to the air input vessel component, exhaust stale air outflow for being exhausted and stale air input to the intermingling compartment component;

FIG. 47 an underside schematic perspective view of the example air intermingling assembly as shown in FIG. 45 wherein arrows how the input air flow to the air input vessel component, exhaust stale air outflow for being exhausted and stale air input to the intermingling compartment component;

FIG. 48 is an enlarged schematic view of the first choker damper associated with said fresh air input component in a biased closed position;

FIG. 49 is an enlarged schematic view of the first choker damper associated with said fresh air input component in an open position due to the influence of fresh air flow (i.e. induced by appropriate fan or blower means not shown);

FIG. 50 is an enlarged schematic partial sectional view through the temperature response actuator means wherein the outer projection is shown in a non-inhibiting position with respect to the closed position of the choker damper;

FIG. 51 is an enlarged schematic partial perspective showing the temperature response actuator means of FIG. 50 wherein the outer projection is shown in an inhibiting position with respect to the closed position of the choker damper;

FIG. 52 is a schematic illustration of an known blower wheel assembly associated with a motor and baffle elements;

FIG. 52a is a schematic illustration of an example blower wheel assembly in accordance with the present invention;

FIG. 53 is a more detailed schematic illustration of the blower wheel assembly shown in FIG. 52;

FIG. 54 is a perspective view of an example air ventilation housing to which are connected example embodiments of quick connect mounting ports in accordance with the present invention;

FIG. 55 is a perspective view from below of a quick connect mounting port in accordance with the present invention showing an oval shaped sealing projection;

FIG. 56 is a perspective view from above of an opening element of an air ventilation apparatus showing an oval shaped groove for sealing engagement with te sealing projection shown in FIG. 55;

FIG. 57 is a schematic partial cross sectional view of a mounting port in position for engagement of its sealing projection with the groove of the opening element; and FIG. 58 is a perspective exploded view of a mounting port being in position for engagement with a mounting sealing plate in turn in position for engagement with an opening element larger than initially designed for the mounting port.

Ventilation Method

Figure 1:
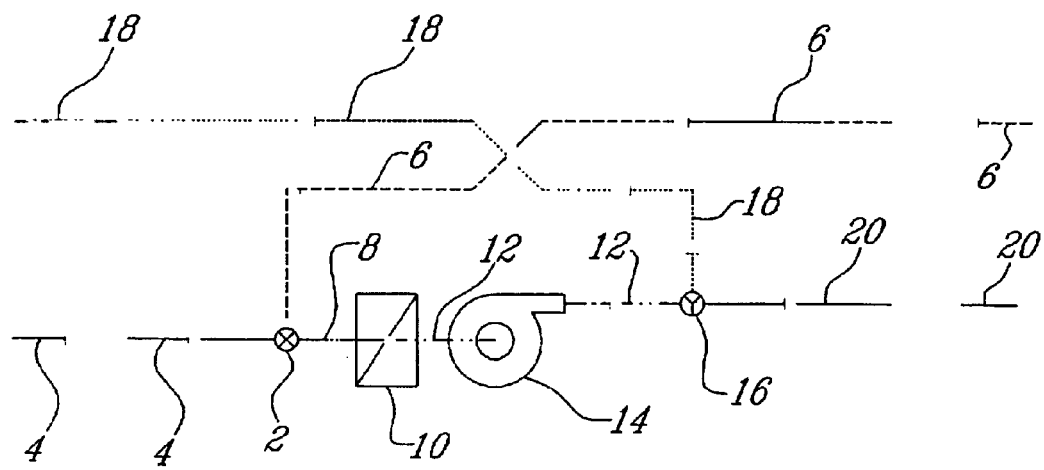
FIG. 1 is a schematic illustration of airflow through a known integrated supply and exhaust ventilator system or apparatus without sensible heat exchanger or desiccant exchanger (i.e. without any transfer of water moisture and sensible heat)

Referring to FIG. 1, this figure illustrates a known integrated fresh air supply and exhaust air ventilator system which exploits an air flow pre-mixing stage 2 wherein a fresh air flow 4 drawn from outside of an enclosure (e.g. dwelling, not shown), is mixed with a stale air flow 6 drawn from within the enclosure so as to produce a resulting intermingled (i.e. a mixed) airflow 8 which as may be seen is a combination of the total of the stale and fresh air flows. The so obtained total intermingled (i.e. mixed) air flow 8 is then passed through an air filter or purifier stage 10 so as to obtain a filtered intermingled air flow 12.

After the air filtering/purifying stage the filtered intermingled air flow 12 is passed through a blower assembly 14 to an upstream air splitting stage 16 wherein the filtered intermingled air flow 12 is divided into an exhaust (treated-filtered) air flow portion 18 for exhaustion outside of the enclosure and a treated (i.e. filtered) air flow supply 20 for delivery into the enclosure (e.g. dwelling).

Although the illustrated ventilation system does introduce fresh air from outside of an enclosure into the enclosure, the main drawback with this known system is that part of treated (i.e. filtered) air is exhausted outside the enclosure (e.g. dwelling). This reduces the efficiency of the filtering/purifying capability of the system for the enclosure (e.g. dwelling).

Figure 2:
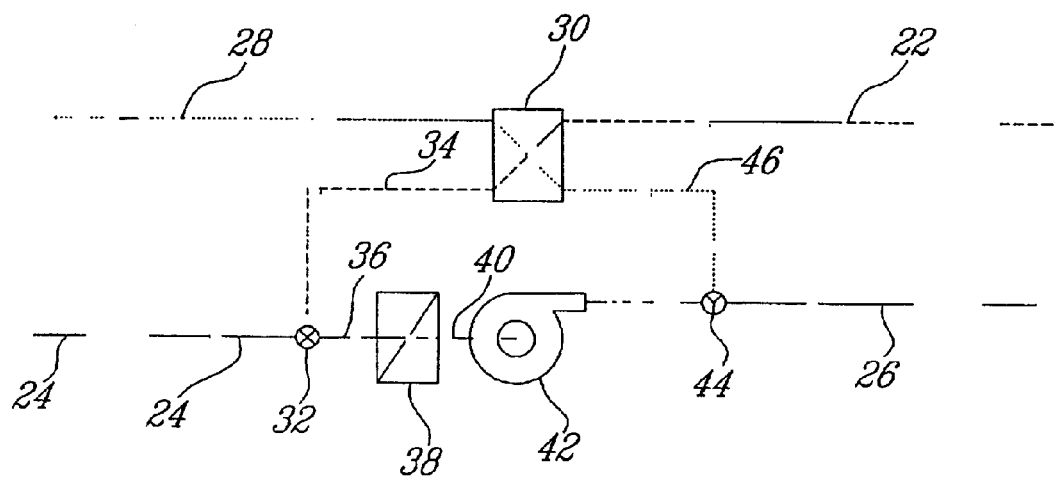
FIG. 2 is schematic illustration of airflow through a known integrated supply and exhaust ventilator system or apparatus with sensible heat exchanger and/or desiccant exchanger (i.e. with transfer of water moisture and sensible heat)

Referring to FIG. 2 this figure illustrates in schematic fashion a modified known integrated supply and exhaust ventilator system. There is a fresh air inflow 22 from the exterior of the enclosure and a stale air inflow 24 from the interior of the enclosure; there is also a treated air outflow 26 to the enclosure and an exhaust air outflow 28 to the exterior of the enclosure. The modified system includes a heat exchange or transfer stage 30, such as for example an air-to-air sensible heat exchanger and/or desiccant exchanger (i.e. for the air-to air transfer of water moisture and/or sensible heat). The system also exploits an air flow pre-mixing stage 32 wherein the heat treated fresh air flow 34 is mixed with the stale air flow 24 so as to produce a resulting intermingled (i.e. a mixed) airflow 36 which as may be seen is a combination of the total of the stale and fresh air flows. The so obtained total intermingled (i.e. mixed) air flow 36 is then passed through an air filter or purifier stage 38 so as to obtain a filtered intermingled air flow 40. After the air filtering/purifying stage the filtered intermingled air flow 40 is passed through a blower assembly 42 to an upstream air splitting stage 44 wherein the filtered intermingled air flow 40 is divided into an exhaust (treated-filtered) air flow portion 46 and the treated (i.e. filtered) air flow supply 26 for delivery into the enclosure (e.g. dwelling).

As may be seen the heat exchange or transfer stage 30 provides for a heat exchange or transfer between the fresh air inflow 22 and the exhaust air flow portion 46 to produce the heat treated outflow 28.

This type of known heat exchange system has a drawback in addition to the drawback discussed above with respect to the system illustrated in FIG. 1. The efficiency of this illustrated known heat exchange system is reduced since a portion of the fresh airflow is subjected to a second heat exchange treatment, namely, the portion of the fresh airflow associated with the exhaust air portion is again subjected to heat exchange prior to being exhausted.

Figure 3:
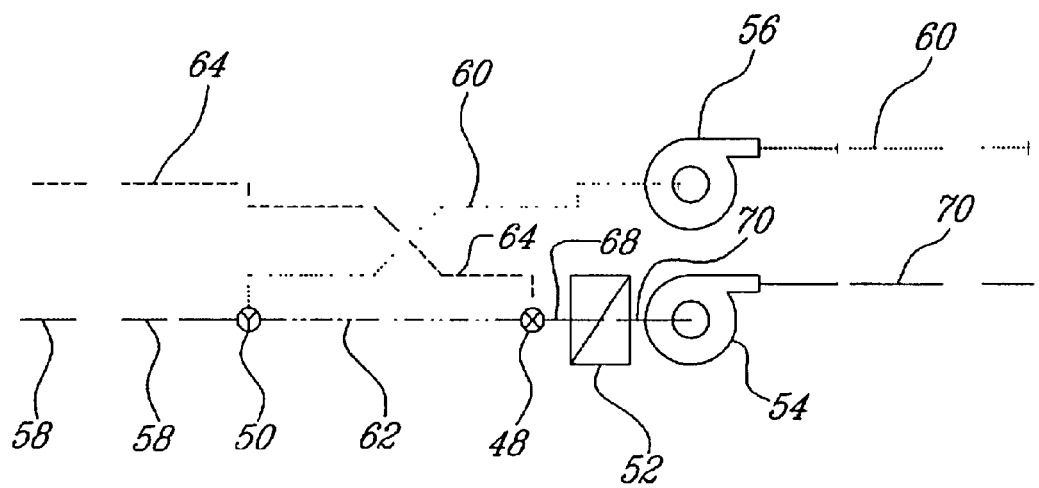
FIG. 3 is a schematic illustration of airflow through an example embodiment of an integrated supply and exhaust ventilator system or apparatus of the present invention without sensible heat exchanger or desiccant exchanger (i.e. transfer of water moisture and sensible heat)

Referring to FIG. 3, this figure shows in schematic fashion an example embodiment of a integrated supply and exhaust ventilator system in accordance with the present invention. In general as may be seen the fresh air pre-mixing stage 48 and the stale air splitting stage 50 are both disposed downstream of the air filter or purifier stage 52. The system illustrated employs two blower assemblies 54 and 56 which are respectively disposed on the upstream sides of the fresh air pre-mixing stage 48 and stale air splitting stage 50; one or both of the blowers could of course be disposed on the downstream sides of the fresh air pre-mixing stage 48 and stale air splitting stage 50. Thus as may be seen a stale air flow stream 58 is delivered to the stale air splitting stage 50 which divides the air flow into an exhaust (untreated) air flow portion 60 for exhaustion (via a blower assembly 56) directly outside of the enclosure and a stale airflow portion 62 for delivery to the fresh air pre-mixing stage 48 wherein the fresh air flow 64 from outside of the enclosure is intermingled (e.g. mixed) with the stale airflow portion to provide an untreated intermingled (i.e. a mixed) airflow 68. The untreated intermingled (i.e. a mixed) airflow 68 is then passed through the air filter or purifier stage 52 so as to obtain a filtered intermingled (i.e. a mixed) airflow 70 which is then passed through the blower assembly 54 into the enclosure (e.g. dwelling). The fresh air premixing stage 48 and stale air splitting stage 50 may take any desired or known form; they may for example take the form of the air intermingling assembly as described herein.

An advantage with this new system is that the stale air is exhausted to the outside of the enclosure to outside without any prior air treatment. Additionally fresh air from outside is added to the stale air to be treated (i.e. filtered) just before the filter/purification process. Therefor only the necessary airflow is treated (i.e. filtered) prior distribution in the dwelling.

Figure 4:
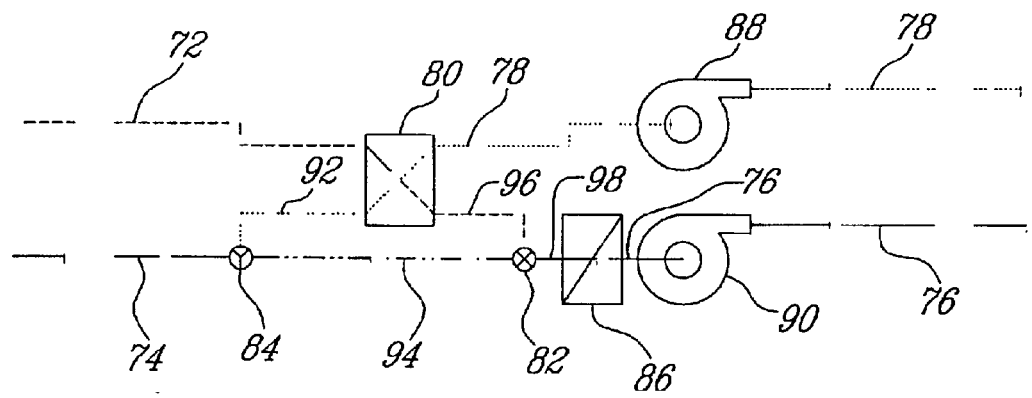
FIG. 4 is a schematic illustration of airflow through an example embodiment of an integrated supply and exhaust ventilator system or apparatus of the present invention with sensible heat exchanger and/or desiccant exchanger (i.e. with transfer of water moisture and sensible heat)

Referring to FIG. 4 this figure illustrates in schematic fashion a modified version in accordance with the present invention of the integrated supply and exhaust ventilator system as shown in FIG. 3. There is a fresh air inflow 72 from the exterior of the enclosure and a stale air inflow 74 from the interior of the enclosure; there is also a treated air outflow 76 to the enclosure and a heat treated exhaust air outflow 78 to the exterior of the enclosure. The modified system includes a heat exchange or transfer stage 80, such as for example an air-to-air sensible heat exchanger and/or desiccant exchanger (i.e. for the air-to air transfer of water moisture and/or sensible heat). The system has a fresh air pre-mixing stage 82 and a stale air splitting stage 84 which are both disposed downstream of the air filter or purifier stage 86. The system illustrated employs two blower assemblies 88 and 90 which are respectively disposed on the upstream sides of the fresh air pre-mixing stage 82 and stale air splitting stage 84. Thus as may be seen the stale air flow stream 74 is delivered to the stale air splitting stage 84 which divides the air flow into an exhaust (untreated) air flow portion 92 and a stale airflow portion 94. The air flow portion 92 is delivered to the heat exchange or transfer stage 80 for heat transfer with the fresh air inflow 72 to produce the heat treated exhaust air outflow 78 which is exhausted (via a blower assembly 88) outside of the enclosure. The stale airflow portion 94 is delivered to the fresh air pre-mixing stage 82 wherein the heat treated fresh air flow 96 from the heat exchange or transfer stage 80 is intermingled (e.g. mixed) with the stale airflow portion 94 to provide an intermingled (i.e. a mixed) airflow 98. The intermingled (i.e. a mixed) airflow 98 is then passed through the air filter or purifier stage 86 so as to obtain the filtered intermingled (i.e. a mixed) airflow 76 which is then passed through the blower assembly 90 into the enclosure (e.g. dwelling). The fresh air pre-mixing stage 82 and stale air splitting stage 84 may take any desired or known form; they may for example take the form of the air intermingling assembly as described herein.

As may be seen in accordance with the system shown in FIG. 4, the fresh air flow is first directed to the heat exchange or transfer stage and the heat treated fresh air flow leaving the heat exchange stage is directed to the pre-mixing stage whereas the untreated (i.e. unfiltered) exhaust stale air flow portion prior to exhaustion outside of the enclosure (e.g dwelling) is directed to the heat exchange or transfer stage and the heat treated exhaust stale air flow portion is then directed outside of the enclosure (e.g. dwelling).

An additional advantage with this new modified system is improved efficiency since fresh airflow is not subjected to a further heat exchange through the sensible heat exchanger and/or desiccant exchanger stage as part of the exhausted air, i.e. which is the case for the system shown in FIG. 2. Thus the size of the sensible heat exchanger or desiccant exchanger may be reduced as compared to the system depicted in FIG. 2.

The method, system, device etc. for intermingling air may for example exploit any known air handling components keeping in mind their function.

Damper System and Auto Activating Choker

Turning to FIGS. 5 to 11 these figures illustrate a prior art ventilation apparatus which exploits a pair of dampers 100 and 102 and a pair of motor assemblies 104 and 106 for contemporaneous displacement from respective first to respective second positions (as shown by the arrows 108 and 110) in order to place the ventilation apparatus in ventilation mode or defrost mode. More particularly, FIGS. 5, 6, 7 and 8 show a ventilation configuration wherein the pair of dampers 100 and 102 are each in a ventilation configuration; whereas FIGS. 9 and 10 show a defrost configuration wherein the dampers 100 and 102 are each in a defrost configuration.

Thus, as may be seen in FIGS. 7 and 8, fresh air is confined to the air path outlined by the arrows 106 on the other hand the exhaust air is confined to the air path outlined by the arrows 108. On the other hand as may be seen in FIGS. 9 and 10, fresh air is excluded from the apparatus and at the same time, exhaust or stale warm air from the interior of the building circulates through the apparatus as outlined by the arrows 110.

The damper members 102 and 104 are for example described in U.S. Pat. No. 5,193,610 (see FIG. 11) as being displaced between the ventilation configuration and the defrost configuration by means of a motor 112 and rod 114 arrangement which includes a spring member 116 for biasing the damper members in one configuration, the motor 112 being used to displace a damper member to the other configuration.

For more details with respect to the ventilation apparatus structure reference may be made to U.S. Pat. No. 5,193,610 mentioned above.

As mentioned use of tie rods to contemporaneously displace the damper members or components requires significant precision. Such initial precision may be lost over time as the tie rods and other connected members deform due to extended use.

Referring to FIGS. 12 to 15 illustrate an example embodiment of a damper (actuation) system in accordance with the present invention, the flexible (i.e. elastic or non-elastic) elongated damper interconnection element not being shown (see FIGS. 17 to 23 which illustrate example flexible elongated damper interconnection elements for use with the components shown in FIGS. 12 to 15).

The damper (actuation) system comprises two damper elements 118 and 120. The dampers 118 and 120 are each provided with a pair of opposed pin elements 122 for their pivot connection to or engagement with corresponding pivot engagement members (e.g. openings) defined by the support structure of an air handling system such as for example an air ventilation device (not shown). A bias spring 124 is associated with a pin element of each damper for biasing the dampers in a first position.

The displacement component for displacing the damper elements from a respective first position to a respective second position comprises an intermediate (wind-up) pulley or bobbin element 126. The bobbin element 126 is (reversibly) rotatable about an axis of rotation 128; the ends 130 and 132 of the bobbin element 126 are configured to rotatably engage with respective openings of a support element (only one such support element 136 is partially shown with such opening 138). The bobbin element defines an aperture or hole 140. The bobbin element 126 comprises a slippage engagement component for slippingly engaging a flexible elongated damper interconnection element. The slippage engagement component shown comprises two take-up elements 142 and 144 and the aperture 140. As may be seen the aperture 140 is disposed between the take-up elements. Referring to FIGS. 17, 19 and 20, these figures illustrate examples of single (piece) flexible elongated damper interconnection elements (i.e. damper wires 146, 148 and 150) which may be associated with the bobbin element 126 shown. As may be seen from FIGS. 17, 19 and 20 the examples 146, 148 and 150 of single (piece) flexible elongated damper interconnection element are (loosely) threaded through the aperture 140. Referring in particular to FIG. 19 the damper interconnection element 148 is a flexible loop shaped damper interconnection element having a first loop end and a second loop end connected to respective dampers. The damper interconnection element 148 has a first flight side 148*a* and an opposed second flight side 148*b*. The first and second flight sides are each connected respectively to the first and second ends and are each threaded through the aperture.

Referring back to FIGS. 12 and 13 each of the take-up elements 142 and 144 has an engagement element 152 and 154 (i.e. rounded cross member) which is provided with curved or rounded surfaces which facilitate slidding or slipping engagement between the up-take elements and the elongated damper interconnection element. As may be appreciated the rounded cross members 152 and 154, are to act in the nature of cams, so as to allow the above mentioned single piece elongated damper interconnection elements (e.g. wire 146, 148 and 150) to slide freely on the pulley or bobbin 126 when one damper is in its final second position and the other is not, i.e. the system is able to self align by being able to take up the slack of the part of the elongated damper interconnection element attached to the lagging damper. In other words if a damper closes before the other, the pulley or bobbin 126 will still be able to continue to rotate until the second damper is in its second position (e.g. is also fully closed). The take-up elements 152 and 154 are configured keeping in mind the purpose of slippage engagement component, namely to allow for continued rotation of the bobbin element 126 even if one damper element has reached its second position before the other (the exact surface shapes for any particular type of take up element can be determined by suitable empirical tests or experiments). With this new system, the possibility of leak due to unequal length of connector rods (mentioned above) may be avoided. If desired or necessary the rounded cross-members may be configured as a roller type element (e.g. roller bearing) so as to be able to rotate along its longitudinal axis (i.e. to facilitate slippage); or its surface may be a friction reducing surface (e.g. coated with a friction reducing material such as Teflon (trademark)).

The pulley or bobbin element 126 may as shown in FIG. 14 be associated with a damper motor 160, the bobbin element 126 being directly mounted at or on the end of the damper motor rotor shaft 162; the end 162 of the damper motor rotor shaft has a square cross section end which is (slidingly) engaged an aperture of corresponding shape in a replaceable steel insert 163 which is mounted inside the pulley or bobbin element.

Referring again to FIGS. 17, 19 and 20 there is only a one component linker linking the two dampers, namely the damper wires 146, 148 and 150. Each end of the wires 146, 148 and 150. may for example be secured to a damper as shown in more detail by way of example in FIGS. 22 and 23. The wires 146, 148 and 150 may be elastic or non elastic as desired or necessary. The damper connector may as shown for example in FIG. 23 include a spring member 166 one end of which is attached to the end of a wire element.

Referring to FIGS. 24, 25 and 26, these figures schematically illustrate the sequence of events that occur during operation when one damper element lags behind the other with respect to its displacement from a first position to its respective second position. As may be seen, as the wire 146 is wound on the pulley or bobbin element 126 (i.e. taken up by the take-up elements 142 and 144) this causes the dampers to rotate or pivot toward their second (open) position and finally reach their respective second positions, passing through a transition stage (FIG. 25) wherein one damper is in its second (open) position before the other which finally reaches its second position with continued rotation of the pulley or bobbin element (FIG. 26). In the first damper position shown in FIG. 24 the dampers close off respective openings in an air handling apparatus whereas in the second position of FIG. 26 these opening are no longer blocked by the dampers. As may be appreciated the bobbin element 126 may be initiated to rotate in a clockwise or anticlockwise direction to take up the wire 146 so as to urge the dampers to move from their respective first to their respective second positions. Once the motor is de-energized the dampers will return to the first position under the influence of biasing springs.

Referring to back to FIGS. 18 and 21 these figures illustrate the use of a two piece elongated interconnection element. As shown each piece 170 and 172 (or 170*a* and 172*a*) is separately connected at one end thereof to a respective up-take element of the bobbin element 126 and at the other end thereof to a respective damper connector. For the structures shown, instead of relying on a slippage characteristic of the bobbin element 126 to facilitate continued rotation such continued rotation is facilitated by using elongated interconnection elements which are not only flexible but are also elastic (i.e. extensible). Thus when one damper component reaches its first position before the other, the elastic nature of the elongated interconnection elements is such as to allow for the continued rotation of the pulley or bobbin element to displace the lagging damper element to its second position. If desired the elastic quality of the elongated interconnection element may be augmented by using a damper connector as shown in FIG. 23 which includes a spring.

Referring to FIG. 27, this Figure illustrates an alternate embodiment wherein the rotatable part of the pulley or bobbin element 180 is schematically shown as being attached to one end 182 of the elongated interconnection element 184 rather than intermediate the ends of the elongated interconnection element. In this case the elongated element 184 is fixed at the other end to one of the damper elements 186 and is slidably (i.e. loosely) threaded though an eye bolt connector 188 connected to the other damper 190. Thus as the bobbin element 180 rotates to wind up the elongated interconnection element 184, this action will pull on the farthest damper 186 causing it to rotate about pivot element 192 to the second position 194. At the same time the elongated interconnection element 184 slides through and acts against the eye bolt 188 to also rotate the closest damper element 190 down to its second position 196 about pivot element 199.

Referring to FIG. 28, this figure shows a further example embodiment of the damper system wherein a linear action induces displacement of the damper elements 200 and 202.

As may be seen the displacement piston 204 has a linearly displaceable piston arm 206 (direction of arrow 208) which is provided at its end with an eyelet member 210 through which is slidably (i.e. loosely) threaded the elongated interconnection element 212. The elongated interconnection element 212 is fixed at its end to the dampers 200 and 202 by damper connectors. Thus as the piston arm 206 travels downwardly it will push on the elongated interconnection element 212 to in turn induce displacement of the damper elements, about their respective pivot elements 214 and 216, to respective second positions 218 and 220; any travel lag of one damper with respect to the other will be compensated for by a sliding of the elongated interconnection element through the eyelet until the lagging damper element reaches its second position. In this case the elongated interconnection element may be elastic or non elastic as desired or necessary.

FIGS. 29 and 30 illustrate a possible use of a damper system of the present invention to alter the air flow in an air handling system, namely to alter the direction of air flow. In FIG. 29 there is a fresh air flow 224 and a stale air outflow 226; whereas with displacement of the damper elements 228 and 230 (see FIG. 30) by the mechanisms described herein (not shown) the inflow of fresh air is blocked while the stale air 226 is redirected (e.g. back into an enclosure). The system or apparatus shown in these figures may of course incorporate one or more of the other aspects of the invention as described herein.

Referring to FIGS. 31, 32, 33 and 34 these illustrate an example two part embodiment of an automatic temperature responsive air flow choke damper. The damper comprise a choker damper component 240 and an actuator component for connecting the choker damper component to a support. In this case the support is a main damper element 244 which may itself be displaceable between its respective first and second positions; the main damper element 244 may be a damper element as described and illustrated with respect to the self aligning damper system. The support could of course alternately be the wall of a ventilation duct for inducing the damper component to be displaced (i.e. pivoted) between a first position and a second position.

The actuator component comprises a temperature responsive actuator element (see also FIGS. 33 and 34) in the form of a torsion bimetallic spring 246 which reacts to temperature variations (may be obtained from Crest Manufacturing Company Lincoln Rhode Island USA). The torsion bimetallic spring 246 has an inner projection 248 and an outer projection 250. The outer projection 250 of the torsion bimetallic spring 246 is directly attached to the choker damper component 240 by sliding (pressure) engagement with the guide members 252 and held in place by a snap connect arrangement or by a screw engaged in openings 254 and 256. The inner projection 248 of the torsion bimetallic spring 246 is on the other hand indirectly attached to the underlying damper element by the slotted rod element 260, the slot 262 of which engages the inner projection 248. The rod element 260 itself is attached to the damper projections 264 by screw members 266.

The torsion bimetallic spring 246 winds and unwinds itself under temperature differences and actuates the choker damper 240, mounted directly on top of the damper 244 for restricting the airflow proportionally to the temperature drop, i.e. temperature differential. The bimetallic spring 246 is configured keeping in mind its purpose, i.e. under cold conditions, choking level may be maximum and under hot conditions choking may be turned off). The first and second positions may be predetermined empirically so as to define a position in the air flow path wherein the choker damper component presents the desired or necessary maximum constriction position and a position in the air flow path wherein the choker damper component presents the desired or necessary minimum constriction position. This is a mechanical device, so no power is required to control the system.

Referring to 35 to 37 these figures show example dispositions of the choker damper in response to temperature (the elements defining the air path within which the choke damper 240 may be associated are not shown; air flow is in the direction of the arrrows); FIG. 35 shows the choker damper 240 in a minimum constriction position parallel to the broad face of the underlying damper 244 (warm air) as well as to air flow. FIG. 36 shows the choker the broad face of the underlying damper 244 in an intermediate constriction position with the plate of the choker damper 240 disposed transverse to the broad face of the underlying damper 244 (cooler air) as well as to the air flow. FIG. 37 shows the choker damper 240 in a maximum constriction position with the plate of the choker damper 240 disposed perpendicular to the broad face of the underlying damper 244 (cold air) as well as the air flow. The displacement of the choker damper 240 in each case being in response to the temperature of the air around the torsion bimetallic spring 246. The torsion bimetallic spring 246 could of course be configured to provide displacements between positions intermediate to that shown in FIGS. 35 and 37

Hooking or Connector System

Referring to FIGS. 38 to 40, these figures illustrate an example connector of the present invention. The connector 270 has a U-shaped hook member 272 comprising a pair of opposed arm members 274 and 276, each arm member being provided with respective (e.g. coaxially aligned) attachment openings 278 and 280. The connector also has a tail engagement member 282 extending from an arm member 280 of the U-shaped hook member. The U-shaped hook member 280 is thus open towards the tail engagement member The openings 278 and 280 may each be sized to receive the screw threaded stalk or stem 284 (see FIG. 41) of a screw attachment device but are smaller than the screw head 286 (see FIG. 42). At least one of the openings 278 and 280 (i.e. the opening which is opposite the opening which will be adjacent the screw head) may be defined by a peripheral edge sized or configured to engage the screw threads of the screw stalk or stem. Both openings 278 and 280 may be unthreaded. However, if so desired the distal opening not adjacent the screw head may also have mating threads for mating with the threads of the screw stalk.

The opposed arm members 274 and 276 are spaced apart and are connected together by a connecting member 290 so that the U-shaped end defines a kind of notch for receiving or seating a portion of the housing element to which it is to be connected (see FIGS. 41 and 42). As may be understood from FIGS. 41 and 42 the friable housing element may be provided with a hole or an opening 292 through which the U-shaped end may be inserted and then pulled upwardly to seat or mate with a portion of the peripheral edge defining the housing hole.

By way of example the tail engagement member shown has an opening 296 configured for receiving a link of a chain suspended from a ceiling, i.e. for supporting the housing element from a ceiling using a plurality (e.g. four) of the connectors. If desired the engagement of the connector need not be augmented by the above mentioned screw element in which case nor screw openings need be provided in the arms of the connector.

The portion of the housing element to be disposed between the opposed arm members of the connectors may have a hole which can be aligned with the two opening 278 and 280, if present, when in use. Alternatively the screw connector may simply be screwed through the friable material of the housing.

Air Diffuser for Facilitating the Mixing of Fresh Air and Stale Air Flows of Different Temperature FIGS. 43 and 44 illustrate in schematic fashion example embodiments of air intermingling assemblies in accordance with the present invention. Thus the air intermingling assemblies each have an air input zone 300 for receiving the fresh air flow, an air intermingling zone 302 for receiving the stale air flow and an intermediate air dispenser or dispersal zone 304. The air input zone 300 for receiving the fresh air flow may be as shown in the form of an air input vessel having a first fresh air inlet 306. The air intermingling zone 302 for receiving the stale air flow may on the other hand be in the form of an air intermingling compartment having a second exhaust or stale air inlet 308 and a combined (i.e. mixed) air outlet 310. The intermediate air dispenser or dispersal zone 304 may comprise a diffuser body in the form of a common partitioning wall defining a wall component provided with a plurality of apertures (one of which is designated by the reference number 312) providing air communication between the inlet and intermingling zones. The apertures 312 for the embodiment of FIG. 43 are shown as being of the same cross sectional configuration and also as being evenly spaced apart. The apertures for the embodiment of FIG. 44 are on the other hand has (conceptually) at least two zones, namely a first aperture zone 320 of relatively high(est) density or number of apertures 312 and a (distal) second zone 322 of reactively fewer apertures or of lower aperture density or concentration, the first aperture zone 320 being adjacent the stale air inlet 308; the configuration of FIG. 44 is a preferred configuration. The embodiment of FIG. 44 may have a plurality of intermediate zones (illustrated by the dotted line connecting the two zones) between the first and second aperture zones of (gradually) decreasing aperture concentration in the direction from the first to the second zones (illustrated by the dotted line connecting the two zones).

In any event as may be seen from FIGS. 43 and 44 the air input vessel, air intermingling compartment and common partitioning wall are configured and disposed such that an air flow is able to enter the first inlet 306 and pass through the aperture component (apertures 312) into said air intermingling compartment to intermingle with an air flow entering from the second inlet 308 so as to form a combined (i.e. mixed) air flow passing out of the combined (i.e. mixed) air outlet 310.

In the case of the embodiment illustrated by FIG. 44 the incoming fresh air flow is split or subdivided such that a relatively larger proportion of the fresh cool air is brought into contact with the volume of warm stale air near the stale air inlet than farther away from the stale air inlet, i.e. the cool and warm air flows are blended in stages so as to avoid the blended air temperature from falling below the freezing temperature of water or below the dew point temperature of water so as to avoid liquid water or ice buildup in the air handling system. Please see FIG. 44a which uses the same reference numerals as for FIG. 44 to designated analogous elements and which illustrates such a flow by arrows 314 of diminishing length away from the stale air inlet 308.

In accordance with the present invention the intermediate air dispenser or dispersal zone may comprises a diffuser body which is of a heat transfer insolation body, said insolation body defining said apertures; the insolation body may for example be formed of compressed polystyrene (beads).

Referring to FIGS. 45, 46 and 47 these figures illustrates an intermingling unit structure (e.g. of polystyrene) for an apparatus for intermingling of air in accordance with the present invention but wherein the roof of the air input vessel and the floor and side walls of the air intermingling compartment as well as channels walls for an exhaust air path to the outside of an enclosure are defined by other structures of an air handling apparatus. The intermingling unit structure as shown reflects the aperture structure shown in FIGS. 44 and 44a. Thus there is a high(est) concentration of apertures 312 adjacent the stale air inlet (see FIG. 47 wherein arrow 320 shows the portion of stale air going to the intermingling zone); the stale air as seen from FIG. 47 may be split into two portions, namely a portion designated by the arrow 320 for intermingling and a second portion designated by the arrow 322 for exhaustion outside an enclosure.

The intermingling unit structure as shown in FIGS. 45 to 47 has a fresh air inlet 326 for receiving fresh air (arrow 328 in FIGS. 46 and 47) for passage through the apertures of the diffuser floor into the underlying intermingling compartment or zone.

The intermingling unit structure in addition to providing an underlying stale air inlet for the intermingling chamber has an overhead stale air exhaust inlet 330 for an exhaust air path 331 for exhausting stale air (arrow 322 of FIGS. 46 and 47) from an enclosure rather then recycling the stale air back to the enclosure in association with fresh air, i.e. the intermingling unit structure provides as described above a stale air splitter function wherein stale air is split between air destined for the intermingling compartment and air to be directed to an exhaust air path for being exhausted to the outside (of an enclosure); see FIGS. 46 and 47.

Still referring to FIG. 45 the intermingling unit structure is provided with a choker damper assembly (seen in exploded view) comprising a first inlet damper 340 associated with the fresh air inlet 326 and a second inlet damper 342 associated with the stale air exhaust inlet 330. A common shaft 348 is also provided which is rotatably engaged in openings of support members 349 and 349a The dampers 340 and 342 are both fixed or secured (in any known) suitable fashion (e.g. by lock screw 346) to the common shaft 348 such that the dampers 340 and 342 can rotate in unison between respective closed and open positions. Additionally, a torsion spring 350 is mounted on the shaft 348 and one end 352 thereof is to engage element 354 of the support member 349a while the other end 356 engages or rests against a surface of the second damper 342 so as to bias it and (as a consequence) the other damper 340 in respective closed off positions when the apparatus blower is not forcing air through the apparatus. During operation, the dampers 340 and 342 rotate under air pressure caused by airflow through the inlets 326 and 330, allowing air to access the different zones. As seen from FIGS. 46 and 47 one portion of stale air flow (arrow 322) goes to the exhaust inlet 330 and another stale air flow portion 320 to the mixing or intermingling zone; at the same time a fresh air flow 328 goes to the diffuser zone (before accessing the mixing zone under the diffuser floor where it is (uniformly) blended to form an intermingled or mixed air flow for delivery to the interior of an enclosure.

If desired or necessary the choker damper assembly may also include a temperature responsive choker inhibition element for inhibiting the displacement of the choker dampers between said first (closed) and said second (open) positions, (e.g. in response to the temperature of the environment, e.g. in reaction to the temperature of the air flowing over the choke). Thus the choker damper assembly shown in FIG. 45 includes a bimetallic actuator 360 which is also mounted on the shaft 348 and which is configured to react to temperature differences; the inner projection 362 (see FIG. 50) is engaged in a slot 364 on the common shaft. When the fresh air flow is at ambient temperature, the bimetal actuator 360 is in nonrestrictive position, i.e. the shaft is free to rotate 90° without being blocked by the bimetal spring 360; see FIGS. 48, 49 and 50. However, if the fresh air temperature decreases to a predetermined value (e.g. −30° C.), the outer projection 366 of the bimetallic actuator 360 acts as a limiter and restricts the rotation of dampers by pushing on a stopper surface 368 integrated in the intermingling unit structure, i.e. the bimetal spring 360 winds up to displace or urge the outer projection 356 towards the stopper surface with the damper 340 in the closed position; see FIG. 51. It is of course understood that if damper 340 is maintained in a closed position the other damper 342 will also be maintained in its closed position. If both dampers are maintained in closed position no fresh air will be allowed into the mingling structure and all of the stale air will simply be recycled to the interior of the enclosure from which it was drawn. The bimetal actuator may be of the same form as shown in FIGS. 33 and 34 above (may be obtained from Crest Manufacturing Company Lincoln R.I. USA).

The above particular description has been directed in to an air intermingling assembly for an air handling systems wherein the fresh air input is a cold (dry) air flow as compared to the stale air input. However, such an air intermingling assembly be used or configured to accommodate a fresh air input that is a hot and humid air flow as compared to the stale air input. In this case the bimetallic actuator may be configured to block the dampers closed once a predetermined high temperature is reached (e.g. 35° C.). In this case, instead of a spring member, a hygroscopic member may be used. The hygroscopic member is one which able to expand with increasing humidity and is disposed relative to the dampers and/or the common shaft such that at a predetermined expansion size (i.e. a predetermined humidity level in the fresh input air) the hygroscopic member is able to block the dampers in a closed position.

Single Blower Wheel Assembly Provided with a First and a Second Blower Wheel Elements Referring to FIG. 52 the known blower/motor combination shown comprises first and second spaced apart blower wheels 370 and 372 which are mounted on a common motor rotor shaft 374 on either side of the motor 376. One blower is associated with a fresh air stream represented by the arrow 378 and the other with a stale or exhaust air stream represent by the arrow 380. As shown the portion of the motor rotor shaft associated with one blower passes through an opening (not shown) of a respective baffle wall 382 or 384. The motor 376 is thus separated from the two air streams by both baffles 382 and 384, i.e. the motor 376 is sandwiched between the pair of baffle walls 382 and 384. Servicing of this type of arrangement is complicated by the two baffles 382 and 384 which may necessitate the separation of the motor 376 from the blower wheels while still in the ventilation apparatus.

Referring to FIGS. 52a and 53, the example blower wheel assembly 390 (which is shown in schematic fashion) is shown with an airflow baffle 392 having an inner peripheral edge 394 defining a baffle opening (i.e. a circular opening). The blower wheel assembly 390 comprises a dynamic seal member 398 (e.g. ring, annular, disk shaped member), a first blower wheel 400, and a second blower wheel 402. The blower wheels 400 and 402 are juxtaposed (e.g. adjacent to each other) and coaxially attached to a rotor shaft (not shown) on opposite sides of the dynamic seal member 398 so as to be rotatable about axis 404. The dynamic seal member 398 has an outer peripheral edge 408 (provided with a peripheral lip or peripheral groove (e.g. the lip or groove extending parallel to, perpendicular to or transversely to the axis of rotation of the rotor shaft)). The dynamic seal member 398, the first blower wheel 400 and the second blower wheel 402 are sized and configured such that when the blower wheel assembly is disposed in the baffle opening and the outer peripheral edge 408 is in juxtaposed relation to the inner peripheral edge of the baffle, the first blower wheel is disposed on one side of the baffle 392 and the second blower wheel is disposed on the other opposite site of the baffle 392 and the outer peripheral edge 408 is able to mate with the inner peripheral edge 394 of the baffle so as to be able to dynamically cooperate with the inner peripheral edge 394 of the baffle so as to provide a dynamic seal between opposite sides of the baffle (i.e. to provide an air (flow) seal between the opposite sides of the baffle when the blowers are rotated).

As may be seen the outer peripheral edge 408 and the inner peripheral edge 394 each have an L-like shape, each such L-shaped edge having a foot element and an inner side (394a and 408a), said foot elements being in juxtaposed relation and each being disposed on the inner side of the other edge, i.e. so as to provide a contorted pathway between opposite sides of the baffle.

Referring to FIG. 53 one of the blower wheels (i.e. blower wheel 400) is shown as comprising the dynamic seal member. The lower blower wheel is mounted to the motor rotor shaft while the upper blower is mounted to the lower blower.

For FIGS. 52 and 53 air flow through the respective blowers is as indicted by the respective group of dotted line arrows.

Mounting Port

FIG. 54 shows two types of mounting ports, namely a large version 430 for large openings and a smaller version 440 for smaller openings in the underlying (ventilation) housing. Turning to FIGS. 55, 56 and 57, the mounting port 440 comprises a side wall member 442 defining an air opening or passage, the side wall member 442 having an air input portion or end 444 and an air output portion or end 446. The air input end has snap connection means 448 and 450 (e.g. male) for cooperating with the corresponding snap connection means (e.g. female) of an air duct member for connecting the air duct to the mounting port 440. The air output portion also have snap connection means 452 (e.g. male) for cooperating with the corresponding snap connection means 454 (e.g. female) of an (air) opening element 457. The snap effect may be provided by any (known) mechanism.

The air output end 446 of the mounting port is provided with a sealing projection 460 for cooperating with a correspondingly (shaped) groove 462 of the opening element for (air) seal mating therewith (i.e. for air seal connection of the port to the opening means). The mounting port and opening elements are also provided with four respective female (470)

and male (480) engagement elements having openings therethrough which once aligned allow for fixing the mounting port to the opening element (e.g. by screws, rivets, or the like). The larger mounting port 430 has analogous structures to the smaller port 440.

FIG. 58 illustrate an alternative technique for sealing engagement between the relatively smaller mounting port 440 and a normally larger opening element. In this case sealing is affected by an adapter member 490 which on one side (hidden from view) has an oval projection for sealing engagement with the correspondingly shaped grove 492 of the opening element 494; fixation is by above mentioned four respective female and male engagement elements; as well as snap fit male elements for cooperating with female snap fit elements of the opening element. On the other exposed side the adapter is provided with an opening 496 which can receive the projections of the mounting port 440 as well as with four respective male engagement elements for engagement with four respective female engagement elements of the mounting port.

Turning back to FIGS. 57 and 58 the mounting port is also provided with a two member duct mounting member at the air input portion or end. The two member duct mounting member has a first inner mounting member adapted to snap connect to a suitably configured (i.e. female) snap connect duct of a predetermined size; this member comprises snap connection means 450. A second outer mounting member extends from the inner member to snap connect to a suitably configured snap connect duct of a predetermined size smaller (i.e. of smaller cross sectional inner diameter) than the duct connectable to the inner mounting member; this member comprises snap connection means 448. This two member duct mounting member may be associated with a mounting port which does not have a sealing projection or groove as shown in FIG. 57. As may be appreciated this type of mounting port has the versatility of being able to connect to two differently sized ducts. This mounting port could of course be provided with more such mounting members of ever decreasing size; i.e. the mounting port may have two or more such mounting members of of ever decreasing size.

We claim:

1. A damper system comprising a plurality of damper elements, each of said damper elements comprising a respective connector element, each of said dampers being displaceable from a respective first position to a respective second position and a displacement component for displacing said damper elements from a respective first position to a respective second position said displacement component comprising a flexible elongated damper interconnection element, and a displacement element comprising an engagement component, wherein said elongated damper interconnection element is connected to the engagement component of said displacement element and to the connector element of each of said dampers, wherein said displacement component is configured and disposed such that said displacement component is reversibly displaceable between a first configuration wherein said dampers are each in respective first positions and a second configuration wherein said dampers are each in respective second positions, said displacement component being configured such that as said displacement component passes from said first configuration to said second configuration, said displacement component induces displacement of each of said dampers from a respective first position to a respective second position and wherein said displacement component is configured such that as said displacement component passes from said first configuration to said second configuration so as to induce displacement of said dampers from a respective first position to a respective second position and one or more of said dampers trails one or more of the other dampers in respect of its displacement to its respective second position, the displacement component, once any leading damper has arrived at its second position, is able to continue its displacement and thereby induce any trailing damper to be displaced to its second position while any leading damper is maintained at its second position.

2. A damper system as defined in claim 1 wherein said displacement component comprises a bobbin element reversibly rotatable about an axis of rotation and wherein said bobbin element is rotatable around said axis for winding up and unwinding out said elongated damper interconnection element, said dampers being displaceable from a respective first position to a respective second position as said elongated damper interconnection element is wound up.

3. A damper system as defined in claim 1 wherein each of said dampers is associated with a respective spring bias member biasing a damper in its respective first position.

4. A damper system as defined in claim 2 comprising an electric motor component connected to said bobbin element such that when said motor component is energized said motor component is capable of rotating the bobbin element in a rotational direction for displacing the damper elements from a respective first position to a respective second position.

5. A damper displacement system as defined in claim 4 wherein said motor component is a reversible motor component.

6. A damper displacement system defined in claim 4 comprising an electric switch configured so as to be able to energize and de-energize said motor.

7. A damper system comprising two damper elements, each of said damper elements comprising a respective connector element, each of said dampers being displaceable between a respective first position to a respective second position and a displacement component for displacing said damper elements from a respective first position to a respective second position said displacement component comprising a flexible elongated damper interconnection element, and an intermediate bobbin element reversibly rotatable about an axis of rotation, said bobbin element comprising an engagement component engaging said elongated damper interconnection element, wherein said elongated damper interconnection element is connected to the engagement component of said bobbin element and to the connector element of each of said dampers, wherein said bobbin element is rotatable about said axis for winding up and unwinding out said elongated damper interconnection element, said dampers being displaceable from a respective first position to a respective second position as said elongated damper interconnection element is wound up, said displacement component being configured such when said bobbin element is rotated about said axis so as to induce said elongated damper interconnection element to be taken up by said bobbin element and one of said damper elements trails the other damper in respect of its displacement to its respective second position, the bobbin element, once the leading damper element has arrived at its second position, is able to continue to rotate and thereby induce the trailing damper element to be displaced to its second position while the leading damper element is maintained at its second position.

8. A damper system as defined in claim 7 wherein said elongated damper interconnection element has a first side member and a second side member, wherein said first side member engages the connector of one of said dampers and said second side member engages the connector of the other of said dampers, wherein said bobbin element is rotatable around said axis for winding up and unwinding out said first and second side members, said dampers being displaceable from a respective first position to a respective second position as said first and second side members are wound up, said displacement component being configured such when said bobbin element is rotated about said axis so as to induce said first and second side members to be taken up and one of said dampers trails the other damper in respect of its displacement to its respective second position, the bobbin element, once the leading damper has arrived at its second position, is able to continue to rotate and thereby induce the trailing damper to be displaced to its second position while the leading damper is maintained at its second position.

9. A damper system as defined in claim 7 wherein said damper interconnection element is a flexible loop shaped damper interconnection element having a first loop end and a second loop end and defining a first flight side and an opposed second flight side, said first and second flight sides each being connected respectively to said first and second ends, wherein said bobbin element comprises a slippage engagement component for slippingly engaging said first and second flight sides, said bobbin element defining an aperture, said slippage engagement component comprising two take-up elements and said aperture, said aperture being disposed between said take-up elements, said first and second flight sides each being threaded through said aperture, wherein each of said damper connector elements comprises a respective loop connector, wherein said first end engages one of said loop connectors and said second end engages the other of said loop connectors, wherein said bobbin element is rotatable around said axis for winding up and unwinding out said first and second flight sides, said dampers being displaceable from a respective first position to a respective second position as said first and second flight sides are wound up said bobbin element being configured such that rotation thereof about said axis induces said first and second flight sides to be taken up by the take-up elements so as to wind the first and second flight sides about the bobbin element and thereby induce the damper elements to be displaced from said first to said second position said displacement component being configured such when said bobbin element is rotated about said axis so as to induce first and second flight sides to be taken up and one of said dampers trails the other damper in respect of its displacement to its respective second position, the bobbin element, once the leading damper has arrived at its second position, is able to continue to rotate and thereby induce the trailing damper to be displaced to its second position while the leading damper is maintained at its second position.

10. A damper system as defined in claim 7 wherein each of said dampers is associated with a respective spring bias member biasing a damper in its respective first position.

11. A damper system as defined in claim 7 comprising an electric motor component connected to said bobbin element such that when said motor component is energized said motor component is capable of rotating the bobbin element in a predetermined rotational direction for displacing two damper elements from a respective first position to a respective second position.

12. A damper system as defined in claim 10 wherein said motor component is a reversible motor component.

13. A damper displacement system defined in claim 10 comprising an electric switch configured so as to be able to energize and de-energize said motor.

14. An air handling system comprising a damper system, said damper system comprising
a plurality of damper elements, each of said damper elements comprising a respective connector element, each of said dampers being displaceable from a respective first position to a respective second position and
a displacement component for displacing said damper elements from a respective first position to a respective second position
said displacement component comprising
a flexible elongated damper interconnection element, and
a displacement element comprising an engagement component,
wherein said elongated damper interconnection element is connected to the engagement component of said displacement element and to the connector element of each of said dampers,
wherein said displacement component is configured and disposed such that said displacement component is reversibly displaceable between a first configuration wherein said dampers are each in respective first positions and a second configuration wherein said dampers are each in respective second positions, said displacement component being configured such that as said displacement component passes from said first configuration to said second configuration, said displacement component induces displacement of each of said dampers from a respective first position to a respective second position and
wherein said displacement component is configured such that as said displacement component passes from said first configuration to said second configuration so as to induce displacement of said dampers from a respective first position to a respective second position and one or more of said dampers trails one or more of the other dampers in respect of its displacement to its respective second position, the displacement component, once any leading damper has arrived at its second position, is able to continue its displacement and thereby induce any trailing damper to be displaced to its second position while any leading damper is maintained at its second position.

15. An air handling system comprising a damper system, said damper system comprising
two damper elements, each of said damper elements comprising a respective connector element, each of said dampers being displaceable between a respective first position to a respective second position and
a displacement component for displacing said damper elements from a respective first position to a respective second position said displacement component comprising
a flexible elongated damper interconnection element, and
an intermediate bobbin element reversibly rotatable about an axis of rotation, said bobbin element comprising an engagement component engaging said elongated damper interconnection element, wherein said elongated damper interconnection element is connected to the engagement component of said bobbin element and to the connector element of each of said dampers, wherein said bobbin element is rotatable about said axis for winding up and unwinding out said elongated damper interconnection element, said dampers being displaceable from a respective first position to a respective second position as said elongated damper interconnection element is wound up, said displacement component being configured such when said bobbin element is rotated about said axis so as to induce said elongated damper interconnection element to be taken up by said bobbin element and one of said damper elements trails the other damper in respect of its displacement to its respective second position, the bobbin element, once the leading damper element has arrived at its second position, is able to continue to rotate and thereby induce the trailing damper element to be displaced to its second position while the leading damper element is maintained at its second position.

\* \* \* \* \*